(12) United States Patent
Wang et al.

(10) Patent No.: US 12,645,547 B2
(45) Date of Patent: Jun. 2, 2026

(54) DIFFERENTIAL FILE RESTORATION METHOD AND ELECTRONIC DEVICE

(71) Applicant: HONOR DEVICE CO., LTD., Shenzhen (CN)

(72) Inventors: Yanzhao Wang, Shenzhen (CN); Zenghui Zhang, Shenzhen (CN); Chao Chen, Shenzhen (CN); Jiulin Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/867,523

(22) PCT Filed: Aug. 17, 2023

(86) PCT No.: PCT/CN2023/113549
§ 371 (c)(1),
(2) Date: Nov. 20, 2024

(87) PCT Pub. No.: WO2024/051465
PCT Pub. Date: Mar. 14, 2024

(65) Prior Publication Data
US 2025/0321834 A1 Oct. 16, 2025

(30) Foreign Application Priority Data

Sep. 9, 2022 (CN) .......................... 202211101979.2

(51) Int. Cl.
*G06F 11/1446* (2026.01)
(52) U.S. Cl.
CPC ................................. *G06F 11/1469* (2013.01)

(58) Field of Classification Search
CPC .......................... G06F 2201/80; G06F 11/1469
See application file for complete search history.

(56) References Cited

U.S. PATENT DOCUMENTS 8,078,653 B1 12/2011 Bisson et al.
10,866,797 B2 * 12/2020 Choi ....................... G06F 8/654
(Continued)

FOREIGN PATENT DOCUMENTS

| CN | 107016053 A | 8/2017 |
| CN | 113835870 A | 12/2021 |
| CN | 114327574 A | 4/2022 |

OTHER PUBLICATIONS

Extended European Search Report in European Appln. No. 23862162.7, mailed on Aug. 11, 2025, 9 pages.

*Primary Examiner* — Miranda Le
(74) *Attorney, Agent, or Firm* — Fish & Richardson P.C.

(57) ABSTRACT

Embodiments of this application provide a differential file restoration method and an electronic device. In the method, a differential file includes at least one group of data compressed blocks, and data compressed blocks in each group are divided based on a preset block size before being compressed. When the electronic device performs restoration on the differential file, the electronic device first determines a parallel quantity k of restoration threads based on the block size and a size of RAM space, and then performs restoration processing on the differential file in parallel by using the k restoration threads, where each restoration thread performs restoration processing on the at least one group of data compressed blocks by using one group of RAM space corresponding to the restoration thread.

18 Claims, 34 Drawing Sheets

(56) References Cited

U.S. PATENT DOCUMENTS

| | | | |
|---|---|---|---|
| 2007/0294685 A1* | 12/2007 | Oh | G06F 8/658 |
| | | | 717/168 |
| 2012/0259843 A1* | 10/2012 | Child | G06F 16/24569 |
| | | | 707/769 |
| 2016/0357560 A1* | 12/2016 | Fahs | G06F 9/30145 |
| 2017/0219357 A1* | 8/2017 | Pfeifle | G01C 21/3881 |
| 2018/0173723 A1* | 6/2018 | Pfeifle | G06F 16/29 |
| 2018/0246711 A1* | 8/2018 | Kurosawa | G06F 8/658 |
| 2020/0169749 A1* | 5/2020 | Hsu | H04N 19/625 |
| 2020/0233659 A1 | 7/2020 | Kim et al. | |
| 2021/0019219 A1* | 1/2021 | Patel | G06F 9/5066 |
| 2021/0200641 A1 | 7/2021 | Bafna et al. | |
| 2021/0303292 A1* | 9/2021 | Yu | G06F 21/33 |

* cited by examiner

|  | Start byte | Byte length | Content |
|---|---|---|---|
| Header | 0 | 8 | Magic number |
| Control block 1 | 8 | 8 | Diff data length |
| | 16 | 8 | Extra data length |
| | 24 | 8 | Pointer offset |
| Diff block 1 | 32 | n1 | Diff data |
| Extra block 1 | 32+n1 | m1 | Extra data |
| Control block 2 | 32+n1+m1 | 8 | Diff data length |
| | 40+n1+m1 | 8 | Extra data length |
| | 48+n1+m1 | 8 | Pointer offset |
| Diff block 2 | 56+n1+m1 | n2 | Diff data |
| Extra block 2 | 56+n1+m1+n2 | m2 | Extra data |
| | ... | ... | ... |
| Control block n | x | 8 | Diff data length |
| | x+8 | 8 | Extra data length |
| | x+16 | 8 | Pointer offset |
| Diff block n | x+24 | nn | Diff data |
| Extra block n | x+24+nn | mn | Extra data |

FIG. 4

| | Start byte | Byte length | Content |
|---|---|---|---|
| Header | 0 | 8 | Magic number |
| | 8 | 8 | zonesize |
| Control block 1 | 16 | 8 | Length of Diff data 01 and compression description of blocks |
| | 24 | 8 | Length of Extra data 01 and compression description of blocks |
| | 32 | 8 | Pointer offset |
| Diff data 01 compressed block 1 | | | Compression data of a Diff data 01 block 1 |
| Diff data 01 compressed block 2 | | | Compression data of a Diff data 01 block 2 |
| | | | ... |
| Diff data 01 compressed block n1 | | | Compression data of a Diff data 01 block n1 |
| Extra data 01 compressed block 1 | | | Compression data of an Extra data 01 block 1 |
| Extra data 01 compressed block 2 | | | Compression data of an Extra data 01 block 2 |
| | | | ... |
| Extra data 01 compressed block n2 | | | Compression data of an Extra data 01 block n2 |
| Control block 2 | | 8 | Length of Diff data 02 and compression description of blocks |
| | | 8 | Length of Extra data 02 and compression description of blocks |
| | | 8 | Pointer offset |
| | | | ... |

FIG. 8

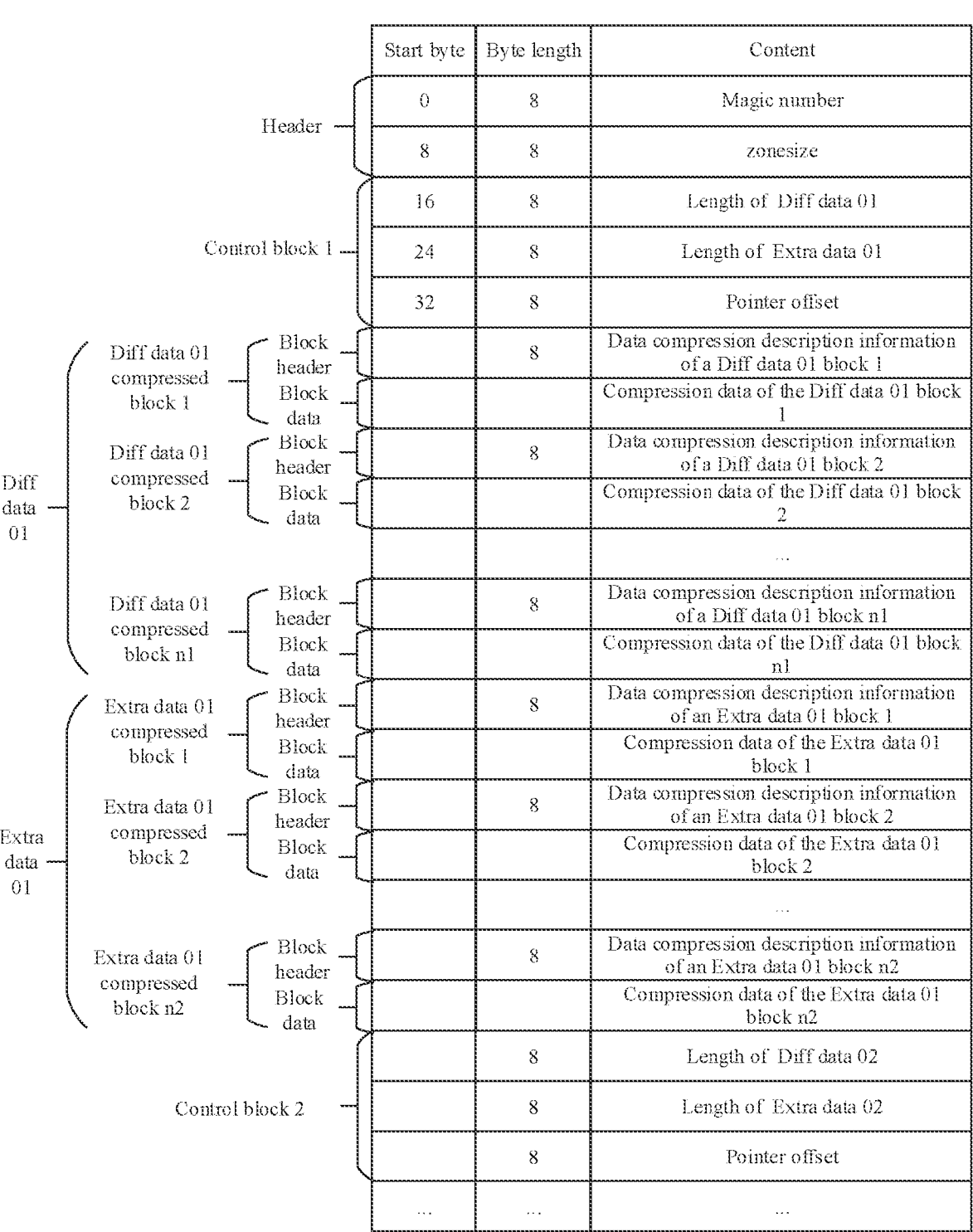

| Start byte | Byte length | Content |
|---|---|---|
| 0 | 8 | Magic number |
| 8 | 8 | zonesize |
| 16 | 8 | Length of Diff data 01 |
| 24 | 8 | Length of Extra data 01 |
| 32 | 8 | Pointer offset |
| | 8 | Data compression description information of a Diff data 01 block 1 |
| | | Compression data of the Diff data 01 block 1 |
| | 8 | Data compression description information of a Diff data 01 block 2 |
| | | Compression data of the Diff data 01 block 2 |
| | | ... |
| | 8 | Data compression description information of a Diff data 01 block n1 |
| | | Compression data of the Diff data 01 block n1 |
| | 8 | Data compression description information of an Extra data 01 block 1 |
| | | Compression data of the Extra data 01 block 1 |
| | 8 | Data compression description information of an Extra data 01 block 2 |
| | | Compression data of the Extra data 01 block 2 |
| | | ... |
| | 8 | Data compression description information of an Extra data 01 block n2 |
| | | Compression data of the Extra data 01 block n2 |
| | 8 | Length of Diff data 02 |
| | 8 | Length of Extra data 02 |
| | 8 | Pointer offset |
| ... | ... | ... |

FIG. 10

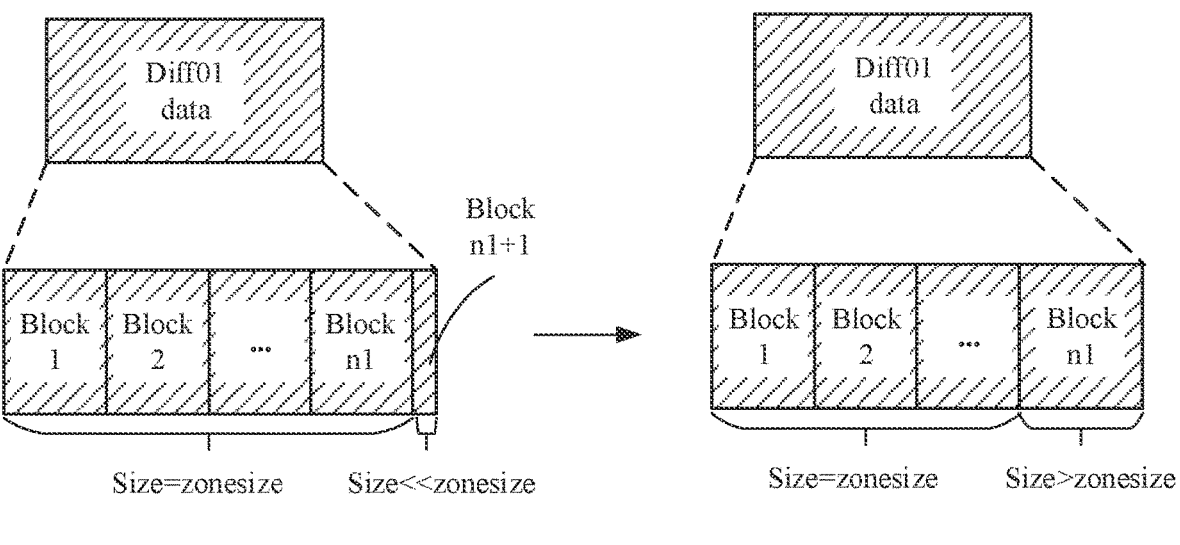
(1)
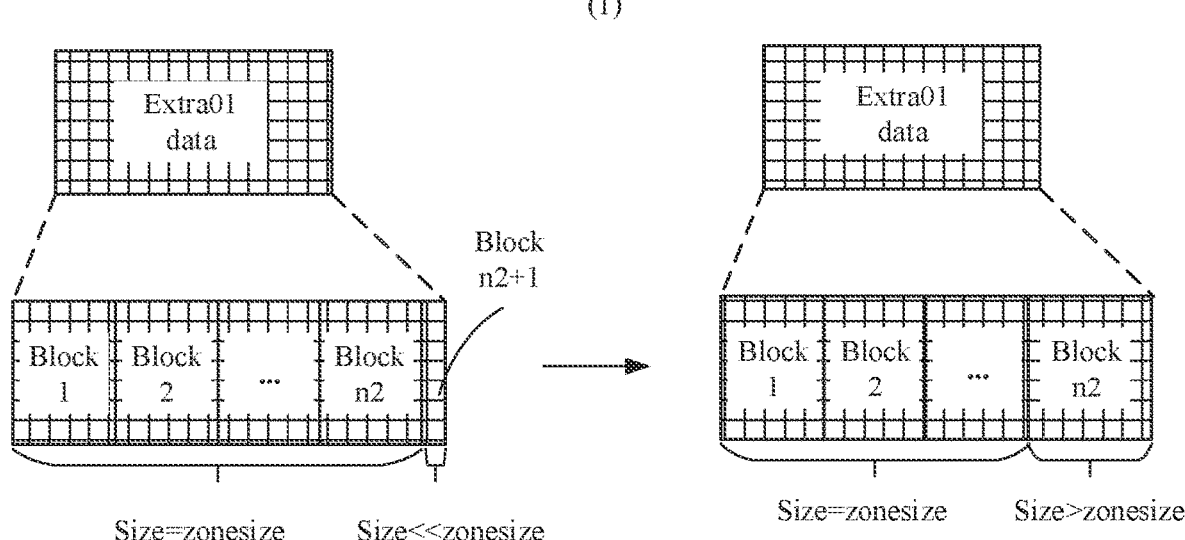
(2)
FIG. 11B

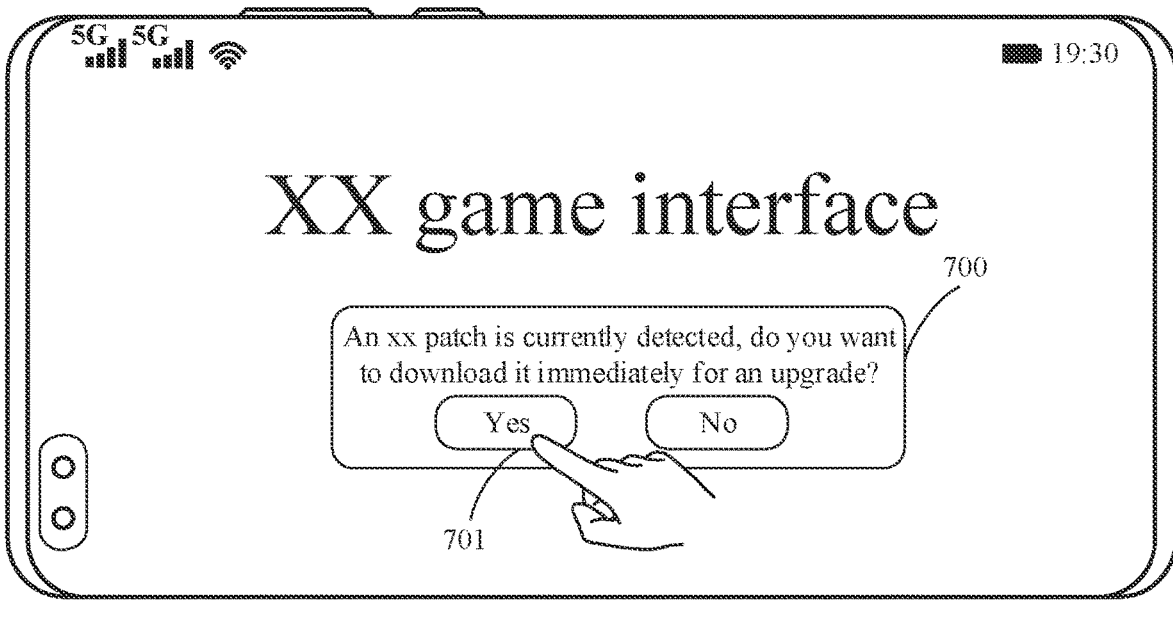
(1)
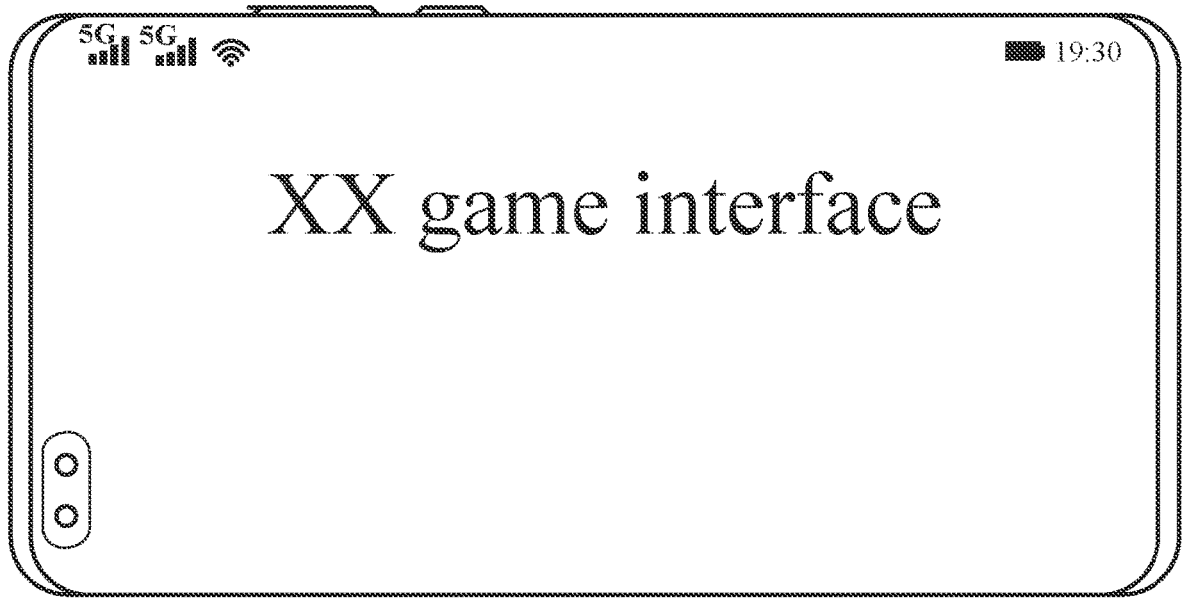
(2)
FIG. 20

| | Start byte | Byte length | Content |
|---|---|---|---|
| Header | 0 | 8 | Magic number |
| | 8 | 8 | zonesize and total quantity of control blocks |
| Control block 1 | 16 | 8 | Length of Diff data 01 and compression description of blocks |
| | 24 | 8 | Length of Extra data 01 and compression description of blocks |
| | 32 | 8 | First pointer offset |
| | 40 | 8 | Second pointer offset |
| Diff data 01 compressed block 1 | | | Compression data of a Diff data 01 block 1 |
| Diff data 01 compressed block 2 | | | Compression data of a Diff data 01 block 2 |
| | | | ... |
| Diff data 01 compressed block n1 | | | Compression data of a Diff data 01 block n1 |
| Extra data 01 compressed block 1 | | | Compression data of an Extra data 01 block 1 |
| Extra data 01 compressed block 2 | | | Compression data of an Extra data 01 block 2 |
| | | | ... |
| Extra data 01 compressed block n2 | | | Compression data of an Extra data 01 block n2 |
| Control block 2 | | 8 | Length of Diff data 02 and compression description of blocks |
| | | 8 | Length of Extra data 02 and compression description of blocks |
| | | 8 | First pointer offset |
| | | 8 | Second pointer offset |
| | | | ... |

FIG. 23

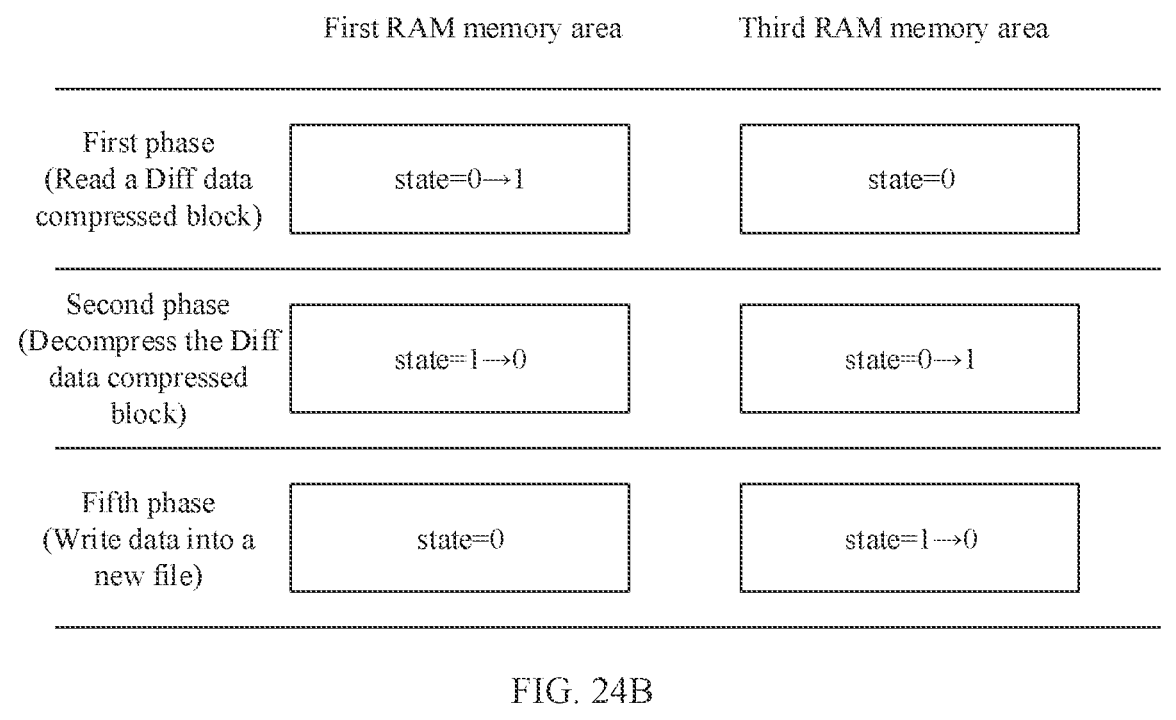

First RAM memory area          Third RAM memory area

| First phase (Read a Diff data compressed block) | state=0→1 | state=0 |
| Second phase (Decompress the Diff data compressed block) | state=1→0 | state=0→1 |
| Fifth phase (Write data into a new file) | state=0 | state=1→0 |

FIG. 24B

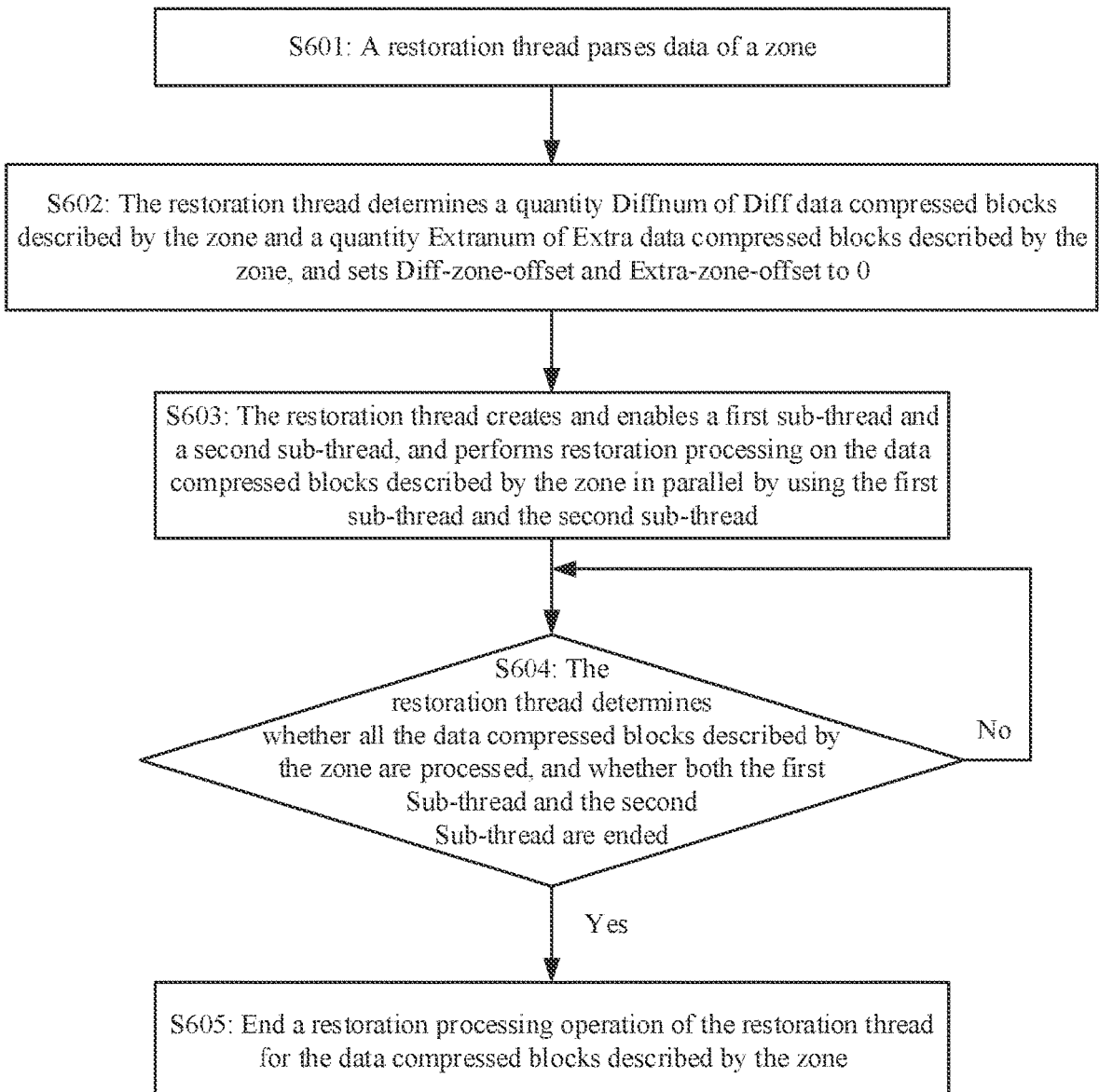

S601: A restoration thread parses data of a zone

S602: The restoration thread determines a quantity Diffnum of Diff data compressed blocks described by the zone and a quantity Extranum of Extra data compressed blocks described by the zone, and sets Diff-zone-offset and Extra-zone-offset to 0

S603: The restoration thread creates and enables a first sub-thread and a second sub-thread, and performs restoration processing on the data compressed blocks described by the zone in parallel by using the first sub-thread and the second sub-thread S604: The restoration thread determines whether all the data compressed blocks described by the zone are processed, and whether both the first Sub-thread and the second Sub-thread are ended No Yes S605: End a restoration processing operation of the restoration thread for the data compressed blocks described by the zone

DIFFERENTIAL FILE RESTORATION METHOD AND ELECTRONIC DEVICE

CROSS-REFERENCE TO RELATED APPLICATIONS

This application is a national stage of International Application No. PCT/CN2023/113549, filed on Aug. 17, 2023, which claims priority to Chinese Patent Application No. 202211101979.2, filed on Sep. 9, 2022. The disclosures of both of the aforementioned applications are hereby incorporated by reference in their entireties.

TECHNICAL FIELD

This application relates to the field of intelligent terminal technologies, and in particular, to a differential file restoration method and an electronic device.

BACKGROUND

To improve a function of a terminal device and enhance device stability, when a device defect or bug (bug) is repaired, firmware of the terminal device usually needs to be upgraded.

Currently, an online firmware upgrade is usually performed on a terminal device by using an over the air (Over the Air, OTA) technology. OTA upgrade manners mainly include a full package upgrade and a differential package upgrade. To improve upgrade package transmission efficiency and firmware upgrade efficiency, the terminal device mostly uses a differential package upgrade manner, that is, only a differential part of firmware is upgraded.

When the terminal device performs the online firmware upgrade in the differential package upgrade manner, the terminal device first needs to restore a differential file. An operation of restoring the differential file needs to occupy a RAM (Random Access Memory, random access memory) memory, and RAM memory space used by different terminal devices for differential file restoration is different. Therefore, when a firmware upgrade is performed in the differential package upgrade manner, a problem of how to improve restoration efficiency of a differential file needs to be resolved.

SUMMARY

To resolve the foregoing technical problem, embodiments of this application provide a differential file restoration method and an electronic device. In the method, the electronic device adaptively determines a parallel quantity of restoration threads based on a block size corresponding to a differential file and a size of RAM memory space used for differential file restoration, and performs restoration processing in parallel by using a plurality of threads, thereby improving restoration efficiency of the differential file.

According to a first aspect, an embodiment of this application provides a differential file restoration method. The method includes:

An electronic device obtains a differential file, where the differential file includes at least one group of data compressed blocks, the group of data compressed blocks includes differential Diff data compressed blocks and/or newly extra Extra data compressed blocks, and the data compressed blocks are divided based on a preset block size before being compressed:

the electronic device determines a parallel quantity k of restoration threads based on the block size and a size of RAM space used by the electronic device for differential file restoration, and divides a group of RAM space for each restoration thread; and the electronic device performs restoration processing on the differential file in parallel by using the k restoration threads, where each restoration thread performs restoration processing on the at least one group of data compressed blocks by using the group of RAM space corresponding to the restoration thread, and writes data obtained after restoration processing into a target file.

In this way, the electronic device adaptively determines a parallel quantity of restoration threads based on the block size corresponding to the differential file and the size of RAM memory space used for differential file restoration, and performs restoration processing in parallel by using a plurality of threads, thereby improving restoration efficiency of the differential file.

According to the first aspect, the group of RAM space may include a first RAM memory area, a second RAM memory area, a third RAM memory area, and a fourth RAM memory area; a size of each of the first RAM memory area and the second RAM memory area is the block size; the second RAM memory area and the fourth RAM memory area are respectively safety buffer areas of the first RAM memory area and the third RAM memory area, and a fifth RAM memory area is shared by the restoration threads, and the fifth RAM memory area is used to run a data compression algorithm.

In this way, the electronic device can implement a restoration operation on the data compressed block based on small RAM memory space. In addition, the safety buffer areas are set for the first RAM memory area and the third RAM memory area. For a case in which data increases after data compression, data processing accuracy is not affected.

According to the first aspect or any implementation of the first aspect, that the electronic device determines a parallel quantity k of restoration threads based on the block size and a size of RAM space used by the electronic device for differential file restoration includes: $k=[(M-N1)/(zonesize+N2)]$, where M is the size of RAM space used by the electronic device for differential file restoration, N1 is a size of the fifth RAM memory area, zonesize is the block size, N2 is a size of the safety buffer area, and [ ] is a rounding operation.

According to the first aspect or any implementation of the first aspect, Diff data corresponding to the Diff data compressed block is obtained based on a first operation; and performing restoration processing on the group of data compressed blocks by each restoration thread may include: The restoration thread sequentially performs data restoration processing on the Diff data compressed blocks or the Extra data compressed blocks in the group of data compressed blocks in a parsing sequence; each time a Diff data compressed block is obtained through parsing, performs a second operation on Diff data corresponding to the Diff data compressed block and existing data to obtain first target data, and writes the first target data into the target file, where the existing data is data that is read from an existing file corresponding to the differential file and that matches the Diff data compressed block, and the second operation is an inverse operation of the first operation; and each time an Extra data compressed block is obtained through parsing, performs data decompression on the Extra data compressed block to obtain second target data, and writes the second target data into the target file.

For example, the first operation is a subtraction operation, and the second operation is an addition operation.

In this way, when the electronic device performs restoration processing on the differential file, each restoration thread may use the Diff data compressed block or the Extra data compressed block as an independent differential restoration processing unit, so that RAM memory consumption on a terminal side is less, and the terminal side can implement a differential data restoration function by using small RAM memory space.

According to the first aspect or any implementation of the first aspect, that the electronic device performs a second operation on Diff data corresponding to the Diff data compressed block and existing data to obtain first target data, and writes the first target data into the target file may include: The electronic device temporarily stores the Diff data compressed block in the first RAM memory area; the electronic device performs data decompression processing on the Diff data compressed block, and temporarily stores an obtained Diff data block in the third RAM memory area; the electronic device reads existing data corresponding to the Diff data block from the existing file, and temporarily stores the existing data in the first RAM memory area; the electronic device performs the second operation on data in the first RAM memory area and data in the third RAM memory area, and temporarily stores the obtained first target data in the third RAM memory area, and the electronic device writes the first target data temporarily stored in the third RAM memory area into the target file.

According to the first aspect or any implementation of the first aspect, that the electronic device performs data decompression on the Extra data compressed block to obtain second target data, and writes the second target data into the target file may include: The electronic device temporarily stores the Extra data compressed block in the first RAM memory area; the electronic device performs data decompression processing on the Extra data compressed block, and temporarily stores the obtained second target data in the third RAM memory area; and the electronic device writes the second target data temporarily stored in the third RAM memory area into the target file.

According to the first aspect or any implementation of the first aspect, that each restoration thread performs restoration processing on the at least one group of data compressed blocks by using the group of RAM space corresponding to the restoration thread may include: The electronic device separately creates a linked list for each restoration thread based on a quantity of data compressed block groups included in the differential file and sequence numbers of the data compressed block groups, so that the restoration thread completes restoration processing on the at least one group of data compressed blocks based on a corresponding linked list, where in the linked list, a data part of a node is filled with a sequence number of a data compressed block group and a head address for writing restored data corresponding to the group of data compressed blocks into the target file.

According to the first aspect or any implementation of the first aspect, a data structure of the differential file includes a header, a control block, and a group of data compressed blocks described by using the control block; the header is filled with a magic number of the differential file and the block size; and the control block is filled with a first pointer offset and a second pointer offset, where the first pointer offset is used to determine, in the existing file, a data read head address corresponding to the group of data compressed blocks, and the second pointer offset is used to determine, in the target file, a data write head address corresponding to the group of data compressed blocks.

According to the first aspect or any implementation of the first aspect, the electronic device separately determines, based on residual results of dividing sequence numbers of the data compressed blocks by the parallel quantity, groups of data compressed blocks to be processed by each restoration thread.

According to the first aspect or any implementation of the first aspect, that each restoration thread performs restoration processing on the at least one group of data compressed blocks by using the group of RAM space corresponding to the restoration thread may include: Each restoration thread creates a first sub-thread and a second sub-thread; and the electronic device sequentially performs, by using the first sub-thread and the second sub-thread and by using the group of RAM space corresponding to the restoration thread, restoration processing on the Diff data compressed blocks or the Extra data compressed blocks included in the group of data compressed blocks, where when the second sub-thread performs execution to a target phase, the first sub-thread continues to perform restoration processing on a data compressed block in the group of data compressed blocks, when the first sub-thread performs execution to the target phase, the second sub-thread continues to perform restoration processing on a data compressed block in the group of data compressed blocks, and the target phase is that the data temporarily stored in the third RAM memory area is written into the target file.

In this way, when each restoration thread performs restoration processing on a group of data compressed blocks, there is no need to wait until a restoration processing procedure of a current data compressed block completely ends before starting a restoration procedure of a next data compressed block. Therefore, the first RAM memory area no longer has a waiting delay, restoration duration of the group of data compressed blocks is shortened, and processing efficiency of the restoration thread is improved.

According to a second aspect, an embodiment of this application provides an electronic device. The electronic device includes one or more processors; a memory; and one or more computer programs, where the one or more computer programs are stored in the memory, and when the computer programs are executed by the one or more processors, the electronic device is enabled to perform the differential file restoration method according to the first aspect and any implementation of the first aspect.

The second aspect and any implementation of the second aspect respectively correspond to the first aspect and any implementation of the first aspect. For technical effects corresponding to the second aspect and any implementation of the second aspect, refer to technical effects corresponding to the first aspect and any implementation of the first aspect. Details are not described herein again.

According to a third aspect, an embodiment of this application provides a computer-readable storage medium. The computer-readable storage medium includes a computer program, and when the computer program runs on an electronic device, the electronic device is enabled to perform the differential file restoration method according to the first aspect and any implementation of the first aspect.

The third aspect and any implementation of the third aspect respectively correspond to the first aspect and any implementation of the first aspect. For technical effects corresponding to the third aspect and any implementation of the third aspect, refer to technical effects corresponding to the first aspect and any implementation of the first aspect. Details are not described herein again.

According to a fourth aspect, an embodiment of this application provides a computer program product, including a computer program. When the computer program is run, a computer is enabled to perform the differential file restoration method according to the first aspect and any implementation of the first aspect.

The fourth aspect and any implementation of the fourth aspect respectively correspond to the first aspect and any implementation of the first aspect. For technical effects corresponding to the fourth aspect and any implementation of the fourth aspect, refer to technical effects corresponding to the first aspect and any implementation of the first aspect. Details are not described herein again.

According to a fifth aspect, this application provides a chip. The chip includes a processing circuit and a transceiver pin. The transceiver pin and the processing circuit communicate with each other through an internal connection channel. The processing circuit performs the differential file restoration method according to the first aspect and any implementation of the first aspect, to control a receive pin to receive a signal, and to control a transmit pin to send a signal.

The fifth aspect and any implementation of the fifth aspect respectively correspond to the first aspect and any implementation of the first aspect. For technical effects corresponding to the fifth aspect and any implementation of the fifth aspect, refer to technical effects corresponding to the first aspect and any implementation of the first aspect. Details are not described herein again.

BRIEF DESCRIPTION OF DRAWINGS

FIG. 4 is a schematic diagram of an example of a data structure of a differential file;

FIG. 8 is a diagram of an example of a data structure of a differential file according to an embodiment;

FIG. 10 is a diagram of an example of a data structure of a differential file according to an embodiment;

FIG. 11B is a schematic diagram of a data block division method according to an embodiment:

FIG. 20 is a schematic diagram of an example of an application scenario;

FIG. 23 is a diagram of an example of a data structure of a differential file according to an embodiment;

FIG. 24B is a schematic diagram of a change of an occupation state of a RAM memory area when data restoration is performed based on an Extra data compressed block according to an embodiment;

FIG. 25 is a schematic diagram of a processing procedure of a restoration thread according to an embodiment;

DESCRIPTION OF EMBODIMENTS

The following clearly and completely describes the technical solutions in the embodiments of this application with reference to the accompanying drawings in the embodiments of this application. Clearly, the described embodiments are some rather than all of the embodiments of this application. All other embodiments obtained by a person of ordinary skill in the art based on the embodiments of this application without creative efforts shall fall within the protection scope of this application.

In this specification, the term "and/or" is merely used to describe an association relationship between associated objects, and indicates that three relationships may exist. For example, A and/or B may indicate the following three cases: Only A exists, both A and B exist, and only B exists.

The terms "first", "second", and the like in the specification and claims of the embodiments of this application are used to distinguish between different objects, and are not used to describe a specific sequence of the objects. For example, a first target object, a second target object, and the like are used to distinguish between different target objects, but are not used to describe a specific sequence of the target objects.

In the embodiments of this application, words such as "example" or "for example" are used to indicate giving an example, an illustration, or a description. Any embodiment or design solution described as "an example" or "for example" in the embodiments of this application should not be explained as being more preferred or having more advantages than other embodiments or design solutions. Exactly, the words such as "example" or "for example" are used to present related concepts in a specific manner.

In the descriptions of the embodiments of this application, unless otherwise stated, "a plurality of" means two or more. For example, "a plurality of processing units" indicates two or more processing units, and "a plurality of systems" indicates two or more systems.

When a terminal device performs an online firmware upgrade, if a firmware upgrade is performed in an OTA differential package upgrade manner, the terminal device needs to have a capability of restoring a differential file, that is, generating a corresponding firmware file of a new version (hereinafter referred to as a new firmware file) based on the differential file and an existing firmware file (that is, a firmware file of an old version, hereinafter referred to as an old firmware file) corresponding to the differential file. Further, the terminal device may complete the firmware upgrade based on the firmware file of the new version.

Figure 1:
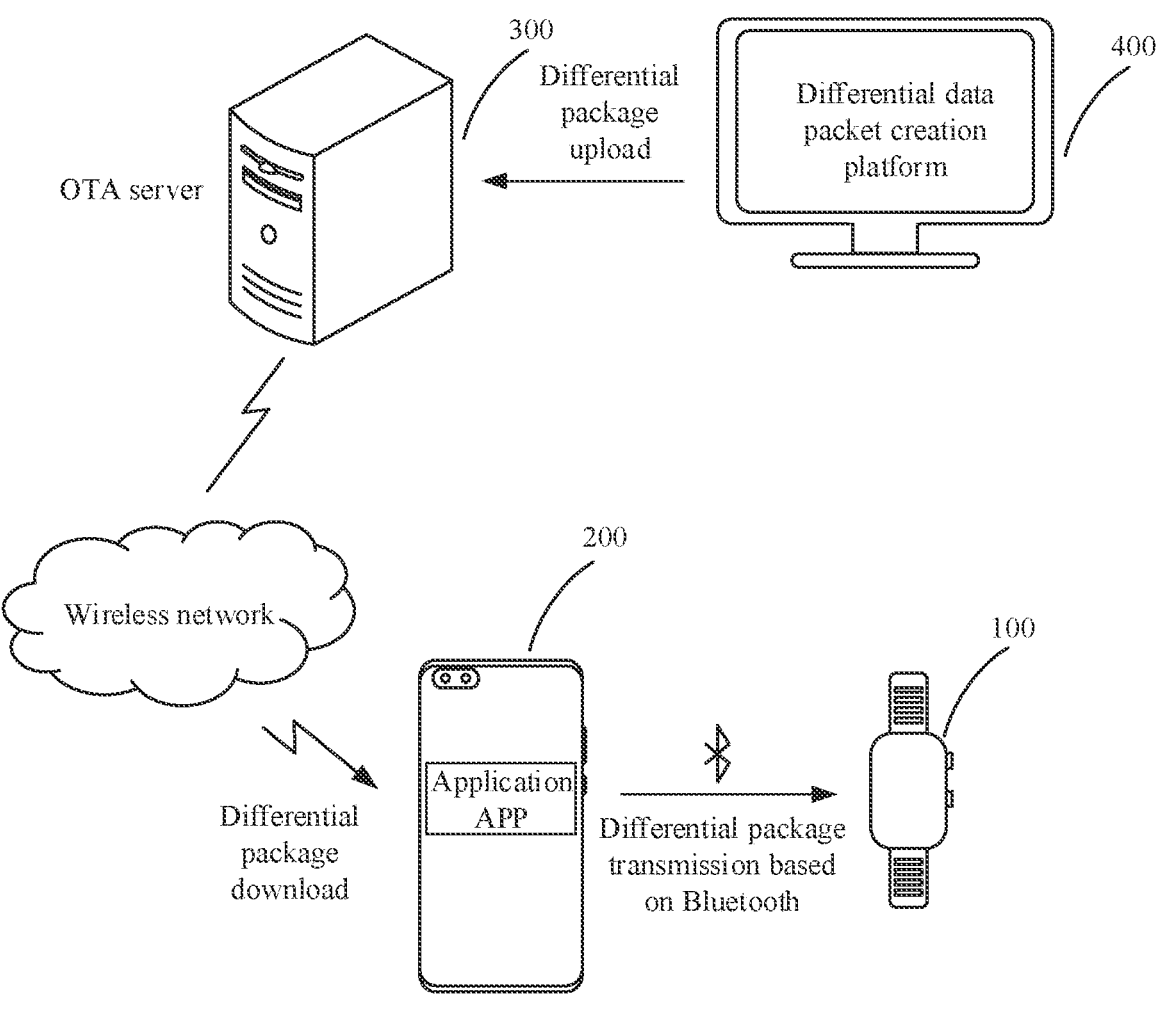
FIG. 1 is a schematic diagram of an example of an application scenario.

FIG. 1 shows an example of an application scenario. An example in which a smartwatch 100 is used for an online firmware upgrade is used for description. The smartwatch 100 is a low-end intelligent terminal device that does not have an independent networking function (or may also be referred to as a lightweight embedded device), and the smartwatch 100 may communicate with a smartphone 200 based on Bluetooth. Refer to FIG. 1. An application APP corresponding to the smartwatch 100 is installed in the smartphone 200. The application APP is used to connect the smartwatch 100 to the smartphone 200, and download an application, a file, or the like for the smartwatch 100. Further, the smartwatch 100 may communicate with an OTA server 300 by using the application APP. For example, the smartwatch 100 may periodically query, from the OTA server 300 by using the application APP, whether an upgrade differential package corresponding to the smartwatch 100 exists. If it is found that the upgrade differential package corresponding to the smartwatch 100 exists, an upgrade differential package download request may be sent to the OTA server 300 by using the application APP when an online upgrade condition (for example, a power state, a networking state, or a Bluetooth state meets a preset condition) is met, to download a corresponding upgrade differential package by using the smartphone 200. The smartphone may send the downloaded upgrade differential package to the smartwatch 100 by using a Bluetooth technology. Further, the smartwatch 100 may restore the upgrade differential package, and complete a firmware upgrade based on a firmware file of a new version that is obtained after restoration.

Still refer to FIG. 1. The upgrade differential package corresponding to the smartwatch 100 may be created based on a differential data packet creation platform 400 and uploaded to the OTA server 300. In some implementations, the upgrade differential package may alternatively be created in the OTA server 300. This is not limited in this embodiment. Regardless of whether the upgrade differential package is created based on the differential data packet creation platform 400 or the OTA server 300, the upgrade differential package is generated based on new and old firmware files and a corresponding differential algorithm.

In the application scenario shown in FIG. 1, the smartphone 200 is an intelligent terminal device that has an independent networking function, and serves as a relay device between the smartwatch 100 and the OTA server 300.

In some implementations, if the smartwatch 100 has an independent networking capability, the smartwatch 100 may directly communicate with the OTA server 300, to query, from the OTA server 300, whether the upgrade differential package corresponding to the smartwatch 100 exists, or download a corresponding upgrade differential package from the OTA server 300.

In the application scenario shown in FIG. 1, the smartwatch 100 is used as an example to explain a terminal device that has an online firmware upgrade requirement. The terminal device that has the online firmware upgrade requirement may alternatively be another wearable device, for example, a smart band or a smart headset, or may be any embedded node device (for example, a node device that collects information such as a temperature and humidity) in an Internet of Everything scenario. This is not limited in this embodiment. If the terminal device that has the online firmware upgrade requirement is a low-end device that does not have the independent networking function, the terminal device needs to communicate with the OTA server by using a relay device, to download the upgrade differential package by using the relay device. If the terminal device that has the online firmware upgrade requirement is a low-end device that has the independent networking function, the terminal device may directly communicate with the OTA server to download the upgrade differential package.

Figure 2:
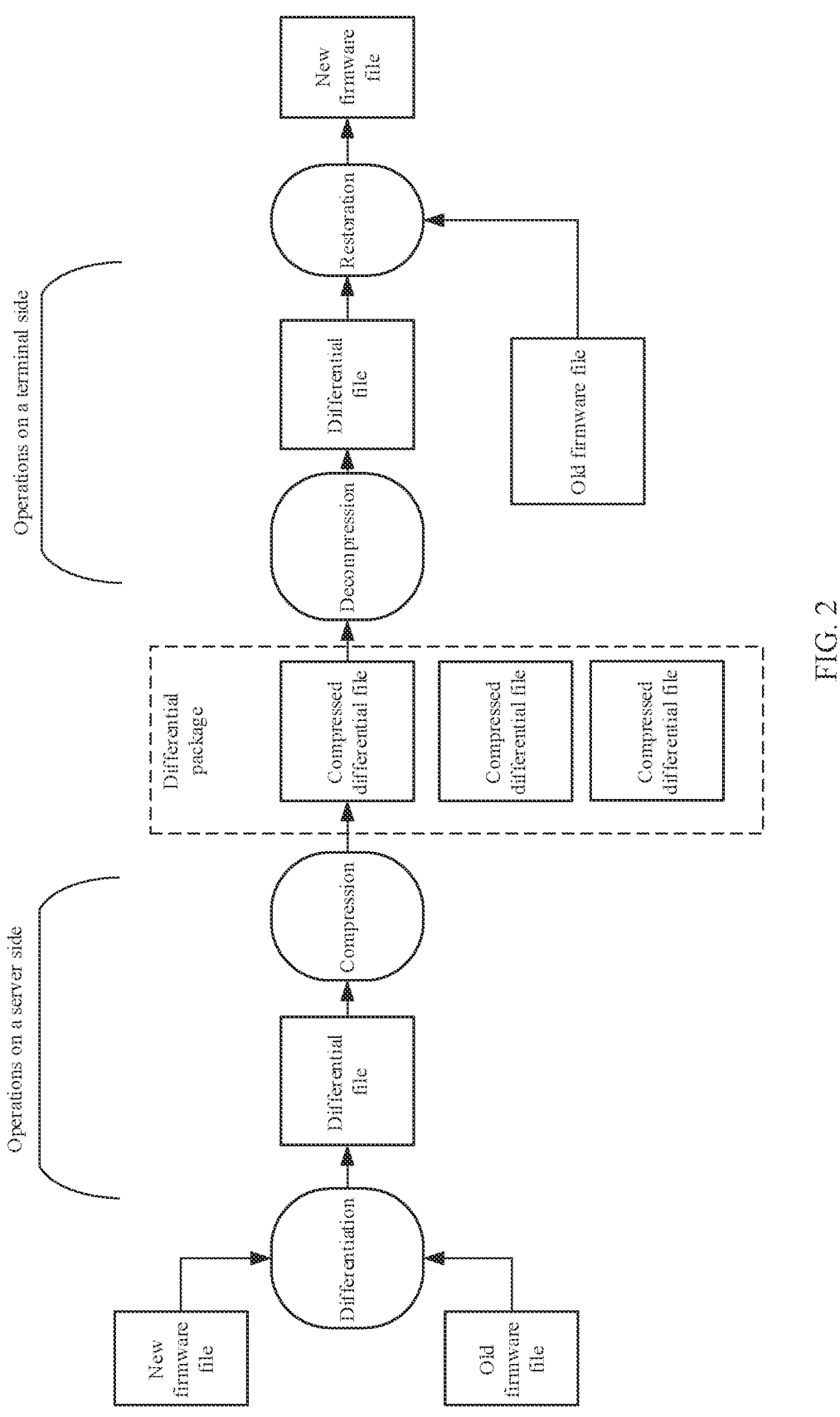
FIG. 2 is a schematic flowchart of an example of performing differentiation and restoration on a firmware file.

FIG. 2 is a schematic flowchart of an example of performing differentiation and restoration on a firmware file.

As shown in FIG. 2, on a server side (or a tool side), a server performs differentiation processing on a pair of new firmware file and old firmware file based on a preset differential algorithm (for example, a BSDiff algorithm), to obtain a differential file (Patch file). In this way, the server may obtain a plurality of differential files corresponding to a firmware upgrade. A quantity of differential files is related to to-be-upgraded firmware. This is not limited in this embodiment. Further, the server may compress and package the plurality of differential files to generate an upgrade differential package. The upgrade differential package may include a plurality of compressed differential files, a description file corresponding to the plurality of differential files, and the like.

When a terminal needs to perform the firmware upgrade, the terminal requests to download the upgrade differential package from the server. The terminal decompresses the upgrade differential package after receiving the upgrade differential package, to obtain the differential files. One differential file is used as an example. The terminal performs a restoration operation on the differential file based on an old firmware file that matches the differential file, to obtain a corresponding new firmware file. In this way, the terminal side may obtain a plurality of new firmware files, and may further perform a firmware upgrade operation based on the plurality of new firmware files.

Still refer to FIG. 2. In a procedure of performing differentiation and restoration on the firmware file, a file differentiation operation and a differential package compression operation are performed on the server side, and a differential package decompression operation and a differential file restoration operation are performed on the terminal side.

When the terminal is a lightweight embedded device (for example, a wearable device), a RAM resource of the terminal is limited, which seriously affects efficiency of differential package decompression and restoration processing, and may even cause a problem of a firmware upgrade failure due to an excessively large differential file. Therefore, if memory consumption related to a differential file restoration process can be smaller, the differential file restoration process is better applicable to a firmware upgrade scenario of the lightweight embedded device.

The following uses the BSDiff algorithm as an example to describe basic principles of a differentiation and restoration algorithm.

(1) Differentiation Principle (Bsdiff Principle)

A core idea of the differentiation principle is to create a new file by using data in an old file as much as possible, and adding new data as little as possible.

Figure 3:
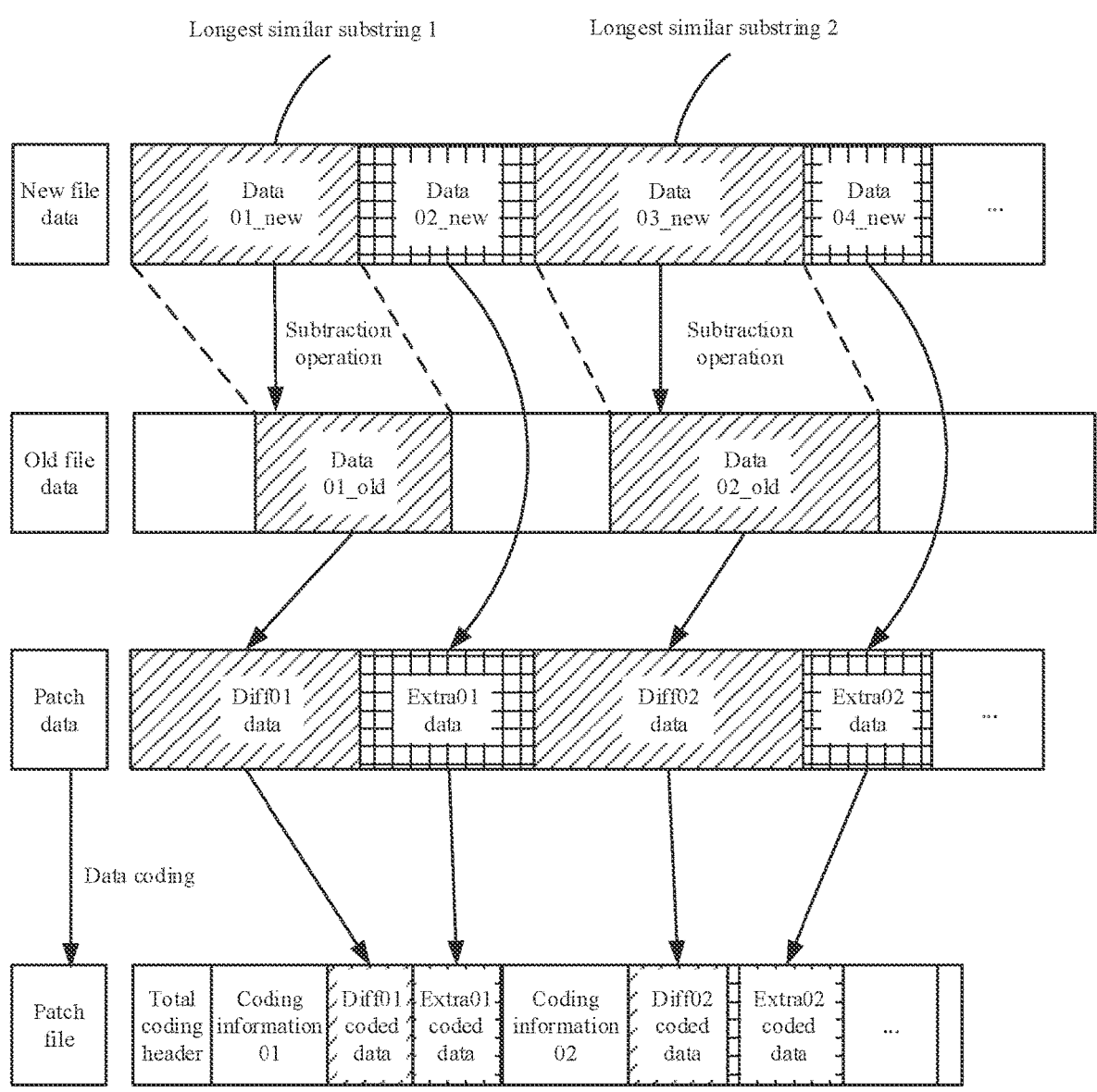
FIG. 3 is a schematic diagram of an example of a differentiation principle.

FIG. 3 shows an example of a file differentiation procedure based on the Bsdiff principle.

Refer to FIG. 3. Old file data and new file data are compared with each other to determine longest similar substrings (that is, substrings) from the old file data and the new file data. For example, if data 01_new in the new file data is "1010101010101010101" and data 01_old in the old file data is "1010101110101011101", the data 01_new in the new file data and the data 01_old in the old file data are longest similar substrings. For another example, data 03_new in the new file data and data 02_old in the old file data are other longest similar substrings. For example, in the new file data, if data 02_new is between the data 01_new and the data 03_new, and there is no substring similar to the data 02_new in the old file data, the data 02_new is data newly added to a new file. Similarly, data 04_new is also newly extra data in the new file data.

Therefore, differential data (Diff data) may be calculated based on the similar substrings in the new file data and the old file data, and the differential data and the newly extra data (Extra data) together constitute incremental upgrade data (Patch data). As shown in FIG. 3, a subtraction operation is performed on the data 01_new in the new file and the data 01_old in an old file to obtain Diff data 01 in the Patch data, and a subtraction operation is performed on the data 03_new in the new file and the data 02_old in the old file to obtain Diff data 02 in the Patch data. In addition, the data 02_new in the new file may be directly used as Extra01 data in the Patch data, and the data 04_new in the new file may be directly used as Extra02 data in the Patch data. By analogy, all Diff data and Extra data can be obtained based on the new file data and the old file data to form the Patch data.

It should be noted that, usually, in the Patch data obtained based on the BSDiff algorithm, the Diff data and the Extra data appear in pairs, and each piece of Diff data is followed by one piece of Extra data. It may be understood that the Patch data includes at least one group of incremental upgrade data, and each group of incremental upgrade data usually includes the Diff data and the Extra data. In some special cases, the Diff data and the Extra data may not appear in pairs. For example, only Diff data or only Extra data may be included in the last group of incremental upgrade data in the Patch data.

It should be noted that sorting and location offsets of the Diff data and the Extra data in the Patch data are consistent with those in the new file data. Therefore, the new file data corresponding to the Patch data can be obtained by sequentially performing data restoration processing on the Diff data and the Extra data in the Patch data.

It should be noted that, in the Patch data obtained based on the BSDiff algorithm, after the Patch data is obtained based on the new file data and the old file data, data coding may be performed on the Patch data to obtain a corresponding Patch file.

FIG. 3 shows an example of a data structure of a Patch file. The data structure includes a total coding header, a group of Diff data and Extra data, and coding information corresponding to the group of Diff data and Extra data. Coding information corresponding to a specific group of Diff data and Extra data is used to describe the group of Diff data and Extra data, for example, describe a byte length of the Diff data, a byte length of the Extra data, and a pointer offset for reading data from the old file.

FIG. 4 shows an example of a data structure of a Patch file. As shown in FIG. 4, the data structure of the Patch file includes a header (Header), a control block (control block), a Diff block (differential data block), and an Extra block (newly extra data block).

The Header includes eight bytes, and is used to be filled with a magic number. Herein, the magic number is used to determine a file type.

Each control block includes 24 bytes, and is used to describe a group of Diff blocks and Extra blocks. To be specific, data recorded in the control block may be used as coding information of the group of Diff blocks and Extra blocks described by the control block. The first eight bytes of the control block are used to be filled with a byte length of the Diff block described by the control block. The middle eight bytes of the control block are used to be filled with a byte length of the Extra block described by the control block. The last eight bytes of control block are used to be filled with a pointer offset, and the pointer offset is used to determine a location for reading data (data used to be subjected to an addition operation with the Diff data) from an old file.

For example, each control block may be represented by (x, y, z), where x is the byte length of the Diff blocks and is used to indicate to read x bytes from each of the old file and the Diff block to perform the addition operation; y is the byte length of the Extra block and is used to indicate to read y bytes from the Extra block to add the y bytes to a new file; and z is the pointer offset of the old file and is used to determine a pointer location for reading the data from the old file next time, that is, is used to determine a pointer offset occurring after data is read from the old file this time. When the offset represented by z uses a current location of a pointer as a reference, z may represent an offset direction by using a positive or negative value, for example, a positive value represents a forward offset, and a negative value represents a backward offset.

The Diff block is used to record Diff data, that is, used to record a difference between longest similar substrings in the old file and the new file.

The Extra block is used to record Extra data, that is, used to record newly extra data in the new file.

Before a plurality of Patch files are packaged, the Patch files may be further compressed.

In a possible implementation, when compression is performed on a Patch file with the data structure shown in FIG. 4, compression may be performed for data blocks, that is, each control block (that is, a control block 1, a control block 2, or a control block n), each Diff block (that is, a Diff block 1, a Diff block 2, or a Diff block n), and each Extra block (that is, an Extra block 1, an Extra block 2, or an Extra block n) are separately compressed.

In a possible implementation, when compression is performed on a Patch file with the data structure shown in FIG. 4, compression may be performed for an entire file, that is, the Header, a control block 1, a Diff block 1, an Extra block 1, a control block 2, a Diff block 2, an Extra block 2, . . . , a control block n, a Diff block n, and an Extra block n are compressed as a whole.

In a possible implementation, when compression is performed on a Patch file with the data structure shown in FIG. 4, a manner in which an entire file is divided, based on a preset size, into x subfiles for compression may be used. Assuming that a size of the entire file is N, a size of each subfile is N/x.

In a possible implementation, w % ben compression is performed on a Patch file with the data structure shown in FIG. 4, compression may be performed based on a data block type, that is, a plurality of control blocks (that is, a control block 1, a control block 2, . . . , and a control block n), a plurality of Diff blocks (that is, a Diff block 1, a Diff block 2, . . . , and a Diff block n), and a plurality of Extra blocks (that is, an Extra block 1, an Extra block 2, . . . , and an Extra block n) are separately compressed.

In this way, after the server separately performs differentiation processing on groups of new firmware files and old firmware files to obtain the plurality of Patch files, the server separately compresses and packages the plurality of Patch files to obtain a corresponding upgrade differential package, so that the terminal queries and downloads the upgrade differential package.

(2) Restoration Principle (Bspatch Principle)

Corresponding to the foregoing bsdiff principle, Patch file restoration is performed based on the bspatch principle in the BSDiff algorithm. The bspatch principle may be understood as an inverse process of the bsdiff principle, that is, Patch file restoration may be understood as an inverse process of Patch file generation.

Figure 5:
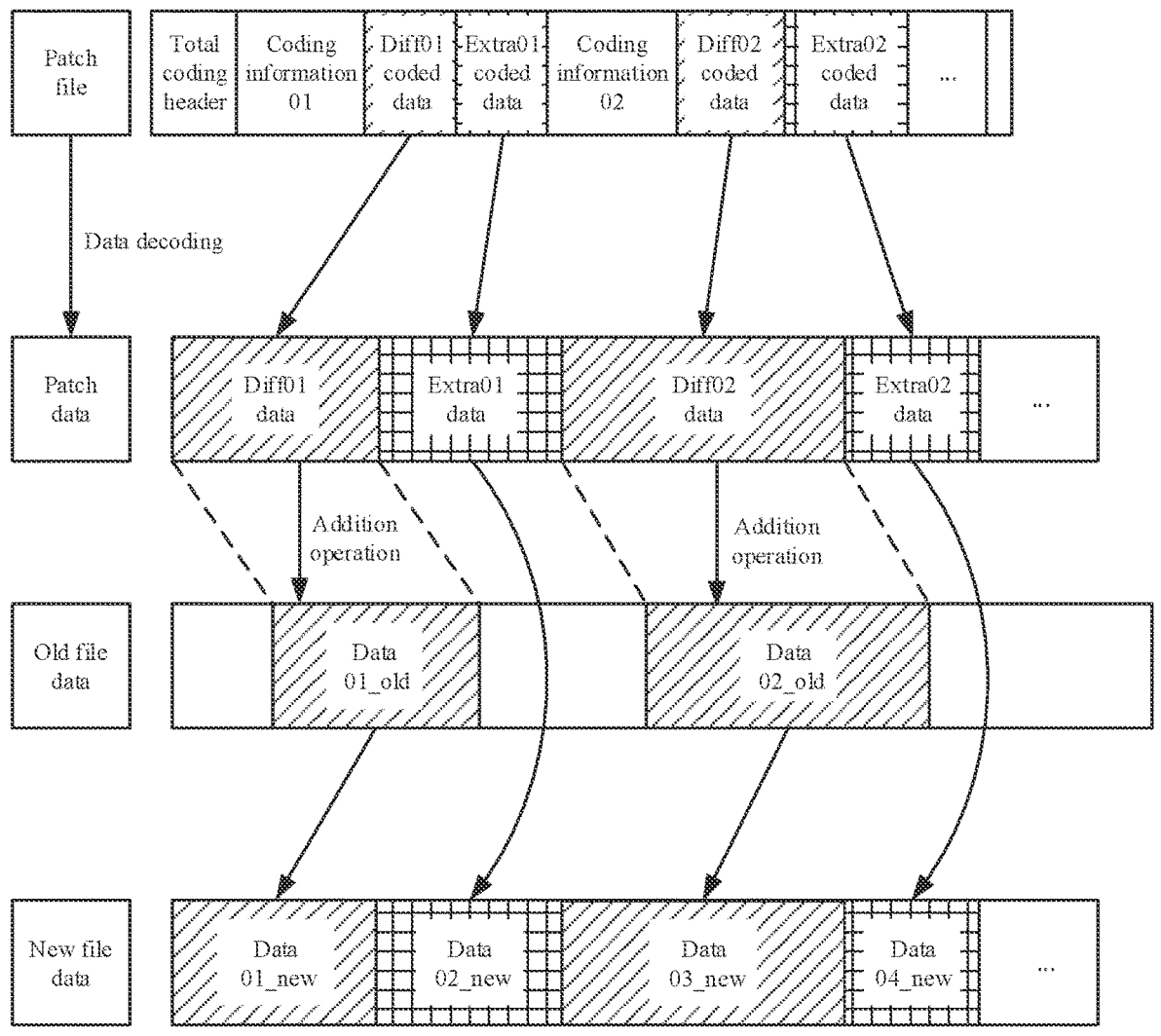
FIG. 5 is a schematic diagram of an example of a restoration principle.

FIG. 5 shows an example of a file restoration procedure based on the bspatch principle.

Refer to FIG. 5. Data decoding is performed on a Patch file to obtain corresponding Patch data. Herein, a process of performing data decoding on the Patch file may be understood as an inverse process of performing data coding on Patch data.

For a data structure of the Patch file, refer to the foregoing descriptions of FIG. 4. Details are not described herein again. Therefore, in the Patch data obtained by performing data decoding on the Patch file, Diff data and Extra data appear in pairs, and each piece of Diff data is followed by one piece of Extra data. In addition, sorting of pairs of Diff data and Extra data in the Patch data is consistent with that of new file data.

When obtaining the Patch file, the terminal parses a header of the Patch file. After learning of a file type based on a magic number recorded in the header, the terminal may perform a data decoding operation based on a data structure corresponding to the file type. After obtaining one piece of Diff data or Extra data through decoding, the terminal performs file restoration based on this piece of Diff data or Extra data.

Refer to FIG. 4. In the Patch file, each control block is used to describe one pair of Diff block and Extra block. Therefore, the terminal may obtain corresponding Diff data and Extra data based on content recorded in the control block, and perform restoration processing based on the obtained Diff data and Extra data to obtain data in a new file.

Diff01 data and Extra01 data in the Patch data are used as examples. When new file data restoration is performed, the Diff01 data is read, data 01_old that matches the Diff01 data is read from an old file, an addition operation is performed on the Diff01 data and the data 01_old to obtain data 01_new, and the data 01_new is written into the new file; and the Extra01 data is read, and is directly written into the new file as data 02_new. Similarly, Diff82 data is continuously read, data 02_old that matches the Diff02 data is read from the old file, the addition operation is performed on the Diff02 data and the data 02_old to obtain data 03_new, and the data 03_new is written into the new file; and Extra02 data is read, and is directly written into the new file as data 04_new. By analogy, the terminal may obtain all data in the new file based on the Patch data in the Patch file and related data in the old file.

Figure 6:
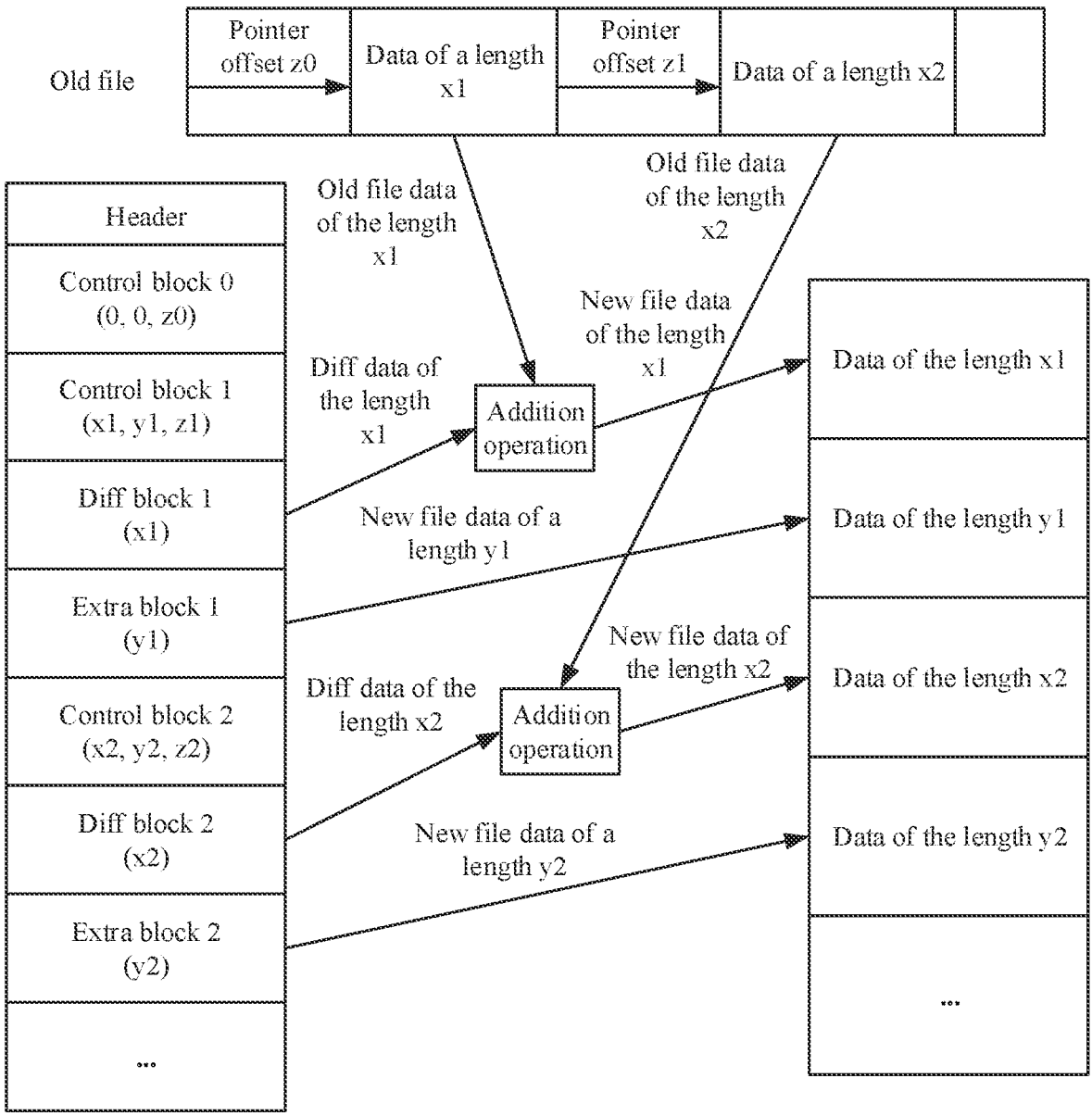
FIG. 6 is a schematic diagram of an example of a data restoration operation.

With reference to FIG. 6, the following describes, by using an example in which each control block is represented by $(x, y, z)$, a procedure of performing restoration based on the Patch file.

As shown in FIG. 6, in the Patch file, content filled in a control block 1 is $(x1, y1, z1)$, and is used to describe a Diff block 1 and an Extra block 1. A byte length of the Diff block 1 is x1, and a byte length of the Extra block 1 is x2.

The terminal parses the Patch file to obtain $(x1, y1, z1)$ filled in the control block 1. First, the terminal continues to read Diff data of the length x1 from the Patch file and read data of the length x1 from the old file, performs the addition operation on the two pieces of data of the length x1 to obtain new file data of the length x1, and writes the new file data into the new file (or referred to as a target file). Then, the terminal continues to read Extra data of the length y1 from the Patch file, and directly writes the Extra data into the new file as new file data of the length y1.

For example, in the file data structure shown in FIG. 4, a control block 0 may be further included behind the header and in front of the control block 1, and $(0, 0, z0)$ is filled in the control block 0, z0 is filled in the control block 0 to determine a pointer offset for reading data of the length x1 from the old file. Because a current location of an old file pointer is a start location of the old file, after the old file pointer is offset from the start location of the old file by z0, old file data that is of the length x1 and that matches the Diff data of the length x1 may be read from the old file.

Similarly, the terminal continues to parse the Patch file, and reads $(x2, y2, z2)$ filled in a control block 2. First, the terminal continues to read Diff data of the length x2 from the Patch file and read data of the length x2 from the old file, performs the addition operation on the two pieces of data of the length x2 to obtain new file data of the length x2, and writes the new file data into the new file. After the old file pointer is offset from a current location by z, old file data that is of the length x2 and that corresponds to the Diff data of the length x2 may be read from the old file. Then, the terminal continues to read Extra data of a length y2 from the Patch file, and directly writes the Extra data into the new file as new file data of the length y2.

By analogy, the terminal can obtain the new file based on the Patch file and the old file, and complete a restoration procedure of the new file.

In this way, the terminal can implement restoration on new files based on Patch files in an upgrade differential package and corresponding old files.

However, in the Patch file obtained based on the BSDiff algorithm, because the Diff block is determined based on the longest similar substrings of the new file and the old file, and the Extra block is determined based on the newly extra data in the new file, the byte lengths of the Diff block and the Extra block are not fixed and are not limited. The byte lengths of the Diff block and the Extra block are related to a difference between the new file and the old file, and may be tens of KB or hundreds or even thousands of KB.

When the terminal performs restoration processing on the Patch file, a size of RAM memory space required by the terminal is directly related to the byte length of the Diff block or the Extra block. A larger byte length of the Diff block or the Extra block indicates larger RAM memory space required by the terminal for processing the Diff block or the Extra block. For example, if the byte length of the Diff block is 200 KB, the terminal needs to allocate RAM memory space of at least above 200 KB for processing. When the RAM memory space of the terminal is limited, the terminal cannot or is difficult to meet a requirement for processing the Diff block or the Extra block. Therefore, the data structure of the Patch file obtained based on the BSDiff algorithm is extremely unfriendly to a firmware differential package upgrade scenario of a lightweight embedded device.

To resolve the foregoing technical problem, so that RAM memory consumption of the terminal that is related to a differential file restoration process can be smaller, an embodiment provides a differential file generation method, and the differential file generation method is applied to a server side. A server mentioned herein may be understood as any electronic device configured to generate a differential file.

Figure 7:
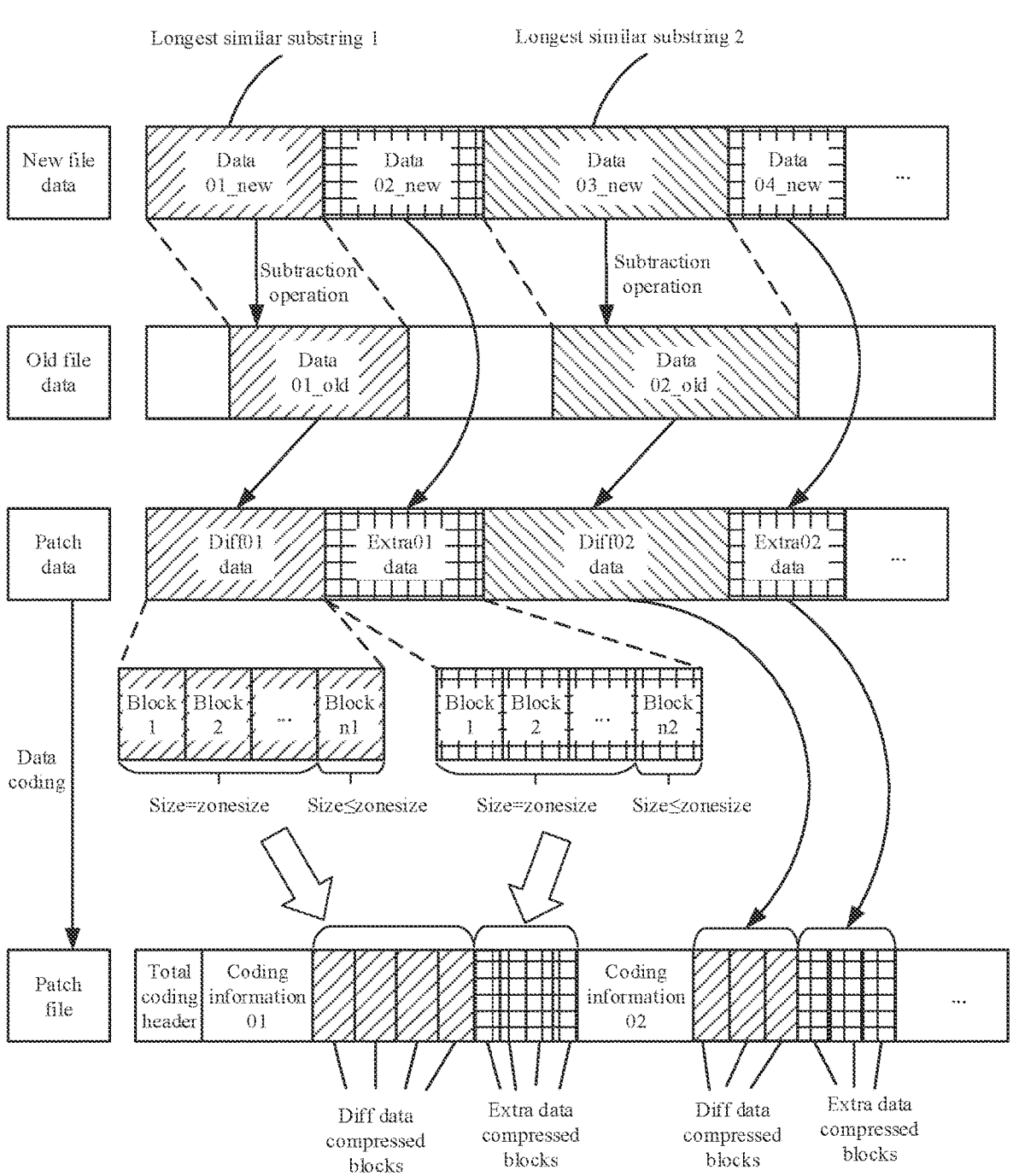
FIG. 7 is a schematic diagram of a differential file generation method according to an embodiment.

FIG. 7 shows an example of a file differentiation procedure based on the Bsdiff principle according to an embodiment.

As described above, old file data and new file data are compared with each other to determine longest similar substrings (that is, substrings) from the old file data and the new file data. For example, if data 01_new in the new file data is "1010101010101010101" and data 01_old in the old file data is "10101011101010110101", the data 01_new in the new file data and the data 01_old in the old file data are longest similar substrings. For another example, data 03_new in the new file data and data 02_old in the old file data are other longest similar substrings. For example, in the new file data, if data 02_new is between the data 01_new and the data 03_new, and there is no substring similar to the data 02_new in the old file data, the data 02_new is data newly added to a new file. Similarly, data 04_new is also newly extra data in the new file data.

Therefore, differential data (Diff data) may be calculated based on the similar substrings in the new file data and the old file data, and the differential data and the newly extra data (Extra data) together constitute incremental upgrade data (Patch data). As shown in FIG. 7, a subtraction operation is performed on the data 01_new in the new file and the data 01_old in an old file to obtain Diff data 01 in Patch data, and a subtraction operation is performed on the data 03_new in the new file and the data 02_old in the old file to obtain Diff data 02 in the Patch data. In addition, the data 02_new in the new file may be directly used as Extra01 data in the Patch data, and the data 04_new in the new file may be directly used as Extra02 data in the Patch data. By analogy, all Diff data and Extra data can be obtained based on the new file data and the old file data to form the Patch data.

It should be noted that, in the Patch data obtained based on the BSDiff algorithm, the Diff data and the Extra data appear in pairs, and each piece of Diff data is followed by one piece of Extra data. In addition, location offsets of pairs of Diff data and Extra data in the Patch data are consistent with those of the new file data.

After the Patch data is obtained, the server side divides the Diff data and the Extra data in the Patch data into blocks based on a block size (zonesize). Each Diff data block and each Extra data block are minimum independent processing data units used when the terminal performs restoration on a differential file.

zonesize may be determined based on RAM memory space on the terminal side, and may be specifically determined based on a size of continuous RAM memory space that may be used on the terminal side for differential file restoration, zonesize may also be understood as a maximum quantity of processing bytes supported by the RAM memory space when the terminal performs Diff data restoration processing.

Still refer to FIG. 7. The Diff data 01 in the Patch data is divided into n1 Diff data blocks based on zonesize. In the n1 Diff data blocks, a data size (or referred to as a byte length) of each of the first (n1-1) Diff data blocks is zonesize, and a data size of the last Diff data block is less than or equal to zonesize. Data sorting of the n1 Diff data blocks is the same as that of the Diff data 01. Similarly, the Extra data 01 in the Patch data is also divided into n2 Extra data blocks based on zonesize. In the n2 Extra data blocks, a data size of each of the first (n2-1) Extra data blocks is zonesize, and a data size of the last Extra data block is less than or equal to zonesize. Data sorting of the n2 Extra data blocks is the same as that of the Extra data 01.

For example, when a RAM memory area used by a terminal device for differential file restoration is not multiplexed, the continuous RAM memory space used by the terminal device for differential file restoration may be divided into a first RAM memory area, a second RAM memory area, a third RAM memory area, and a fourth RAM memory area, where the first RAM memory area, the second RAM memory area, and the third RAM memory area are jointly used for a data storage operation related to Diff data block restoration processing and a data storage operation related to Extra data block restoration processing, and the fourth RAM memory area is used for a data decompression operation.

Assuming that the RAM memory space used by the terminal device for differential file restoration is M, and memory space required for performing the data decompression operation by a data compression algorithm is N1 (that is, memory space of the fourth RAM memory area is N1), the first RAM memory area, the second RAM memory area, and the third RAM memory area may equally share the remaining RAM memory space, that is, memory space of each of the first RAM memory area, the second RAM memory area, and the third RAM memory area is (M−N1)/3. In this case, zonesize may be set to (M−N1)/3. For example, when M is 200 KB and N1 is 20 KB, the RAM memory space is divided into: a first RAM memory area of 60 KB, a second RAM memory area of 60 KB, a third RAM memory area of 60 KB, and a fourth RAM memory area of 20 KB. In this case, zonesize=60 KB, and it indicates that the terminal device may perform data restoration processing on Diff data or Extra data of 60 KB each time.

For another example, when the RAM memory area used by the terminal device for differential file restoration is multiplexed, a RAM memory may be sequentially divided into a first RAM memory area, a second RAM memory area, a third RAM memory area, a fourth RAM memory area, and a fifth RAM memory area, where the first RAM memory area and the third RAM memory area are jointly used for a data storage operation related to Diff data block restoration processing and a data storage operation related to Extra data block restoration processing, and the fifth RAM memory area is used for a data decompression operation. The second RAM memory area is located between the first RAM memory area and the third RAM memory area, and is a safety buffer area of the first RAM memory area. The fourth RAM memory area is located between the third RAM memory area and the fifth RAM memory area, and is a safety buffer area of the third RAM memory area.

It is assumed that the RAM memory space used by the terminal device for differential file restoration is M, memory space required for performing the data decompression operation by a data compression algorithm is N1 (that is, memory space of the fifth RAM memory area is N1), and memory space required for the safety buffer area is N2. In this case, the first RAM memory area and the third RAM memory area may equally share the remaining space, that is, memory space of each of the first RAM memory area and the third RAM memory area is $(M-N1-N2*2)/2$. In this case, zonesize may be set to $(M-N1-N2*2)/2$. For example, when M is 200 KB, N1 is 16 KB, and N2 is 2 KB, the RAM memory space is divided into: a first RAM memory area of 90 KB, a second RAM memory area of 2 KB, a third RAM memory area of 90 KB, a fourth RAM memory area of 2 KB, and a fifth RAM memory area of 16 KB. In this case, zonesize=90 KB, and it indicates that the terminal device may perform data restoration processing on Diff data or Extra data of 90 KB each time.

In some special cases, a data size obtained after data compression needs to be greater than a data size obtained before data compression. Because the data size of the Diff data block or the Extra data block before compression is the same as sizes of the first RAM memory area and the third RAM memory area, once a size of a Diff data compressed block or an Extra data compressed block becomes larger, normal data restoration processing is affected by spill of the first RAM memory area or the third RAM memory area. Therefore, the safety buffer area may be set to effectively avoid a problem that a data restoration exception is caused by spill of the RAM memory area when the size of the Diff data compressed block or the Extra data compressed block is increased.

For another example, when the RAM memory area used by the terminal device for differential file restoration is multiplexed, the continuous RAM memory space used by the terminal device for differential file restoration may be divided into a first RAM memory area, a third RAM memory area, and a fifth RAM memory area, where the first RAM memory area and the third RAM memory area are jointly used for a data storage operation related to Diff data block restoration processing and a data storage operation related to Extra data block restoration processing, and the fifth RAM memory area is used for a data decompression operation.

Assuming that the RAM memory space used by the terminal device for differential file restoration is M, and memory space required for performing the data decompression operation by a data compression algorithm is N1 (that is, memory space of the third RAM memory area is N1), the first RAM memory area and the second RAM memory area may equally share the remaining space, that is, memory space of each of the first RAM memory area and the second RAM memory area is $(M-N1)/2$. In this case, zonesize may be set to $(M-N1)/2$. For example, when M is 20 KB and N1 is 16 KB, the RAM memory space is divided into: a first RAM memory area of 2 KB, a second RAM memory area of 2 KB, and a third RAM memory area of 16 KB. In this case, zonesize=2 KB, and it indicates that the terminal device may perform data restoration processing on Diff data or Extra data of 2 KB each time.

In some extreme cases, if the continuous RAM memory space that can be used by the terminal device for differential file restoration is quite small, for example, 20 KB, the safety buffer area may not be set.

An operation of performing data restoration based on the areas of the RAM memory space that is applied for by the terminal is described in detail in a subsequently described Patch file restoration procedure. Details are not described herein.

After data block division and compression are performed on the Diff data and the Extra data in the Patch data, data coding may be performed on the Patch data obtained after block division and compression, to obtain a corresponding Patch file.

In this embodiment, the data compression algorithm used to perform data compression on the Diff data block or the Extra data block uses a data compression algorithm with low memory consumption and a high decompression speed, for example, a lossless decompression algorithm such as LZMA (Lempel-Ziv-Markov chain-Algorithm) or miniLZO (Lempel-Ziv-Oberhumer), to reduce RAM memory space occupied when the terminal device performs differential file data restoration.

FIG. 7 shows an example of a data structure of a Patch file. The data structure includes a total coding header, a plurality of Diff data compressed blocks and a plurality of Extra data compressed blocks, and coding information corresponding to the plurality of Diff data compressed blocks and the plurality of Extra data compressed blocks. The coding information corresponding to the plurality of Diff data compressed blocks and the plurality of Extra data compressed blocks is used to describe a total byte length obtained before a plurality of Diff data blocks are compressed, a total byte length obtained before a plurality of Extra data blocks are compressed, byte lengths obtained after the Diff data blocks are compressed, byte lengths obtained after the Extra data blocks are compressed, and a pointer offset for reading data corresponding to the Diff data compressed block from the old file.

In addition to a magic number, the total coding header may further include a zonesize field, a value of the zonesize field is used to represent a block size for dividing Diff data and Extra data, and may be used to combine with the coding information, so that the terminal performs data addressing when performing data restoration. For example, the terminal may determine an offset of an old file pointer based on the value of the zonesize field, to read old file data respectively corresponding to the Diff data compressed blocks from the old file. For another example, the terminal may determine a quantity of Diff data blocks or a quantity of Extra data blocks based on the value of the zonesize field and the total byte length obtained before the plurality of Diff data blocks are compressed or the total byte length obtained before the plurality of Extra data blocks are compressed.

In another example, the total coding header does not include the zonesize field, but the zonesize field is separately set in pieces of coding information. This is not limited in this embodiment.

In still another example, a quantity of Diff data compressed blocks, a quantity of Extra data compressed blocks, byte lengths obtained before and after each Diff data compressed block is compressed, and byte lengths obtained before and after each Extra data compressed block is compressed are set in the pieces of coding information.

For the data structure of the Patch file, description information (or referred to as the coding information) of the Diff data compressed block and the Extra data compressed block is not limited in this embodiment, provided that the terminal side can implement data addressing in the Patch file and the old file based on corresponding description information, and perform restoration based on the Diff data compressed blocks and the Extra data compressed blocks to obtain the target file.

FIG. 8 shows an example of a data structure of a Patch file according to an embodiment. As shown in FIG. 8, the data structure of the Patch file includes a header (Header), a control block (zone), Diff data, and Extra data.

The Header includes 16 bytes, and is used to be filled with a magic number and zonesize.

Each zone includes 24 bytes, and is used to describe a plurality of Diff data compressed blocks and a plurality of Extra data compressed blocks. The plurality of Diff data compressed blocks and the plurality of Extra data compressed blocks correspond to a pair of Diff data and Extra data in the Patch data obtained based on the BSDiff algorithm. Data recorded in the zone may be used as coding information of the plurality of Diff data compressed blocks and the plurality of Extra data compressed blocks that are described by the zone. The first eight bytes of the zone may record a total byte length of corresponding Diff data before the plurality of Diff data compressed blocks are compressed, and description information (for example, byte lengths obtained after compression) of the Diff data compressed blocks; the middle eight bytes of the zone may record a total byte length of corresponding Extra data before the plurality of Extra data compressed blocks are compressed, and description information (for example, byte lengths obtained after compression) of the Extra data compressed blocks; and the last eight bytes of the zone are used to be filled with a pointer offset, where the pointer offset is used to determine a location for reading data (that is, data used to be subjected to an addition operation with a Diff data block) from the old file.

In an optional implementation, the pointer offset filled in the last eight bytes of the zone may be an offset determined based on a current location of a pointer, and an offset direction is identified by using a positive or negative offset.

In another optional implementation, the pointer offset filled in the last eight bytes of the zone may be an offset determined based on a file start location.

The Diff data includes one or more Diff data compressed blocks, and each Diff data compressed block is used to record data obtained after a Diff data block is compressed.

The Extra data includes one or more Extra data compressed blocks, and each Extra data compressed block is used to record data obtained after an Extra data block is compressed.

In this way, in the Patch file, each Diff data compressed block or Extra data compressed block may be used as a data unit that can be independently processed when the terminal performs data restoration, thereby reducing RAM memory consumption when the terminal performs data restoration.

In an optional implementation, when the Patch file is generated based on the Patch data, each Diff data block and each Extra data block may be further separately compressed, and block coding information is added to the data compressed blocks. The block coding information may be used as a block header of the data compressed block, and corresponding Diff compressed data or Extra compressed data is used as block data of the data compressed block.

Figure 9:
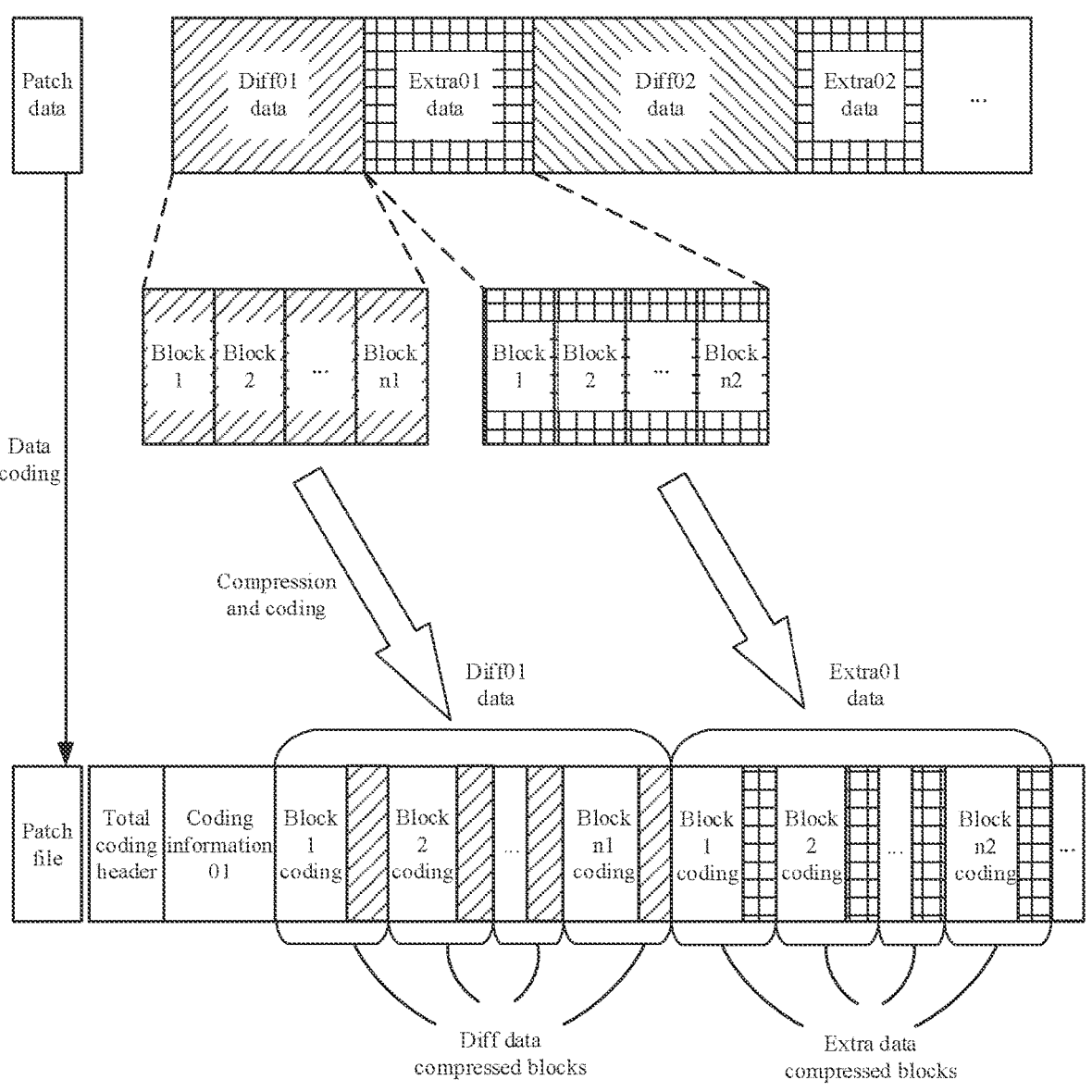
FIG. 9 is a schematic diagram of a differential file generation method according to an embodiment.

Diff data 01 and Extra data 01 in the Patch data are used as examples. FIG. 9 shows an example of a data structure of a Patch file. As shown in FIG. 9, the Diff data 01 in the Patch data is divided into n1 Diff data blocks based on zonesize, and each Diff data block is separately compressed to obtain a corresponding Diff data compressed block. In the Patch file, coding information used to describe each Diff data compressed block is filled in front of the Diff data compressed block. For example, the coding information of the Diff data compressed block may include but is not limited to a data size (csize) obtained before a Diff data block is compressed and a data size (usize) obtained after the Diff data block is compressed.

Similarly, still referring to FIG. 9, the Extra data 01 in the Patch data is divided into n2 Extra data blocks based on zonesize, and each Extra data block is separately compressed to obtain a corresponding Extra data compressed block. In the Patch file, coding information used to describe each Extra data compressed block is filled in front of the Extra data compressed block. For example, the coding information of the Extra data compressed block may include but is not limited to a data size (csize) obtained before an Extra data block is compressed and a data size (usize) obtained after the Extra data block is compressed.

Other Diff data and Extra data in the Patch data are also the same. Details are not described herein again. Therefore, after obtaining corresponding block coding information for each Diff data compressed block and each Extra data compressed block through parsing, the terminal may use the Diff data compressed block or the Extra data compressed block as a data unit that can be independently processed, to perform a data restoration operation. An operation of performing target file restoration by using the Diff data compressed block or the Extra data compressed block as a data processing unit is described in detail in a subsequently described Patch file restoration procedure. Details are not described herein.

It should be noted that, referring to FIG. 9, coding information 01 is used to describe the Diff data 01 and the Extra data 01, that is, used to describe a total data size obtained before Diff data compressed blocks 1-n1 are compressed, a total data size obtained before Extra data compressed blocks 1-n2 are compressed, and a pointer offset used to read old file data corresponding to Diff data 02 from the old file.

FIG. 10 shows an example of a data structure of a Patch file according to an embodiment. As shown in FIG. 10, the data structure of the Patch file includes a header (Header), a control block (zone), Diff data, and Extra data.

The Header includes 16 bytes, and is used to be filled with a magic number and zonesize.

Each zone includes 24 bytes, and is used to describe a plurality of Diff data compressed blocks and a plurality of Extra data compressed blocks. Diff data obtained before block compression is performed on the plurality of Diff data compressed blocks and Extra data obtained before block compression is performed on the plurality of Extra data compressed blocks correspond to a pair of Diff data and Extra data in Patch data. Data recorded in the zone may be used as coding information of the plurality of Diff data compressed blocks and the plurality of Extra data compressed blocks that are described by the zone. The first eight bytes of the zone may record a total byte length of Diff data before block compression is performed on the plurality of Diff data compressed blocks; the middle eight bytes of the zone may record a total byte length of Extra data before block compression is performed on the plurality of Extra data compressed blocks; and the last eight bytes of the zone are used to be filled with a pointer offset, where the pointer offset is used to determine a location for reading data (data used to be subjected to an addition operation with a Diff data block) from the old file.

For example, each zone may be represented by (x, y, z), where x is the total byte length of the Diff data before block compression is performed on the plurality of Diff data compressed blocks described by the zone; y is the total byte length of the Extra data before block compression is performed on the plurality of Extra data compressed blocks described by the zone; z is an offset of an old file pointer, which is used to determine a pointer location for reading, from the old file, old file data corresponding to a first Diff data compressed block described by the zone to which the old file pointer belongs. The pointer offset may be an offset determined based on a current location of a pointer or may be an offset determined based on a file start location, and an offset direction is identified by using a positive or negative offset. This is not limited in this embodiment.

In an optional example, each zone may alternatively be separately compressed, and the compressed zone is referred to herein as a control compressed block. The control compressed block may include a block header and block data. The block data is used to record compressed data corresponding to content of the zone. The block header is used to record compression description information corresponding to the control compressed block. The compression description information may include a data size (or referred to as a data size of the control compressed block) obtained after zone compression. The compression description information may include but is not limited to a data size (csize) and a data size (csize) obtained before and after zone compression.

The Diff data includes one or more data compressed blocks, and each data compressed block includes a block header and block data, where the block data is used to record data obtained after a Diff data block is compressed, the block header is used to record compression description information corresponding to compression data of the Diff data block, and the compression description information may include but is not limited to a data size (csize) obtained before the Diff data block is compressed and a data size (usize) obtained after the Diff data block is compressed. The compression description information may include only the data size (usize) obtained after the Diff data block is compressed, that is, only a data size of the Diff data compressed block.

The Extra data includes one or more Extra data compressed blocks, and each Extra data compressed block includes a block header and block data, where the block data is used to record data obtained after an Extra data block is compressed, the block header is used to record compression description information corresponding to compression data of the Extra data block, and the compression description information may include but is not limited to a data size (csize) obtained before the Extra data block is compressed and a data size (usize) obtained after the Extra data block is compressed. The compression description information may include only the data size (usize) obtained after the Extra data block is compressed, that is, only a data size of the Extra data compressed block.

In this way, in the Patch file, each Diff data compressed block or Extra data compressed block may be used as a data unit that can be independently processed when the terminal performs data restoration, thereby reducing RAM memory consumption when the terminal performs data restoration.

It should be noted that the Patch file provided in the embodiments of this application is merely an example expression. This is not limited.

In an example, based on the foregoing data structure of the Patch file, in addition to being filled with the zonesize field, the Header may be further filled with a data compressed block maximum byte length (LengthMAX) field, and a value of the field is used to indicate a maximum data size for the data compressed blocks (including the Diff data compressed block and the Extra data compressed block).

If each zone is separately compressed, the value of the LengthMAX field is used to indicate a maximum data size for the data compressed blocks (including the control compressed block, the Diff data compressed block, and the Extra data compressed block).

When parsing the Patch file, the terminal may determine, based on the value of the LengthMAX field, whether the received Patch file is incorrect. For example, assuming that a size of a specific Diff data compressed block or Extra data compressed block in the Patch file exceeds the value of the LengthMAX field, the terminal may determine that the Patch file is incorrect.

In still another example, based on the foregoing data structure of the Patch file, in addition to being filled with the zonesize field, the Header may be further filled with a target file data total length (NewfileLength) field, and a value of the field is used to indicate a data total length of a target file obtained through restoration based on the Patch file.

When performing target file restoration based on the Patch file, the terminal may determine, based on the value of the NewfileLength field, whether the target file obtained through restoration is correct. For example, assuming that a data length of the target file obtained through data restoration based on the Patch file is less than or greater than the value of the NewfileLength field, the terminal may determine that the target file obtained through restoration is incorrect.

In another example, based on the foregoing data structure of the Patch file, the data structure of the Patch file may further include a tail, a check field may be filled in the tail, and a value of the check field is used to indicate a hash value of the target file obtained through restoration based on the Patch file.

When performing target file restoration based on the Patch file, the terminal may further determine, based on the value of the check field, whether the target file obtained through restoration is correct. For example, assuming that the hash value of the target file obtained through data restoration based on the Patch file is different from the value of the check field, the terminal may determine that the target file obtained through restoration is incorrect.

The foregoing uses generation of one Patch file as an example for description. Similarly, a corresponding Patch file may also be generated based on another pair of new and old firmware files, to obtain Patch files corresponding to the upgrade differential package. Further, when the terminal requests to download the upgrade differential package from the server, the server may package these Patch files to generate a corresponding upgrade differential package, and send the upgrade differential package to the terminal through a wireless network.

In the differential file generation method provided in this embodiment, data coding is re-performed on the Patch data obtained based on the BSDiff algorithm, and block compression is performed on the Diff data and the Extra data based on zonesize, so that a size of a minimum data processing unit is controllable when restoration is performed on the Patch file, where zonesize may be flexibly set based on RAM memory space of a lightweight embedded device, to be better applicable to a firmware upgrade scenario of the lightweight embedded device.

Considering that when the terminal side performs differential file restoration, the applied RAM memory space may include a safety buffer area, an embodiment further provides a method for performing block division on Diff data and Extra data based on zonesize.

Figure 11A:
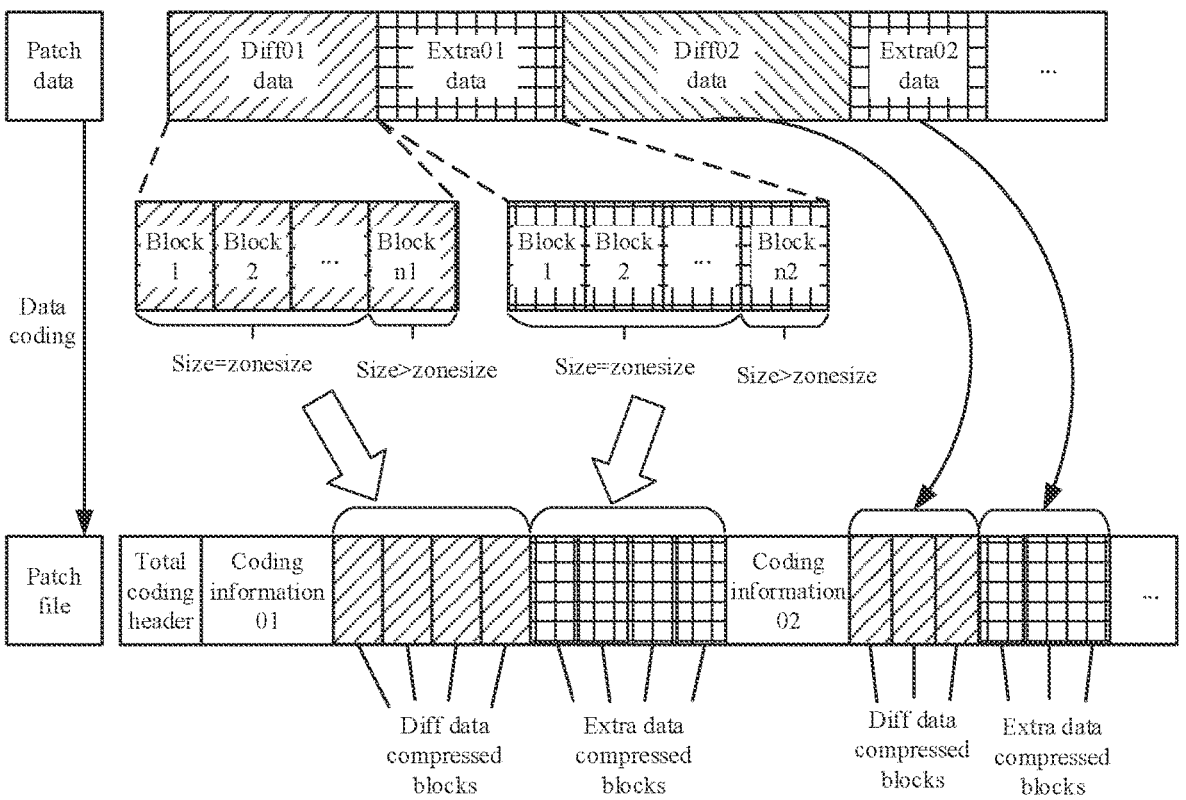
FIG. 11A is a schematic diagram of a differential file generation method according to an embodiment.

FIG. 11A shows an example of a file differentiation procedure based on the Bsdiff principle according to an embodiment.

The file differentiation procedure shown in FIG. 11A is consistent with that in FIG. 7, and a difference lies in a manner of dividing a Diff data block and an Extra data block. For details not described herein, refer to the foregoing descriptions. Details are not described again.

Refer to FIG. 11A. Diff data 01 in Patch data is used as an example, and is divided into n1 Diff data blocks based on zonesize. In the n1 Diff data blocks, a data size (or referred to as a byte length) of each of the first (n1-1) Diff data blocks is zonesize, and a data size of the last Diff data block may be greater than zonesize. Data sorting of the n1 Diff data blocks is the same as that of the Diff data 01. Similarly, Extra data 01 in the Patch data is also divided into n2 Extra data blocks based on zonesize. In the n2 Extra data blocks, a data size of each of the first (n2-1) Extra data blocks is zonesize, and a data size of the last Extra data block may be greater than zonesize. Data sorting of the n2 Extra data blocks is the same as that of the Extra data 01.

Still refer to (1) in FIG. 11B. The Diff data 01 is still used as an example. The Diff data 01 is divided into (n1+1) Diff data blocks based on zonesize. In the (n1+1) Diff data blocks, a data size of each of the first n1 Diff data blocks is zonesize, and a data size of the (n1+1)-th Diff data block is far less than zonesize. For example, the data size of the (n1+1)-th Diff data block is less than a preset proportion of a data size of a safety buffer area. For example, the data size of the (n1+1)-th Diff data block is less than 50% of the data size of the safety buffer area. The safety buffer area is a safety buffer area divided from RAM memory space applied for when the terminal side performs differential file restoration.

Still refer to (1) in FIG. 11B. When the data size of the (n1+1)-th Diff data block is less than the preset proportion of the data size of the safety buffer area, division of the Diff data blocks may be adjusted. That is, the (n1+1)-th Diff data block may be combined with the n1-th Diff data block, and an obtained Diff data block is used as a finally divided n1-th Diff data block. In this case, in the n1 Diff data blocks, the data size of each of the first (n1-1) Diff data blocks is zonesize, and the data size of the last Diff data block is greater than zonesize.

When the data size of the (n1+1)-th Diff data block is not less than the preset proportion of the data size of the safety buffer area, no adjustment is performed on the division of the Diff data blocks. In this case, for division of the Diff data blocks, refer to FIG. 7. Details are not described again.

This is the same for the Extra data 01. As shown in (2) in FIG. 11B, the Extra data 01 may be divided into (n2+1) Extra data blocks based on zonesize. In the (n2+1) Extra data blocks, a data size of each of the first n2 Extra data blocks is zonesize, and a data size of the (n2+1)-th Extra data block is far less than zonesize. For example, the data size of the (n2+1)-th Extra data block is less than the preset proportion of the data size of the safety buffer area. For example, the data size of the (n2+1)-th Extra data block is less than 50% of the data size of the safety buffer area.

Still refer to (2) in FIG. 11B. When the data size of the (n2+1)-th Extra data block is less than the preset proportion of the data size of the safety buffer area, division of the Extra data blocks may be adjusted. That is, the (n2+1)-th Extra data block may be combined with the n2-th Extra data block, and an obtained Extra data block is used as a finally divided n2-th Extra data block. In this case, in the n2 Extra data blocks, the data size of each of the first (n2-1) Extra data blocks is zonesize, and the data size of the last Extra data block is greater than zonesize.

When the data size of the (n2+1)-th Extra data block is not less than the preset proportion of the data size of the safety buffer area, no adjustment is performed on the division of the Extra data blocks. In this case, for division of the Extra data blocks, refer to FIG. 7. Details are not described again.

It may be understood that, when any piece of Diff data or Extra data is divided into data blocks based on zonesize, whether a size of the last data block is greater than zonesize is related to a length of the Diff data or the Extra data.

For details about a data structure, a generation procedure, and the like of a differential file, refer to the foregoing descriptions. Details are not described herein again.

When the terminal side performs the data restoration operation based on the Patch file, the terminal may calculate, based on the total byte length of the corresponding Diff data before the plurality of Diff data compressed blocks recorded in the zone are compressed, a value of zonesize, and the data size of the applied safety buffer area, whether there is a Diff data block whose byte length is greater than zonesize and byte lengths of the Diff data blocks. Similarly, the terminal may calculate, based on the total byte length of the corresponding Extra data before the plurality of Extra data compressed blocks recorded in the zone are compressed, the value of zonesize, and the data size of the applied safety buffer area, whether there is an Extra data block whose byte length is greater than zonesize and byte lengths of the Extra data blocks.

In an optional implementation, a flag field may also be set in the header of the Patch file, and a value of the flag field is used to indicate whether there are data blocks (including the Diff data block and the Extra data block) whose byte lengths are greater than zonesize.

When performing the data restoration operation based on the Patch file, the terminal side may determine, by parsing the value of the flag field in the header of the Patch file, whether there are data blocks (including the Diff data block and the Extra data block) whose byte lengths are greater than zonesize.

Corresponding to the differential file generation method provided in the embodiments, an embodiment further provides a differential file restoration method. The differential file restoration method is applied to the terminal side. The terminal mentioned herein may be understood as any electronic device that needs to perform a restoration operation on a differential file, for example, a smartphone, a smartwatch, or a smart band, or for another example, any Internet of Things node device.

Figure 12:
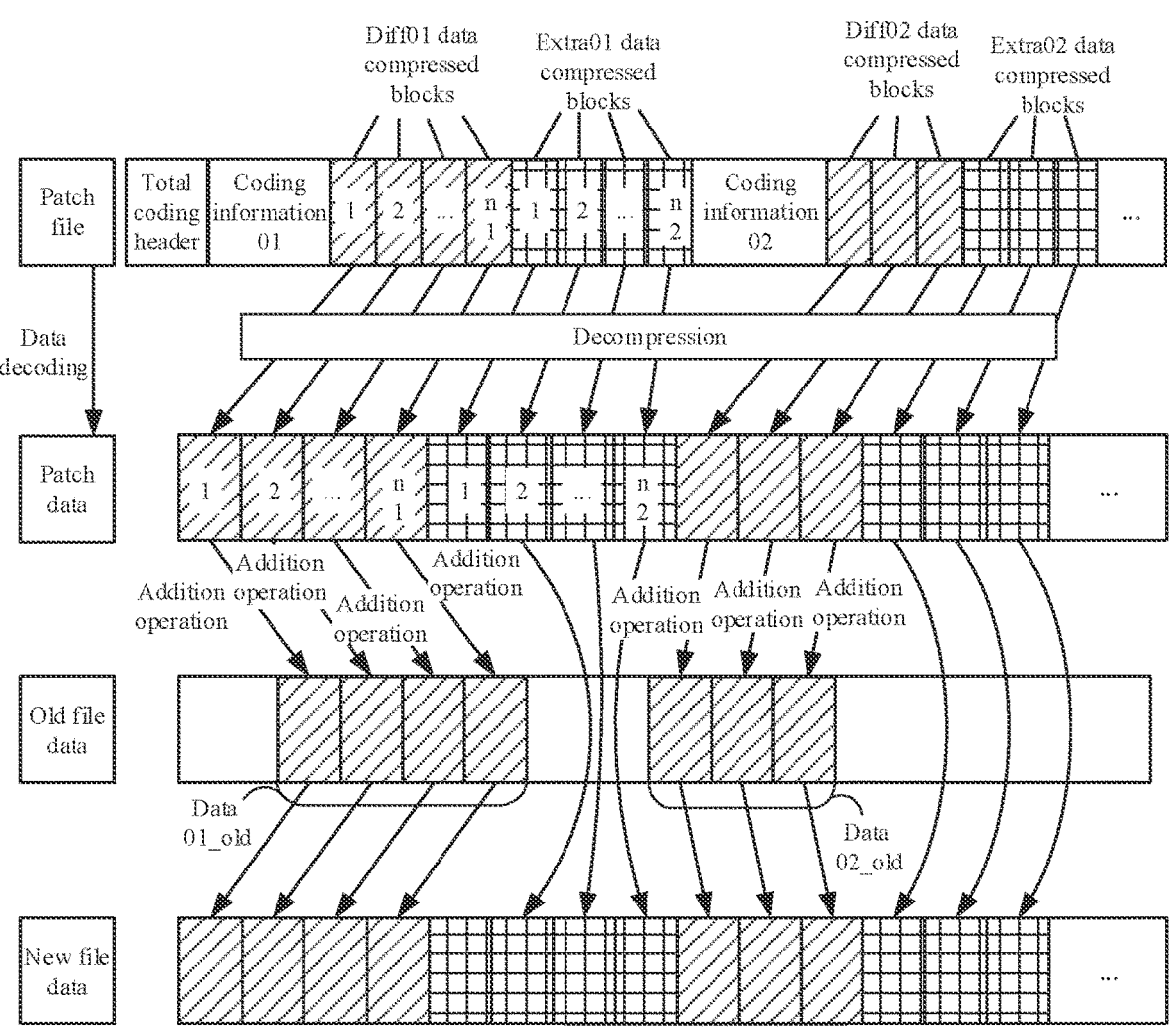
FIG. 12 is a schematic diagram of a differential file restoration method according to an embodiment.

FIG. 12 shows an example of a procedure of performing target file restoration based on a Patch file according to an embodiment.

Refer to FIG. 12. Data decoding is performed on the Patch file to obtain corresponding Patch data. Herein, a process of performing data decoding on the Patch file may be understood as an inverse process of performing data coding on Patch data.

Refer to FIG. 12. A data structure of the Patch file includes a total coding header, a plurality of Diff data compressed blocks and a plurality of Extra data compressed blocks, and coding information corresponding to the plurality of Diff data compressed blocks and the plurality of Extra data compressed blocks. The coding information corresponding to the plurality of Diff data compressed blocks and the plurality of Extra data compressed blocks is used to describe the plurality of Diff data compressed blocks and the plurality of Extra data compressed blocks, so that the terminal can perform data addressing based on the coding information. For the data structure of the Patch file, refer to the foregoing descriptions of FIG. 8. Details are not described herein again.

When obtaining the Patch file, the terminal parses the header of the Patch file. After learning of a file type and a data block size based on a magic number and zonesize that are recorded in the header, the terminal may apply for RAM memory space based on the data block size to perform differential file restoration processing, and perform a data decoding operation based on a data structure corresponding to the file type.

After obtaining one Diff data block or Extra data block through decompression, the terminal performs target file restoration based on the Diff data block or Extra data block.

Still refer to FIG. 12. In the Patch data obtained by performing data decoding on the Patch file, Diff data and Extra data appear in pairs, and each piece of Diff data is followed by one piece of Extra data. In addition, sorting of pairs of Diff data and Extra data in the Patch data is consistent with that of new file data. Each piece of Diff data includes a plurality of decompressed Diff data blocks, and each piece of Extra data includes a plurality of decompressed Extra data blocks. When performing target file restoration based on the Patch data, the terminal separately performs the data restoration operation based on each Diff data block or Extra data block.

Refer to FIG. 8. In the Patch file, each zone is used to describe a plurality of Diff data compressed blocks and a plurality of Extra data compressed blocks. Therefore, the terminal may obtain the Diff data compressed blocks and the Extra data compressed blocks based on content recorded in the zone, perform a decompression operation, and perform restoration processing based on Diff data blocks and Extra data blocks that are obtained through decompression, to obtain data in a new file.

Still refer to FIG. 12. An example in which the terminal performs the data restoration operation based on Diff data compressed blocks (corresponding to Diff data 01) and Extra data compressed blocks (corresponding to Extra data 01) that are described by using coding information 01 is used for description. The terminal first decompresses a Diff data 01 compressed block 1 to obtain a Diff data 01 block 1, where a byte length of the Diff data 01 block 1 is equal to zonesize. When performing the data restoration operation based on the Diff data 01 block 1, the terminal reads Diff data of the Diff data 01 block 1, reads, from an old file, old file data (whose byte length is equal to zonesize) that matches the Diff data 01 block 1, performs an addition operation on the Diff data of the Diff data 01 block 1 and the matched old file data to obtain new file data (whose byte length is equal to zonesize) corresponding to the Diff data 01 block 1, and writes the new file data into the new file. Similarly, the terminal continues to decompress a Diff data 01 compressed block 2, and performs data restoration based on a Diff data 01 block 2 obtained through decompression, until restoration processing on a Diff data 01 compressed block n1 is completed. A byte length of a Diff data 01 block obtained by decompressing the Diff data 01 compressed block n1 is less than or equal to zonesize.

Then, the terminal continues to decompress an Extra data 01 compressed block 1 to obtain an Extra data 01 block 1, where a byte length of the Extra data 01 block 1 is equal to zonesize. When performing the data restoration operation based on the Extra data 01 block 1, the terminal reads Extra data of the Extra data 01 block 1, and directly writes the data into the new file. Similarly, the terminal continues to decompress an Extra data 01 compressed block 2, and performs data restoration based on an Extra data 01 block 2 obtained through decompression, until restoration processing on an Extra data 01 compressed block n2 is completed. A byte length of an Extra data 01 block obtained by decompressing the Extra data 01 compressed block n2 is less than or equal to zonesize.

So far, the terminal completes target file restoration based on the Diff data 01 and the Extra data 01. An operation in which the terminal performs target file restoration based on other Diff data and Extra data is also the same. By analogy, the terminal may obtain all data in the new file based on the Diff data compressed blocks and the Extra data compressed blocks in the Patch file and related data in the old file.

Figure 13:
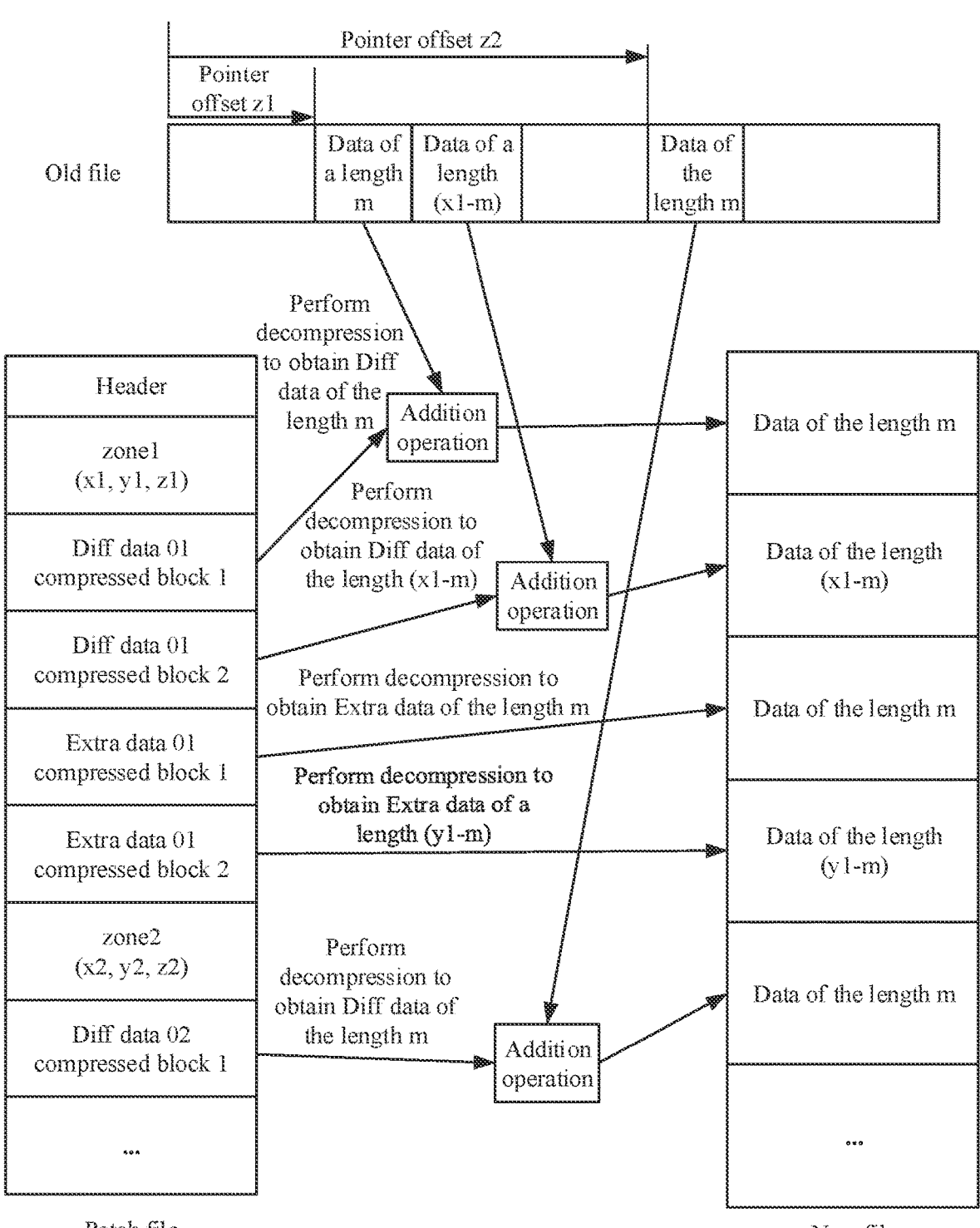
FIG. 13 is a schematic diagram of a differential file restoration operation according to an embodiment.

The following uses an example in which each zone is represented by (x, y, z), to describe, with reference to FIG. 13, a procedure of performing restoration based on a Patch file.

In this example, z represents a pointer offset from a file start location.

As shown in FIG. 13, in the Patch file, content filled in zone1 is (x1, y1, z1), and is used to describe a Diff data 01 compressed block 1, a Diff data 01 compressed block 2, an Extra data 01 compressed block 1, and an Extra data 01 compressed block 2. A total byte length of Diff data obtained after the Diff data 01 compressed block 1 and the Diff data 01 compressed block 2 are decompressed is x1, a byte length of a Diff data 01 block 1 obtained after the Diff data 01 compressed block 1 is decompressed is m (it is assumed that zonesize=m), and a byte length of a Diff data 01 block 2 obtained after the Diff data 01 compressed block 2 is decompressed is x1−m (x1−m≤m); and a total byte length of Extra data obtained after the Extra data 01 compressed block 1 and the Extra data 01 compressed block 2 are decompressed is y1, a byte length of an Extra data 01 block 1 obtained after the Extra data 01 compressed block 1 is decompressed is m, and a byte length of an Extra data 01 block 2 obtained after the Extra data 01 compressed block 2 is decompressed is y1−m (y1−m≤m).

The terminal parses the Patch file to obtain (x1, y1, z1) filled in zone1. First, the terminal continues to read the Diff data 01 compressed block 1 from the Patch file, decompresses the Diff data 01 compressed block 1 to obtain Diff data of the length m, reads data of the length m from an old file, performs an addition operation on the two pieces of data of the length m to obtain new file data of the length in, and writes the new file data into a new file (or referred to as a target file). After an old file pointer is offset from the file start location by z1, the terminal may read, from the old file, the old file data of the length m that corresponds to the Diff data of the length m (the Diff data 01 compressed block 1). Then, the terminal continues to read the Diff data 01 compressed block 2 from the Patch file, decompresses the Diff data 01 compressed block 2 to obtain Diff data of the length (x1−m), continues to read data of the length (x1−m) from the old file, performs the addition operation on the two pieces of data of the length (x1−m) to obtain new file data of the length (x1−m), and writes the new file data into the new file. After the terminal reads, from the old file, the old file data of the length m that corresponds to the Diff data of the length in, the old file pointer continues to be offset forward by in. In this case, based on a current location of the pointer, the terminal may continue to read, from the old file, the old data of the length (x1−m) that corresponds to the Diff data of the length (x1−m).

So far, Diff data 01 compressed blocks described by zone1 have been processed.

The terminal continues to read the Extra data 01 compressed block 1 from the Patch file, decompresses the Extra data 01 compressed block 1 to obtain Extra data of the length in, and directly writes the Extra data into the new file. The terminal continues to read the Extra data 01 compressed block 2 from the Patch file, decompresses the Extra data 01 compressed block 2 to obtain Extra data of the length (y1−m), and directly writes the Extra data into the new file.

So far, Extra data 01 compressed blocks described by zone1 have also been processed.

Then, the terminal continues to read, from the Patch file, (x2, y2, z2) filled in zone2. In the Patch file, zone2 is used to describe a Diff data 02 compressed block 1 and a Diff data 02 compressed block 2, and Extra data 02 compressed blocks. The terminal continues to read the Diff data 02 compressed block 1 from the Patch file, decompresses the Diff data 02 compressed block 1 to obtain Diff data of the length m, reads data of the length m from the old file, performs the addition operation on the two pieces of data of the length m to obtain new file data of the length m, and continues to write the new file data into the new file (or referred to as a target file). To enable the terminal to read, from the old file, the old file data of the length m that corresponds to the Diff data of the length m (the Diff data 02 compressed block 1), the terminal needs to re-determine the old file pointer based on a start location of the old file and z2. That is, after the old file pointer is offset from the file start location by z2, the terminal may read, from the old file, the old file data of the length m that corresponds to the Diff data of the length m (the Diff data 02 compressed block 1).

Similarly, the terminal continues to perform data restoration processing on the Diff data 02 compressed block and the Extra data 02 compressed blocks described by zone2.

Similarly, after completing data restoration processing on Diff data compressed blocks and Extra data compressed blocks described by all zones, the terminal may complete a new file restoration procedure.

The following separately describes RAM memory occupation existing when the terminal performs data restoration based on the Diff data compressed block and the Extra data compressed block.

It should be noted that when the terminal device performs differential file restoration, continuous RAM memory space may be applied for, or discontinuous RAM memory space may be applied for. This is not limited in this embodiment.

When the terminal device applies for the discontinuous RAM memory space, if a RAM memory area is multiplexed, the terminal device may apply for two RAM memory areas with a same size as zonesize and one RAM memory area (whose size is related to a data compression algorithm) used to run the data compression algorithm. When the terminal device applies for the discontinuous RAM memory space, if a RAM memory area is not multiplexed, the terminal device may apply for three RAM memory areas with a same size as zonesize and one RAM memory area (whose size is related to a data compression algorithm) used to run the data compression algorithm.

In an optional implementation, if a RAM memory area is multiplexed, two RAM memory areas of a size (zonesize+ N2) and one RAM memory area (whose size is related to a data compression algorithm) used to run the data compression algorithm may be applied for. N2 is a data size of a safety buffer area.

Similarly, if a RAM memory area is not multiplexed, three RAM memory areas of a size (zonesize+N2) and one RAM memory area (whose size is related to a data compression algorithm) used to run the data compression algorithm may be applied for. N2 is a data size of a safety buffer area.

Because the discontinuous RAM memory space is applied for, RAM memory fragments are easily generated, resulting in a waste of RAM space. Therefore, in this embodiment, an example in which the terminal device applies for the continuous RAM memory space is used for description.

When obtaining the Patch file, the terminal parses the header of the Patch file. After obtaining a value of a data block size (zonesize), the terminal may apply for continuous RAM memory space based on the value of zonesize to perform a differential data restoration operation.

Figure 14:
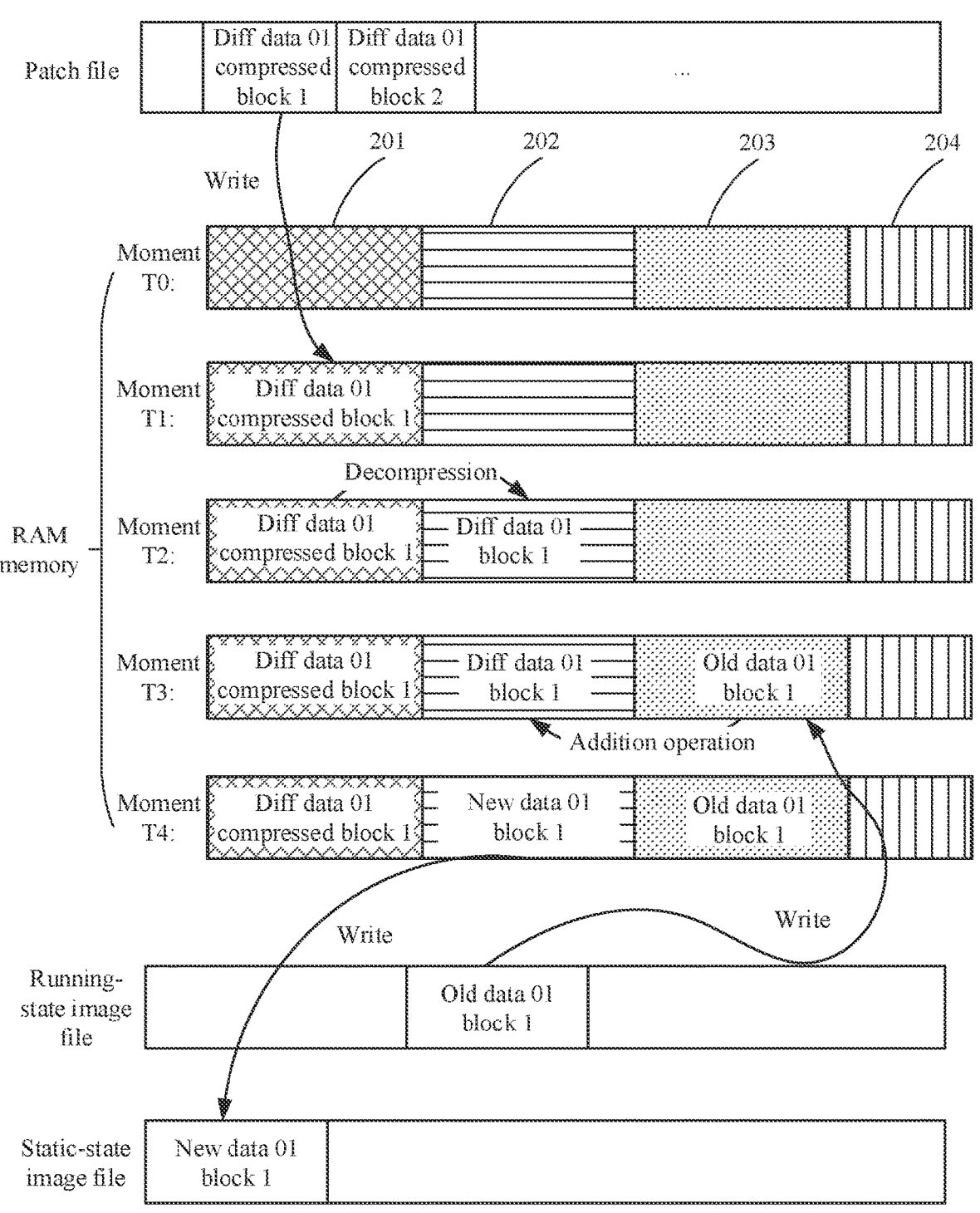
FIG. 14 is a schematic diagram of RAM space occupation when data restoration is performed based on a Diff data compressed block according to an embodiment.
Figure 15:
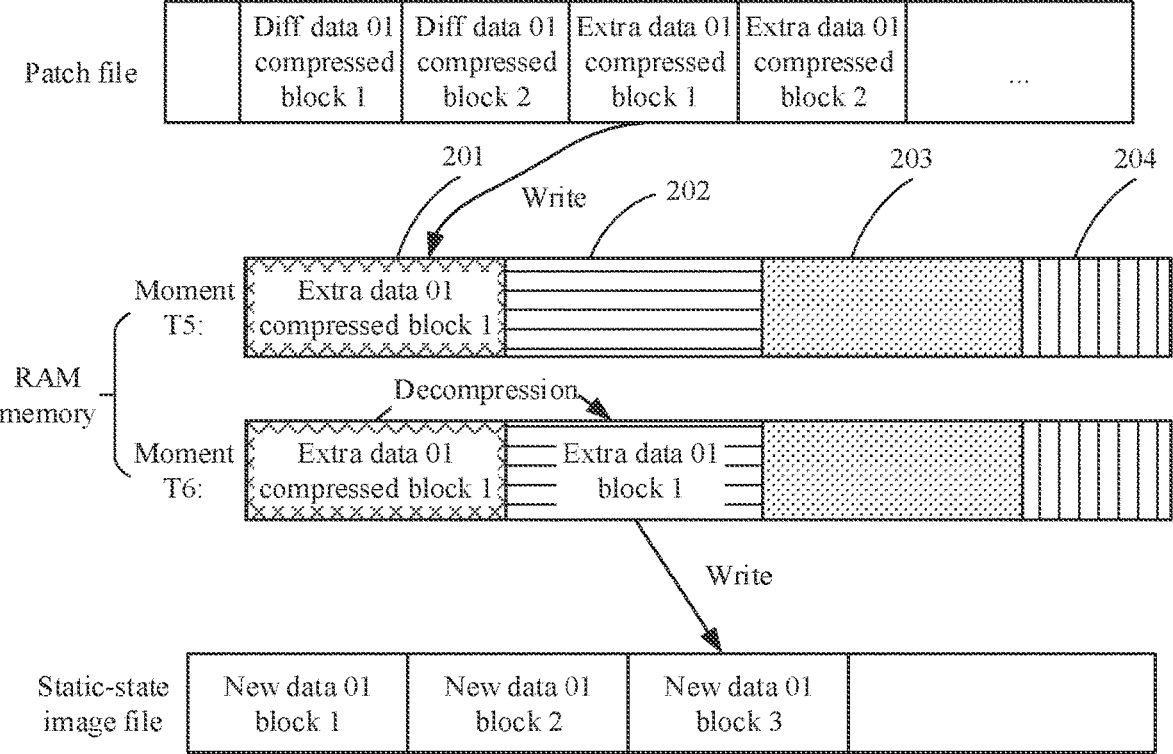
FIG. 15 is a schematic diagram of RAM space occupation when data restoration is performed based on an Extra data compressed block according to an embodiment.

In a possible implementation, a RAM memory area is not multiplexed, and the terminal applies for continuous RAM memory space for performing a Patch restoration operation, where a size of the RAM memory space is 3*zonesize+N1 (bytes), and N1 bytes are a size of RAM memory space required for running a data compression algorithm. The terminal may divide the RAM memory space into four RAM memory areas, which are respectively a first RAM memory area 201, a second RAM memory area 202, a third RAM memory area 203, and a fourth RAM memory area 204, as shown in FIG. 14 and FIG. 15. Sizes of the first RAM memory area 201, the second RAM memory area 202, and the third RAM memory area 203 are equal and are zonesize (bytes), and a size of the fourth RAM memory area 204 is N1 bytes.

For example, the data compression algorithm used to perform data compression on the Diff data compressed block or the Extra data compressed block may use LZMA. For example, if minimum RAM memory space required for running LZMA is 16 KB, N1=16 may be set. It is assumed that zonesize=60 KB. In this implementation, the terminal may apply for continuous RAM memory space of M bytes for performing the Patch restoration operation, where M=60*3+16=196 KB.

The first RAM memory area 201, the second RAM memory area 202, and the third RAM memory area 203 are jointly used for a data storage operation related to Diff data block restoration processing, including but not limited to storing the Diff data compressed block, storing the Diff data block obtained through decompression, storing a new file data block (New data block) obtained after the addition operation, and are jointly used for a data storage operation related to Extra data block restoration processing, including but not limited to storing the Extra data compressed block, and storing the Extra data block obtained through decompression. The fourth RAM memory area 204 is used to perform the data decompression operation.

For example, refer to FIG. 14. At a moment TO, the terminal applies for the first RAM memory area 201, the second RAM memory area 202, the third RAM memory area 203, and the fourth RAM memory area 204. At a moment T1, the terminal reads the Diff data 01 compressed block 1 from the Patch file, and writes the Diff data 01 compressed block 1 into the first RAM memory area 201. Then, the terminal invokes the data compression algorithm to decompress the Diff data 01 compressed block 1 in the first RAM memory area 201. A RAM memory area used for performing a decompression process based on the data compression algorithm is the fourth RAM memory area 204, and data obtained through decompression is written into the second RAM memory area 202. At a moment T2, the Diff data 01 compressed block 1 is decompressed, and the Diff data 01 block 1 (whose byte length is zonesize) is temporarily stored in the second RAM memory area 202. Then, the terminal reads an Old data 01 block 1 (whose byte length is zonesize) corresponding to the Diff data 01 block 1 from a running-state image file (equivalent to an old file that is not upgraded), and temporarily stores the Old data 01 block 1 in the third RAM memory area 203, as shown at a moment T3. At the moment T3, the terminal reads the Old data 01 block 1 from the third RAM memory area 203, and reads the Diff data 01 block 1 from the second RAM memory area 202 to perform the addition operation. The terminal may perform the addition operation on the Diff data 01 block 1 and the Old data 01 block 1, so that a New data 01 block 1 obtained through the addition operation can be written into the second RAM memory area 202, to overwrite the Diff data 01 block 1 temporarily stored in the second RAM memory area 202. Further, at a moment T4, the terminal may read the New data 01 block 1 from the second RAM memory area 202 and write the New data 01 block 1 into a static-state image file (or a newly created file). Herein, the static-state image file may be understood as a backup of the running-state image file.

It should be noted that data temporarily stored in a specific RAM memory area may be overwritten or emptied. This is not limited in this embodiment. For example, when the Old data 01 block 1 is read from the third RAM memory area 203 and the Diff data 01 block 1 is read from the second RAM memory area 202 for the addition operation, an operation result may be directly written into the first RAM memory area 201, to overwrite the Diff data 01 compressed block 1 temporarily stored in the first RAM memory area 201. For another example, after the Diff data 01 compressed block 1 temporarily stored in the first RAM memory area 201 is decompressed, data temporarily stored in the first RAM memory area 201 may be emptied; and further, when the Old data 01 block 1 is read from the third RAM memory area 203 and the Diff data 01 block 1 is read from the second RAM memory area 202 for the addition operation, an operation result may be directly written into the first RAM memory area 201.

So far, the terminal completes the data restoration operation based on the Diff data 01 compressed block 1. Similarly, the terminal may continue to perform the data restoration operation based on the Diff data 01 compressed block 2. If the Diff data 01 compressed block 2 is the last compressed block of the Diff data 01, a byte length of the Diff data 01 block 2 obtained by decompressing the Diff data 01 compressed block 2 is less than or equal to zonesize.

When the terminal completes the data restoration operation based on the Diff data 01 compressed blocks included in the Diff data 01, the terminal may continue to perform the data restoration operation based on the Extra data 01 compressed blocks included in the Extra data 01.

For example, refer to FIG. 15. At a moment T5, the terminal reads the Extra data 01 compressed block 1 from the Patch file, and writes the Extra data 01 compressed block 1 into the first RAM memory area 201. Then, the terminal invokes the data compression algorithm to decompress the Extra data 01 compressed block 1 in the first RAM memory area 201. A RAM memory area used for performing a decompression process based on the data compression algorithm is the fourth RAM memory area 204, and data obtained through decompression is written into the second RAM memory area 202. At a moment T6, the Extra data 01 compressed block 1 is decompressed, and the Extra data 01 block 1 (whose byte length is zonesize) is temporarily stored in the second RAM memory area 202. Further, at the moment T6, the terminal may read the Extra data 01 block 1 from the second RAM memory area 202 and continue to write the Extra data 01 block 1 into the static-state image file. In this case, data in the static-state image file is restored to a New data 01 block 3.

So far, the terminal completes the data restoration operation based on the Extra data 01 compressed block 1. Similarly, the terminal may continue to perform the data restoration operation based on the Extra data 01 compressed block 2. If the Extra data 01 compressed block 2 is the last compressed block of the Extra data 01, a byte length of the Extra data 01 block 2 obtained by decompressing the Extra data 01 compressed block 2 is less than or equal to zonesize. By analogy, when the static-state image file is fully filled with data, the terminal completes the data restoration operation based on the Patch file.

In this implementation, a safety buffer area may be considered to be set for the RAM memory area. This is not limited in this embodiment. For example, the terminal applies for continuous RAM memory space for performing the Patch restoration operation, and a size of the RAM memory space is 3*zonesize+3*N2+N1 (bytes). The N2 bytes are a size of RAM memory space occupied by the safety buffer area. This implementation is not described herein.

Figure 16:
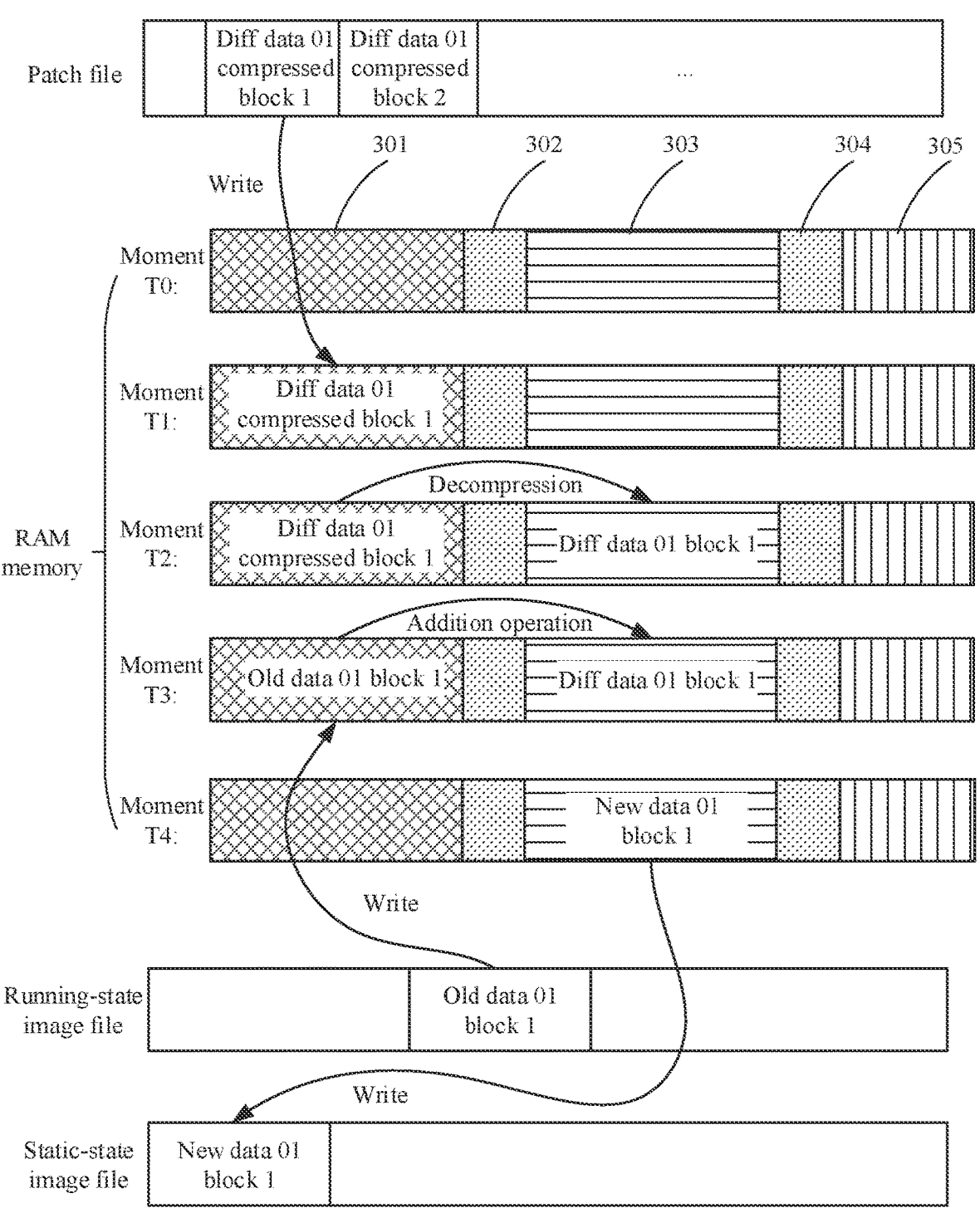
FIG. 16 is a schematic diagram of RAM space occupation when data restoration is performed based on a Diff data compressed block according to an embodiment.
Figure 17:
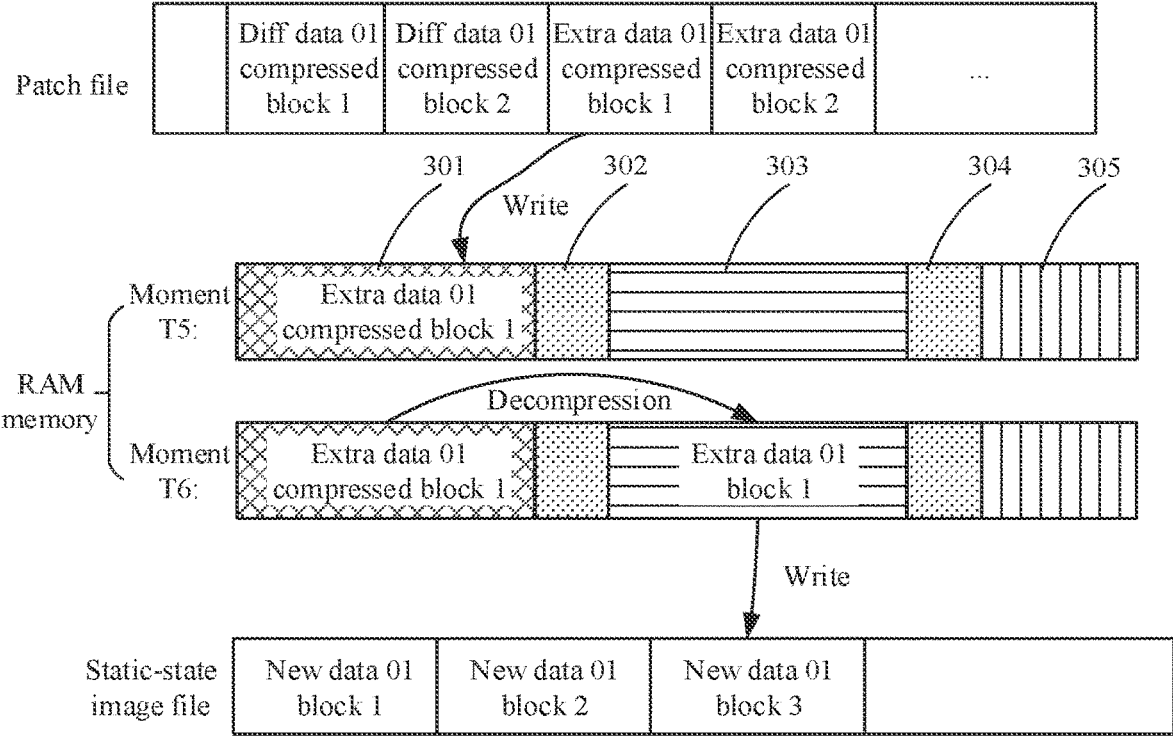
FIG. 17 is a schematic diagram of RAM space occupation when data restoration is performed based on an Extra data compressed block according to an embodiment.

In another possible implementation, a RAM memory area is multiplexed, and the terminal applies for continuous RAM memory space for performing a Patch restoration operation, where a size of the RAM memory space is 2*zonesize+2*N2+N1 (bytes). N1 bytes are a size of RAM memory space required for running a data compression algorithm, and N2 bytes are a size of RAM memory space occupied by a safety buffer area. The terminal may divide the RAM memory space into five RAM memory areas, which are respectively a first RAM memory area 301, a second RAM memory area 302, a third RAM memory area 303, a fourth RAM memory area 304, and a fifth RAM memory area 305, as shown in FIG. 16 and FIG. 17. Sizes of the first RAM memory area 301 and the third RAM memory area 303 are equal and are zonesize (bytes); a size of the fifth RAM memory area 305 is N1 bytes; the second RAM memory area 302 is located between the first RAM memory area 301 and the third RAM memory area 303, and is a safety buffer area of the first RAM memory area 301; the fourth RAM memory area 304 is located between the third RAM memory area 303 and the fifth RAM memory area 305, and is a safety buffer area of the third RAM memory area 303; and sizes of the second RAM memory area 302 and the fourth RAM memory area 304 are equal and are N2 bytes.

For example, the data compression algorithm used to perform data compression on the Diff data compressed block or the Extra data compressed block may use LZMA. For example, if minimum RAM memory space required for running LZMA is 16 KB, N1=16 may be set. It is assumed that zonesize=90 KB and N2=2 KB. In this implementation, the terminal may apply for continuous RAM memory space of M bytes for performing the Patch restoration operation, where M=90*2+2*2+16=200 KB.

The first RAM memory area 301 and the third RAM memory area 303 are jointly used for a data storage operation related to Diff data block restoration processing, including but not limited to storing the Diff data compressed block, storing the Diff data block obtained through decompression, storing a new file data block (New data block) obtained after the addition operation, and are jointly used for a data storage operation related to Extra data block restoration processing, including but not limited to storing the Extra data compressed block, and storing the Extra data block obtained through decompression. The fifth RAM memory area 305 is used to perform the data decompression operation.

For example, refer to FIG. 16. At a moment TO, the terminal applies for the first RAM memory area 301, the second RAM memory area 302, the third RAM memory area 303, the fourth RAM memory area 304, and the fifth RAM memory area 305. At a moment T1, the terminal reads the Diff data 01 compressed block 1 from the Patch file, and writes the Diff data 01 compressed block 1 into the first RAM memory area 301. Then, the terminal invokes the data compression algorithm to decompress the Diff data 01 compressed block 1 in the first RAM memory area 301. A RAM memory area used for performing a decompression process based on the data compression algorithm is the fifth RAM memory area 305, and data obtained through decompression is written into the third RAM memory area 303. At a moment T2, the Diff data 01 compressed block 1 is decompressed, and the Diff data 01 block 1 (whose byte length is zonesize) is temporarily stored in the third RAM memory area 303. Then, the terminal reads an Old data 01 block 1 (whose byte length is zonesize) corresponding to the Diff data 01 block 1 from a running-state image file (equivalent to an old file that is not upgraded), and temporarily stores the Old data 01 block 1 in the first RAM memory area 301, to overwrite the Diff data 01 compressed block 1, as shown at a moment T3. Still at the moment T3, the terminal reads the Old data 01 block 1 from the first RAM memory area 301, and reads the Diff data 01 block 1 from the third RAM memory area 303 to perform the addition operation. The terminal may perform the addition operation on the Diff data 01 block 1 and the Old data 01 block 1, so that a New data 01 block 1 obtained through the addition operation can be written into the third RAM memory area 303, to overwrite the Diff data 01 block 1 temporarily stored in the third RAM memory area 303. Further, at a moment T4, the terminal may read the New data 01 block 1 from the third RAM memory area 303 and write the New data 01 block 1 into a static-state image file.

The New data 01 block 1 obtained through the addition operation may alternatively be written into the first RAM memory area 301, to overwrite the Old data 01 block 1 temporarily stored in the first RAM memory area 301. Further, the terminal may read the New data 01 block 1 from the first RAM memory area 301 and write the New data 01 block 1 into the static-state image file.

So far, the terminal completes the data restoration operation based on the Diff data 01 compressed block 1. Similarly, the terminal may continue to perform the data restoration operation based on the Diff data 01 compressed block 2. If the Diff data 01 compressed block 2 is the last compressed block of the Diff data 01, a byte length of the Diff data 01 block 2 obtained by decompressing the Diff data 01 compressed block 2 is less than or equal to zonesize.

When the terminal completes the data restoration operation based on the Diff data 01 compressed blocks included in the Diff data 01, the terminal may continue to perform the data restoration operation based on the Extra data 01 compressed blocks included in the Extra data 01.

For example, refer to FIG. 17. At a moment T5, the terminal reads the Extra data 01 compressed block 1 from the Patch file, and writes the Extra data 01 compressed block 1 into the first RAM memory area 301. Then, the terminal invokes the data compression algorithm to decompress the Extra data 01 compressed block 1 in the first RAM memory area 301. A RAM memory area used for performing a decompression process based on the data compression algorithm is the fifth RAM memory area 305, and data obtained through decompression is written into the third RAM memory area 303. At a moment T6, the Extra data 01 compressed block 1 is decompressed, and the Extra data 01 block 1 (whose byte length is zonesize) is temporarily stored in the third RAM memory area 303. Further, at the moment T6, the terminal may read the Extra data 01 block 1 from the third RAM memory area 303 and continue to write the Extra data 01 block 1 into the static-state image file. In this case, data in the static-state image file is restored to a New data 01 block 3.

So far, the terminal completes the data restoration operation based on the Extra data 01 compressed block 1. Similarly, the terminal may continue to perform the data restoration operation based on the Extra data 01 compressed block 2. If the Extra data 01 compressed block 2 is the last compressed block of the Extra data 01, a byte length of the Extra data 01 block 2 obtained by decompressing the Extra data 01 compressed block 2 is less than or equal to zonesize. By analogy, when the static-state image file is fully filled with data, the terminal completes the data restoration operation based on the Patch file.

The terminal applies for the second RAM memory area 302 as a safety buffer area of the first RAM memory area 301, to avoid a problem that a data processing error occurs due to data spill of the first RAM memory area 301. Similarly, the terminal applies for the fourth RAM memory area 304 as a safety buffer area of the third RAM memory area 303, to avoid a problem that a data processing error occurs due to data spill of the third RAM memory area 303.

It should be noted that, assuming that when a size of a specific Diff data compressed block or Extra data compressed block is greater than a size of a Diff data block or an Extra data block before compression, when the data compressed block is temporarily stored in the first RAM memory area or the third RAM memory area, data correspondingly spills out to the second RAM memory area or the fourth RAM memory area. In this case, when performing data decompression processing on the data compressed block, the terminal device also needs to perform decompression processing on the data that spills out to the second RAM memory area or the fourth RAM memory area, to ensure correctness of a Diff data block or an Extra data block obtained through decompression.

When the continuous RAM memory space applied for by the terminal device for differential data restoration is a specific determined value, compared with a case in which the RAM memory area is not multiplexed, multiplexing the RAM memory area can improve data restoration processing efficiency.

When the RAM memory space that can be allocated by the terminal for differential data restoration processing is extremely small, the terminal may not divide the second RAM memory area 302 and the fourth RAM memory area 304 from the applied RAM memory space as the safety buffer areas. When the terminal does not divide the second RAM memory area 302 and the fourth RAM memory area 304 from the applied RAM memory space as the safety buffer areas. RAM memory occupation existing when the terminal performs data restoration based on the Diff data compressed block and the Extra data compressed block is similar. Details are not described herein again.

For example, the data compression algorithm used to perform data compression on the Diff data compressed block or the Extra data compressed block may use LZMA. For example, if minimum RAM memory space required for running LZMA is 16 KB, N1=16 may be set. It is assumed that zonesize=2 KB. In this implementation, the terminal may apply for continuous RAM memory space of M bytes for performing the Patch restoration operation, where M=2*2+16=20 KB.

In this way, when the terminal performs the data restoration operation based on the Diff data compressed block or the Extra data compressed block, both the decompression operation and the data storage operation are performed in specified RAM memory areas, so that the RAM memory space is fully and effectively used; and a RAM memory consumed by a differential restoration operation is small, so that a lightweight device with small RAM space can also have differentiation and restoration capabilities.

Corresponding to the data block division manners shown in FIG. 11A-FIG. 11B, when the terminal performs data restoration on the Patch file, the RAM memory space applied for the Patch restoration operation includes a safety buffer area. A data size of the safety buffer area is N2 bytes.

For example, the RAM memory space applied for by the terminal may be continuous, as shown in FIG. 16. For another example, the RAM memory space applied for by the terminal may alternatively be discontinuous, for example, three RAM memory areas of a size (zonesize+N2) and one RAM memory area (whose size is related to a data compression algorithm) used to run the data compression algorithm are applied for. This is not limited in this embodiment.

When the terminal performs the data restoration operation based on Diff data compressed blocks or Extra data compressed blocks described by a specific zone, the terminal may calculate, based on a total byte length of corresponding Diff data before a plurality of Diff data compressed blocks recorded in the zone are compressed, a value of zonesize, and the data size of the applied safety buffer area, whether there is a Diff data block whose byte length is greater than zonesize.

If there is no Diff data block whose byte length is greater than zonesize, for a processing procedure in which the terminal performs data restoration based on the plurality of Diff data compressed blocks, refer to the foregoing descriptions. Details are not described herein again.

It is assumed that a byte length of a Diff data block before the last Diff data compressed block (for example, the Diff data 01 compressed block n1) described by a specific zone is compressed is greater than zonesize. The following describes a procedure in which the terminal performs data restoration processing based on the Diff data 01 compressed block n1.

Figure 18:
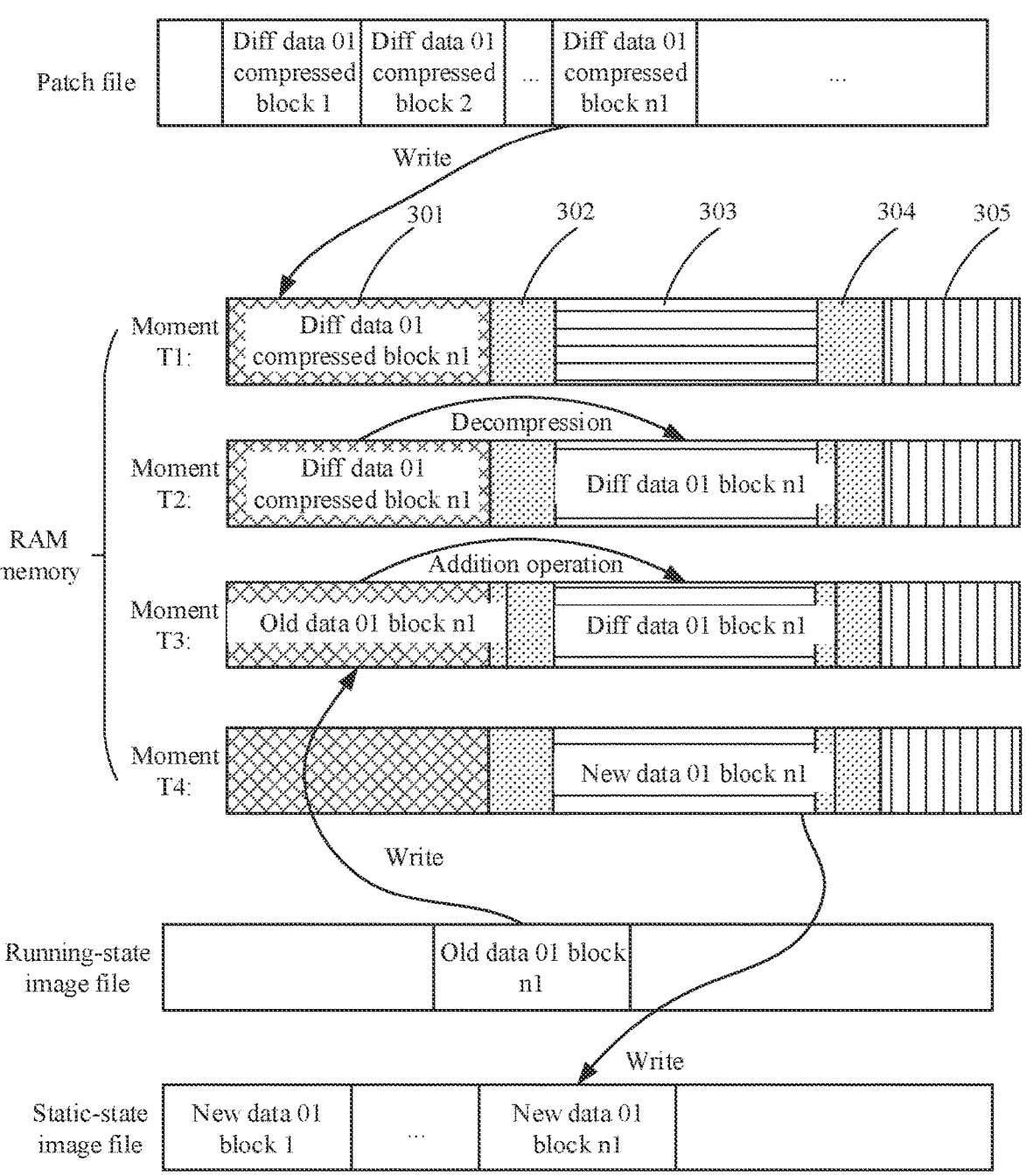
FIG. 18 is a schematic diagram of RAM space occupation when data restoration is performed based on a Diff data compressed block according to an embodiment.

Refer to FIG. 18. At a moment T1, the terminal reads the Diff data 01 compressed block n1 from the Patch file, and writes the Diff data 01 compressed block n1 into the first RAM memory area 301. Then, the terminal invokes the data compression algorithm to decompress the Diff data 01 compressed block n1 in the first RAM memory area 301. A RAM memory area used for performing a decompression process based on the data compression algorithm is the fifth RAM memory area 305, and data obtained through decompression is written into the third RAM memory area 303. At a moment T2, the Diff data 01 compressed block n1 is decompressed, and a Diff data 01 block n1 obtained through decompression is temporarily stored in the third RAM memory area 303. Because a byte length of the Diff data 01 block n1 before compression is greater than zonesize, the third RAM memory area 303 is fully filled with the Diff data 01 block n1, and a part of data is further written into the fourth RAM memory area 304. Then, the terminal reads an Old data 01 block n1 (whose byte length is greater than zonesize) corresponding to the Diff data 01 block n1 from a running-state image file (equivalent to an old file that is not upgraded), and temporarily stores the Old data 01 block nil in the first RAM memory area 301. The first RAM memory area 301 is fully filled with the Old data 01 block n1, and a part of data is further written into the second RAM memory area 302, as shown at a moment T3. Still at the moment T3, the terminal reads the Old data 01 block n1 from the first RAM memory area 301 and the second RAM memory area 302, reads the Diff data 01 block n1 from the third RAM memory area 303 and the fourth RAM memory area 304, and performs the addition operation. The terminal may perform the addition operation on the Diff data 01 block n1 and the Old data 01 block n1, so that a New data 01 block n1 obtained through the addition operation can be written into the third RAM memory area 303 and the fourth RAM memory area 304. Further, at a moment T4, the terminal may read the New data 01 block n1 from the third RAM memory area 303 and the fourth RAM memory area 304 and write the New data 01 block n1 into a static-state image file.

It is assumed that a byte length of an Extra data block before the last Extra data compressed block (for example, the Extra data 01 compressed block n2) described by a specific zone is compressed is greater than zonesize. The following describes a procedure in which the terminal performs data restoration processing based on the Extra data 01 compressed block n2.

Figure 19:
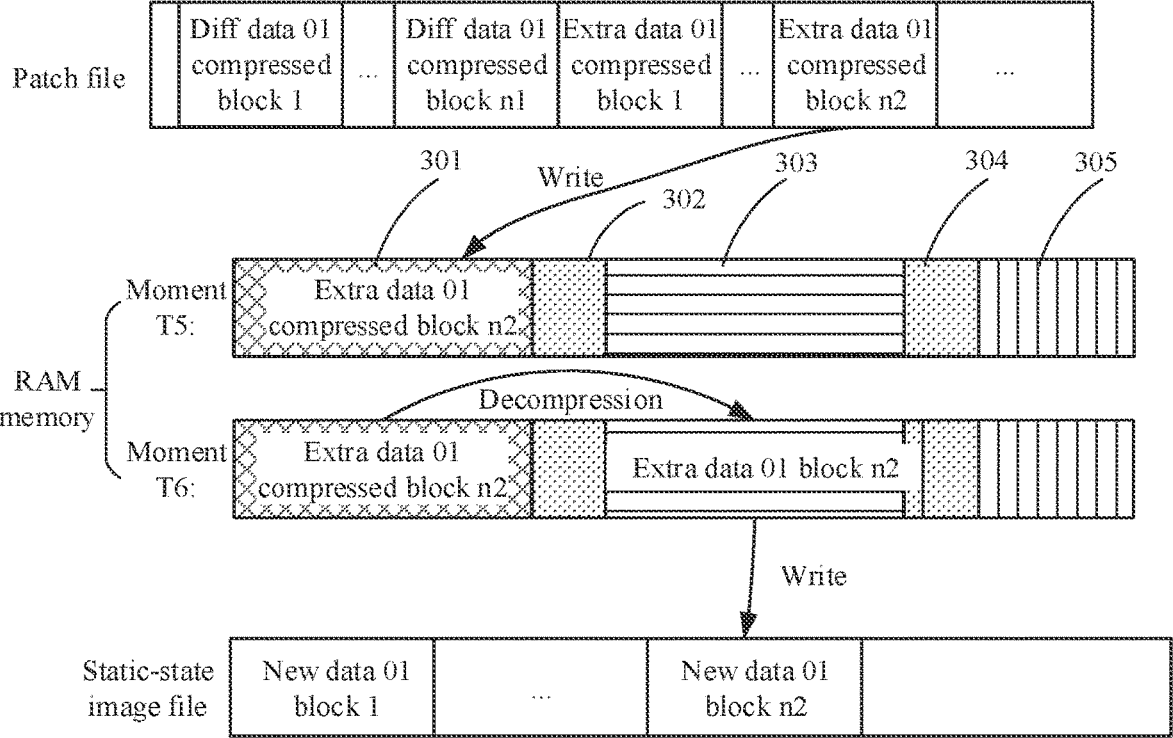
FIG. 19 is a schematic diagram of RAM space occupation when data restoration is performed based on an Extra data compressed block according to an embodiment.

For example, refer to FIG. 19. At a moment T5, the terminal reads the Extra data 01 compressed block n2 from the Patch file, and writes the Extra data 01 compressed block n2 into the first RAM memory area 301. Then, the terminal invokes the data compression algorithm to decompress the Extra data 01 compressed block n2 in the first RAM memory area 301. A RAM memory area used for performing a decompression process based on the data compression algorithm is the fifth RAM memory area 305, and data obtained through decompression is written into the third RAM memory area 303. At a moment T6, the Extra data 01 compressed block n2 is decompressed, and the Extra data 01 block n2 obtained through decompression is temporarily stored in the third RAM memory area 303. Because a byte length of the Extra data 01 block n2 before compression is greater than zonesize, the third RAM memory area 303 is fully filled with the Extra data 01 block n2, and a part of data is further written into the fourth RAM memory area 304. Further, at the moment T6, the terminal may read the Extra data 01 block n2 from the third RAM memory area 303 and the fourth RAM memory area 304 and continue to write the Extra data 01 block n2 into the static-state image file. In this case, data in the static-state image file is restored to a New data 01 block n2.

In an example, if the terminal obtains the value of the flag field in the header of the Patch file through parsing, and determines that there are data blocks (including the Diff data block and the Extra data block) whose byte lengths are greater than zonesize, data restoration processing may be performed according to processing procedures shown in FIG. 17 and FIG. 18.

In this way, when a size of a specific data block is slightly greater than zonesize, the terminal may also complete a corresponding data restoration operation by using the safety buffer area.

In an example, in the data structure of the Patch file, in addition to being filled with the zonesize field, the Header may be further filled with a data compressed block maximum byte length (LengthMAX) field, and a value of the field is used to indicate a maximum data size for the data compressed blocks (including the Diff data compressed block and the Extra data compressed block).

In this case, when parsing the Patch file, the terminal may determine, based on the value of the LengthMAX field, whether the received Patch file is incorrect. For example, assuming that a size of a specific Diff data compressed block or Extra data compressed block in the Patch file exceeds the value of the LengthMAX field, the terminal may determine that the Patch file is incorrect, and does not perform the data restoration operation based on the Patch file.

In still another example, in the data structure of the Patch file, in addition to being filled with the zonesize field, the Header may be further filled with a target file data total length (NewfileLength) field, and a value of the field is used to indicate a data total length of a target file obtained through restoration based on the Patch file.

In this case, when performing target file restoration based on the Patch file, the terminal may determine, based on the value of the NewfileLength field, whether the target file obtained through restoration is correct. For example, assuming that a data length of the target file obtained through data restoration based on the Patch file is less than or greater than the value of the NewfileLength field, the terminal may determine that the target file obtained through restoration is incorrect, and does not perform a firmware upgrade based on the target file.

In still another example, the data structure of the Patch file may further include a check field, and a value of the field is used to indicate a hash value of the target file obtained through restoration based on the Patch file.

When performing target file restoration based on the Patch file, the terminal may further determine, based on the value of the check field, whether the target file obtained through restoration is correct. For example, assuming that the hash value of the target file obtained through data restoration based on the Patch file is different from the value of the check field, the terminal may determine that the target file obtained through restoration is incorrect, and does not perform a firmware upgrade based on the target file.

In this way, in this embodiment of this application, the Patch data is split into differential restoration unit data with a controllable size, and a data size of the differential restoration unit data is related to a size of the RAM space of the terminal, so that the terminal device needs to process only one piece of differential restoration unit data each time, and the lightweight device with limited RAM space can also have a differential restoration capability.

The foregoing uses a group of image files (including the running-state image file and the static-state image file) as an example for description. Similarly, another static-state image file may be correspondingly fully filled with data based on another Patch file, to obtain all image files corresponding to an upgrade package. In this case, the terminal may perform the firmware upgrade based on these image files. For descriptions in which the terminal performs the firmware upgrade based on these image files, refer to the conventional technology. Details are not described herein again.

It should be noted that, in the foregoing differential file generation method embodiment, an example in which the Diff data is generated by the server based on a subtraction operation is used for description. Correspondingly, in the foregoing differential file restoration method embodiment, an example in which the terminal performs restoration on the Diff data based on the addition operation is used for description. The Diff data may alternatively be generated by the server based on another operation, and it is temporarily referred to as generating the Diff data by the server based on a first operation. Correspondingly, the terminal may perform restoration on the Diff data based on a second operation, where the second operation is an inverse operation of the first operation. The first operation and the second operation are not limited in this embodiment.

It should be noted that, in the foregoing differential file generation method embodiment and the foregoing differential file restoration method embodiment, a firmware file is used as an example for description. The differential file generation method and the differential file restoration method provided in the embodiments are further applicable to differentiation and restoration processing of another file type, for example, a patch file or an APK (Android application package, Android application package).

In addition, the differential file restoration method provided in this embodiment of this application is applicable to a lightweight electronic device with small RAM memory space (for example, with a size less than a first preset threshold) and another electronic device that has small RAM memory space (for example, with a size less than a second preset threshold) and that can be used to perform differential file restoration.

That is, when RAM memory space of an electronic device is not small, but RAM memory space allocated by the electronic device for differential file restoration is small, the electronic device may perform the differential file restoration method provided in this embodiment, to implement a differential file restoration function by using the small RAM memory space.

FIG. 20 shows an example of an application scenario. As shown in (1) of FIG. 20, when a user plays a game by using a mobile phone, a dialog box 700 pops up on an interface. Content in the dialog box 700 is displayed as "An xx patch is currently detected, do you want to download it immediately for an upgrade?". If the user agrees to download the xx patch, the user may tap a "Yes" option 701. In response to the operation of the user, the dialog box disappears. As shown in (2) of FIG. 20, the user continues to play the game by using the mobile phone. Meanwhile, the xx patch is downloaded at a background of the mobile phone, a differential file restoration operation is performed based on the downloaded xx patch, and a hot upgrade is performed based on a restored patch file.

In this application scenario, although RAM memory space of the mobile phone is not small, RAM memory space allocated by the mobile phone for performing the differential file restoration operation is limited, so as not to affect user experience of using the mobile phone. In this case, if the mobile phone performs the differential file restoration method provided in the embodiments of this application, a differential data restoration function may be implemented by using small RAM memory space, and user experience is not affected.

In some other application scenarios, assuming that the user enables an APK automatic upgrade function of the mobile phone, when the user uses the mobile phone, APK differential package download and a differential restoration operation may be performed at the background of the mobile phone. Although the RAM memory space of the mobile phone is not small, RAM memory space allocated by the mobile phone for performing the differential file restoration operation is usually small, thereby avoiding effecting user experience. In this case, if the mobile phone performs the differential file restoration method provided in the embodiments of this application, a differential data restoration function may be implemented by using small RAM memory space, and user experience is not affected.

However, in an actual application, terminal devices of a same type often have a plurality of versions. All the terminal devices of the plurality of versions may have a firmware upgrade requirement, and hardware configurations of terminal devices of different versions are not necessarily the same (usually, hardware resource configurations are different). If an upgrade differential package is developed separately for a terminal device of each version, a quantity of versions of upgrade differential packages is undoubtedly increased, resulting in increased manual maintenance costs. Therefore, to reduce the quantity of versions of the upgrade differential packages, a same upgrade differential package may be developed for the terminal devices of the plurality of versions, to meet a scenario requirement of "one-package-multi-delivery", and implement unification for upgrade differential packages of terminal devices of different versions.

When a differential file in the upgrade differential package is generated based on the foregoing solution, if RAM memory space allocated by the terminal device for differential file restoration is large, how to improve differential file restoration efficiency is a problem that needs to be resolved.

To resolve the foregoing problem, an embodiment of this application further provides a differential file restoration method. The terminal device can adaptively perform differential file restoration based on the RAM memory space used for differential file restoration, to improve differential file restoration efficiency.

In the foregoing descriptions, referring to FIG. 13, the compressed blocks (including the Diff data compressed blocks and the Extra data compressed blocks) in the Patch file are serially processed. When the RAM memory space allocated by the terminal device for differential file restoration is large, restoration processing of the compressed blocks may be performed in parallel, thereby improving differential file restoration efficiency. Parallelization of restoration processing of the compressed blocks is related to a size of the RAM memory space allocated by the terminal device for differential file restoration.

As described above, referring to FIG. 16 and FIG. 17, the terminal device may implement restoration processing on one compressed block (a Diff data compressed block or an Extra data compressed block) based on the first RAM memory area 301, the second RAM memory area 302, the third RAM memory area 303, the fourth RAM memory area 304, and the fifth RAM memory area 305. Sizes of the first RAM memory area 301 and the third RAM memory area 303 are equal and are zonesize (bytes); the fifth RAM memory area 305 has a size of N1 bytes, and is used for a data decompression operation; the second RAM memory area 302 is a safety buffer area of the first RAM memory area 301, the fourth RAM memory area 304 is a safety buffer area of the third RAM memory area 303, and both the second RAM memory area 302 and the fourth RAM memory area 304 are N2 bytes.

In this way, in addition to providing the fifth RAM memory area for the data decompression operation, a group of RAM space (that is, the first RAM memory area 301, the second RAM memory area 302, the third RAM memory area 303, and the fourth RAM memory area 304) can be used to implement restoration processing on one compressed block. Therefore, parallelization of restoration processing for a plurality of compressed blocks can be implemented, provided that the terminal device can further provide a plurality of groups of RAM space in addition to the fifth RAM memory area, thereby improving differential file restoration efficiency.

Figure 21A:
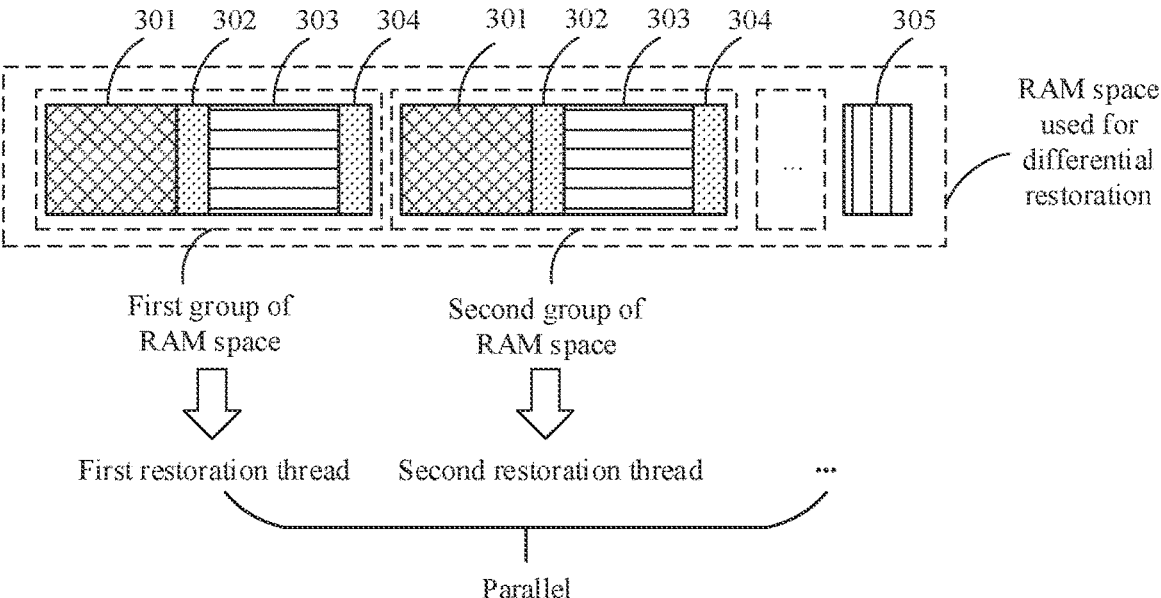
FIG. 21A is a schematic diagram of an example of parallel RAM space division for a restoration thread.

For example, refer to FIG. 21A. A first group of RAM space is used by a first restoration thread to perform restoration processing on a compressed block (a Diff data compressed block or an Extra data compressed block), a second group of RAM space is used by a second restoration thread to perform restoration processing on a compressed block (a Diff data compressed block or an Extra data compressed block), and the first restoration thread is parallel to the second restoration thread. In this way, when the terminal device can provide the plurality of groups of RAM space, the terminal device can perform restoration processing on the Diff data compressed blocks or the Extra data compressed blocks by using a plurality of parallel restoration threads.

In an optional implementation, the RAM space used by the terminal device for differential file restoration processing is a static array, and a group of RAM space corresponding to each restoration thread may be separately divided from the static array, so that each restoration thread performs restoration processing on the compressed block (the Diff data compressed block or the Extra data compressed block) based on a corresponding group of RAM space.

For example, as shown in FIG. 21A, groups of RAM space (including the first RAM memory area 301, the second RAM memory area 302, the third RAM memory area 303, and the fourth RAM memory area 304) and the fifth RAM memory area 305 are sequentially divided from the static array, where one group of RAM space corresponds to one restoration thread.

Figure 21B:
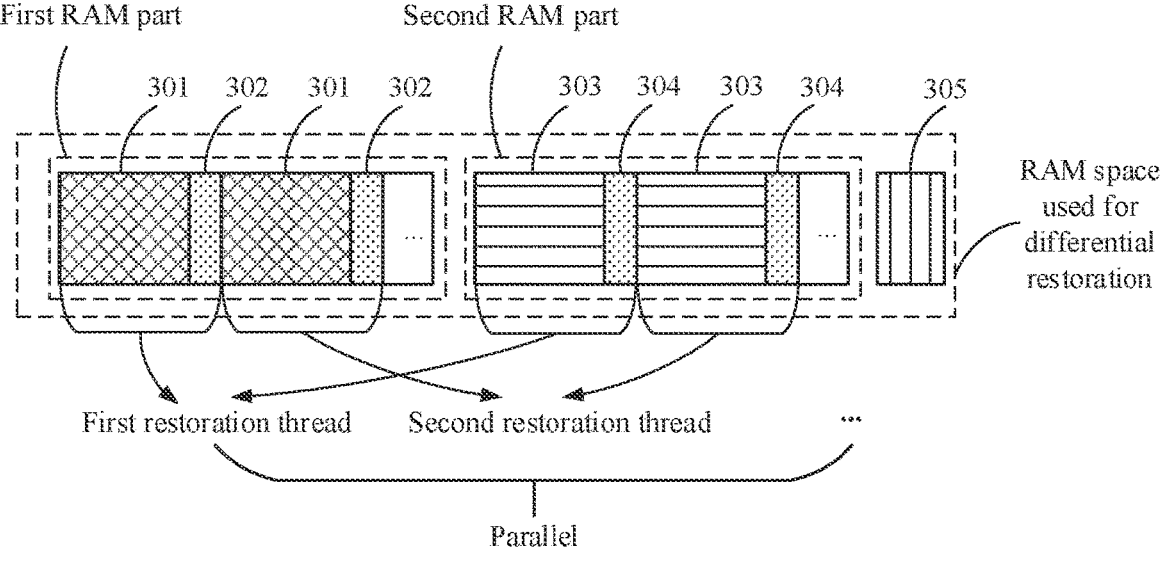
FIG. 21B is a schematic diagram of an example of parallel RAM space division for a restoration thread.

For another example, as shown in FIG. 21B, a first RAM part, a second RAM part, and the fifth RAM memory area 305 are sequentially divided from the static array. A plurality of pairs of first RAM memory area 301 and second RAM memory area 302 are sequentially divided from the first RAM part. A plurality of pairs of third RAM memory area 303 and fourth RAM memory area 304 are sequentially divided from the second RAM part. A pair of first RAM memory area 301 and second RAM memory area 302 and a pair of third RAM memory area 303 and fourth RAM memory area 304 correspond to one restoration thread.

It should be noted that division of the RAM space is merely an example for description. This is not limited in this embodiment. Parallelization of restoration of the compressed blocks can be implemented, provided that each restoration thread separately corresponds to one group of RAM space (including the first RAM memory area 301, the second RAM memory area 302, the third RAM memory area 303, and the fourth RAM memory area 304).

In this embodiment of this application, in a restoration process of Patch data, each group of incremental upgrade data may be used as a unit for independently performing a restoration operation by the restoration thread. A group of incremental upgrade data is incremental upgrade data described by one control block (zone). Usually, a group of incremental upgrade data includes a Diff data block and an Extra data block, and there are one or more Diff data blocks and one or more Extra data blocks. In a special case, a group of incremental upgrade data includes only a Diff data block or an Extra data block.

Figure 22:
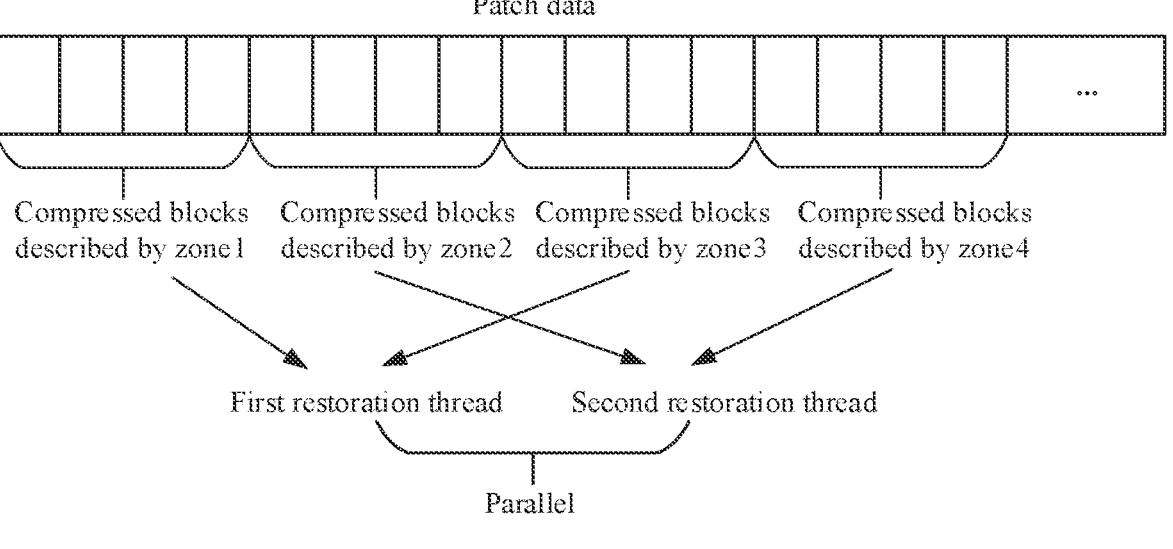
FIG. 22 is a schematic diagram of an example of differential data parallel restoration.

For example, the terminal device creates a first restoration thread and a second restoration thread that are parallel, to restore the Patch data. As shown in FIG. 22, the first restoration thread is used to perform restoration processing on a compressed block described by zone1, the second restoration thread is used to perform restoration processing on a compressed block described by zone2, the first restoration thread is used to perform restoration processing on a compressed block described by zone3, the second restoration thread is used to perform restoration processing on a compressed block described by zone4, and so on. In this way, the terminal device can implement restoration processing on the Patch data based on two parallel restoration threads, thereby improving restoration efficiency of the Patch data.

When each restoration thread performs restoration processing on compressed blocks described by a specific zone, the restoration thread sequentially performs restoration processing on Diff data blocks and Extra data blocks described by the zone. For an operation in which the restoration thread sequentially performs restoration processing on the Diff data blocks and the Extra data blocks, refer to the foregoing descriptions. Details are not described herein again.

To implement parallelization of restoration for the Patch data, the data structure of the Patch file is adaptively adjusted in this embodiment. FIG. 23 shows an example of a data structure of a Patch file according to an embodiment. As shown in FIG. 23, the data structure of the Patch file includes a header (Header), a control block (zone), Diff data, and Extra data. For descriptions of the Diff data and the Extra data, refer to the foregoing descriptions. The Diff data and the Extra data are the same as those in the data structure of the Patch file shown in FIG. 8.

Different from the data structure of the Patch file shown in FIG. 8, the header (Header) of the data structure of the Patch file shown in FIG. 23 further includes a total quantity of control blocks (zone).

Different from the data structure of the Patch file shown in FIG. 8, in the data structure of the Patch file shown in FIG. 23, each zone includes a first pointer offset used to read data from an old file and a second pointer offset used to write data into a new file. The first pointer offset is a pointer offset determined based on a start location of the old file, and the second pointer offset is a pointer offset determined based on a start location of the new file. In addition, each zone further needs to include a sum of byte lengths obtained after a plurality of Diff data blocks and a plurality of Extra data blocks described by the zone are compressed, for example, a total byte length obtained after the plurality of Diff data blocks are compressed and a total byte length obtained after the plurality of Extra data blocks are compressed.

In this embodiment, the first pointer offset is used to read, from the old file, old data corresponding to the first Diff data block described by the zone, that is, read, from the old file, old data used to be subjected to an addition operation with the first Diff data block described by the zone. The second pointer offset is used to determine a head address for writing restored data corresponding to the zone into the new file. In this way, when the plurality of restoration threads process, in parallel, data blocks described by the zones, the plurality of restoration threads may determine, based on second pointer offsets in the zones, head addresses for writing restored data corresponding to the zones into the new file.

In this embodiment, a total byte length obtained after a plurality of Diff data blocks described by one zone are compressed and a total byte length obtained after a plurality of Extra data blocks described by the zone are compressed may be used by the restoration thread to calculate an address offset of a next zone in the Patch file. That is, the total byte lengths may be used to skip the data compressed blocks described by the zone when the restoration thread reads data from the Patch file, to read data filled in the next zone. That is, the restoration thread may read, based on total byte lengths obtained after a plurality of Diff data blocks described by the zones are compressed and total byte lengths obtained after a plurality of Extra data blocks described by the zones are compressed, a data compressed block described by a zone that needs to be processed by the restoration thread. For example, if a specific restoration thread needs to perform a restoration operation on data compressed blocks described by zone2, the restoration thread may determine, based on a total byte length obtained after a plurality of Diff data blocks described by zone1 are compressed and a total byte length obtained after a plurality of Extra data blocks described by zone1 are compressed, a total byte length of Diff data compressed blocks and Extra data compressed blocks described by zone1, so that the restoration thread skips these Diff data compressed blocks and Extra data compressed blocks when reading data from the Patch file, to read data filled in zone2. Similarly, if the restoration thread needs to perform the restoration operation for data compressed blocks described by zone4, a similar operation needs to be performed. Details are not described herein again.

For example, refer to FIG. 23. Each zone includes 32 bytes, and is used to describe a plurality of Diff data compressed blocks and a plurality of Extra data compressed blocks. The plurality of Diff data compressed blocks and the plurality of Extra data compressed blocks correspond to the pair of Diff data and Extra data in the Patch data obtained based on the BSDiff algorithm. Data recorded in the zone may be used as coding information of the plurality of Diff data compressed blocks and the plurality of Extra data compressed blocks that are described by the zone. The first eight bytes of the zone may record total byte lengths of corresponding Diff data obtained before and after the plurality of Diff data compressed blocks are compressed, and description information (for example, a byte length obtained after compression) of the Diff data compressed blocks; eight bytes in the second part of the zone may record total byte lengths of corresponding Extra data obtained before and after the plurality of Extra data compressed blocks are compressed, and description information of the Extra data compressed blocks (for example, a byte length obtained after compression); eight bytes in the third part of the zone are used to be filled with a first pointer offset, where the first pointer offset is used to determine a location for reading data (that is, data used to be subjected to the addition operation with a Diff data block) from the old file; and eight bytes in the fourth part of the zone are used to be filled with a second pointer offset, where the second pointer offset is used to determine a location for writing data (that is, data obtained through the restoration operation) into the new file.

In another optional implementation, each zone includes 32 bytes, and is used to describe a plurality of Diff data compressed blocks and a plurality of Extra data compressed blocks. The first eight bytes of the zone may record total byte lengths of corresponding Diff data obtained before and after the plurality of Diff data compressed blocks are compressed; eight bytes in the second part of the zone may record total byte lengths of corresponding Extra data obtained before and after the plurality of Extra data compressed blocks are compressed; eight bytes in the third part of the zone are used to be filled with a first pointer offset, where the first pointer offset is used to determine a location for reading data (that is, data used to be subjected to the addition operation with a Diff data block) from the old file; and eight bytes in the fourth part of the zone are used to be filled with a second pointer offset, where the second pointer offset is used to determine a location for writing data (that is, data obtained through the restoration operation) into the new file. A structure of the zone may also be applied to the data structure of the Patch file shown in FIG. 10, or may be applied to another data structure of the Patch file provided in the embodiments of this application, so that when the plurality of restoration threads process, in parallel, the data blocks described by the zones, the plurality of restoration threads can determine, based on the second pointer offsets in the zones, the head addresses for writing the restored data corresponding to the zones into the new file.

A sequence of filling the first pointer offset and the second pointer offset in the zone is not limited in this embodiment.

For example, the restoration thread may further determine sequence numbers of the zones based on a sequence of reading the zones from the Patch file, and determine, based on a sequence number of a zone, whether data compressed blocks described by the zone need the restoration thread to perform restoration processing.

For another example, each zone may alternatively be filled with a sequence number of the zone, so that each restoration thread can determine, based on the read sequence number of the zone, whether the data compressed blocks described by the zone need the restoration thread to perform restoration processing.

In an optional implementation, it is assumed that k restoration threads perform restoration processing for the Patch file in parallel. It may be determined, based on a residual result of dividing a sequence number of a zone by the quantity of restoration threads, whether data compressed blocks described by the zone need the restoration thread to perform restoration processing.

It is assumed that the sequence numbers of the zones start from 1. For a zone numbered x, if x % k=1, data compressed blocks described by the zone are processed by a restoration thread 1; if x % k=2, data compressed blocks described by the zone are processed by the restoration thread 2; if x % k=n and $0 < n \leq k-1$, data compressed blocks described by the zone are processed by a restoration thread n; or if x % k=k−1, data compressed blocks described by the zone are processed by a restoration thread k. % represents a residual operation.

It is assumed that the sequence numbers of the zones start from 0. For a zone numbered x, if x % k=0, data compressed blocks described by the zone are processed by a restoration thread 1; if x % k=1, data compressed blocks described by the zone are processed by a restoration thread 2; if x % k=n and $0 < n \leq k-1$, data compressed blocks described by the zone are processed by a restoration thread n+1; or if x % k=k−1, data compressed blocks described by the zone are processed by a restoration thread k.

In another optional implementation, assuming that a quantity of zones is x, the x zones may be evenly classified into k parts. Data compressed blocks described by zones corresponding to a first part are processed by a restoration thread 1, data compressed blocks described by zones corresponding to a second part are processed by a restoration thread 2, and so on.

In this way, sequence numbers of zones that correspond to each restoration thread may be determined. When a specific restoration thread corresponds to a sequence number of a zone, it means that data compressed blocks described by the zone need to be processed by the restoration thread.

In this embodiment, restoration operation execution linked lists may be respectively created for the k parallel restoration threads based on residual results of dividing the sequence numbers of the zones by the quantity of restoration threads. In each restoration operation execution linked list, data filled in nodes is a sequence number of a zone and an address offset of the zone in the Patch file. The address offset of the zone in the Patch file may be an address offset relative to a file start location. It should be noted that address offsets of the zones in the Patch file may be calculated based on the sequence numbers of the zones and total byte lengths of the data compressed blocks described by the zones. For example, an address offset of zone2 relative to the file start location is an accumulative sum of an address offset of zone1 relative to the file start location and a total byte length of data compressed blocks described by zone1, an address offset of zone3 relative to the file start location is an accumulative sum of an address offset of zone2 relative to the file start location and a total byte length of data compressed blocks described by zone2, and so on.

Further, the restoration threads may read corresponding zones from the Patch file based on data in nodes in corresponding restoration operation execution linked lists, and perform data restoration processing on data compressed blocks described by the zones.

An embodiment of this application provides a differential file restoration method. A procedure of the differential file restoration method specifically includes the following steps.

S501: An electronic device parses a Patch file to obtain a block size zonesize and a total quantity x of control blocks.

For example, the block size zonesize and the total quantity x of control blocks (zone) may be carried in a header of the Patch file.

After obtaining the Patch file, the electronic device parses the header of the Patch file. After learning of a file type based on a magic number recorded in the header, the electronic device may read zonesize and the total quantity x of control blocks from the header.

S502: The electronic device determines, based on a size M of RAM space used for differential restoration and zonesize, whether the electronic device supports differential file restoration processing; and if the electronic device supports differential file restoration processing, the electronic device performs S503; or if the electronic device does not support differential file restoration processing, the electronic device performs error reporting processing.

The electronic device may calculate, based on zonesize, minimum RAM space required for performing a restoration operation on the Patch file. If the size M of the RAM space used by the electronic device for differential restoration is less than the minimum RAM space required for the restoration operation, the electronic device may determine that the electronic device cannot support differential file restoration processing, and perform error reporting processing.

If the size M of the RAM space used by the electronic device for differential restoration is greater than or equal to the minimum RAM space required for the restoration operation, the electronic device may determine that the electronic device can support differential file restoration processing.

As described above, the minimum RAM space required for performing the restoration operation on the Patch file is (zonesize+N2)*2+N1. N1 is a size of RAM memory space required for running a data compression algorithm, and N2 is a size of RAM memory space occupied by a safety buffer area. For example, N2=2 KB and N1=16 KB.

If the size M of the RAM space used by the electronic device for differential restoration is greater than or equal to (zonesize+N2)*2+N1, the electronic device may determine that the electronic device can support differential file restoration processing.

It should be noted that the RAM space used by the electronic device for differential restoration mentioned herein is continuous, for example, is implemented by using a static array. If the RAM space used by the electronic device for differential restoration is discontinuous and is dynamically allocated, the electronic device needs to apply for two RAM memory areas of a size (zonesize+N2) and one RAM memory area of the size N1, so that the electronic device can perform differential file restoration processing.

S503: The electronic device determines a parallel quantity k of restoration threads based on M and zonesize.

When the size M of the RAM space used by the electronic device for differential restoration is large, the electronic device may complete the restoration operation on the Patch file by using several parallel restoration threads, thereby improving restoration efficiency of the Patch file.

When the RAM space used by the electronic device for differential restoration is continuous RAM space (for example, a static array), the parallel quantity of restoration threads is k=[(M−N1)/(zonesize+N2)]. [ ] represents a rounding operation. If the parallel quantity k≥2, the electronic device may perform restoration processing on data compressed blocks in the Patch file in parallel by using the k restoration threads.

When the RAM space used by the electronic device for differential restoration is discontinuous RAM space, the electronic device may dynamically apply for the RAM space. If the electronic device can apply for 2 k (k≥2) RAM memory areas of a size (zonesize+N2) and one RAM memory area of the size N1, the electronic device may perform restoration processing on the data compressed blocks in the Patch file in parallel by using the k restoration threads.

S504: The electronic device determines whether k is greater than or equal to 2; and if k is not greater than or equal to 2, the electronic device performs S505; or if k is greater than or equal to 2, the electronic device performs S506.

When k is not greater than or equal to 2, because it is previously determined that the electronic device supports differential file restoration processing, k=1, and the electronic device performs differential file restoration processing by using a single thread.

S505: The electronic device performs differential file restoration processing by using a single thread.

When the electronic device performs differential file restoration processing by using the single thread, the data compressed blocks described by zones in the Patch file are sequentially serially processed. For details, refer to the foregoing related descriptions. Details are not described herein again.

S506: The electronic device creates k restoration threads.

The electronic device creates a corresponding quantity of restoration threads based on the determined parallel quantity k, to implement parallel restoration processing on data compressed blocks described by different zones in the Patch file.

S507: The electronic device divides a group of RAM space corresponding to each restoration thread, and creates a restoration operation linked list corresponding to each restoration thread based on the total quantity x of control blocks.

For example, it is assumed that the parallel quantity k=2. The electronic device creates a first restoration thread and a second restoration thread, to perform parallel restoration processing on the data compressed blocks described by different zones in the Patch file.

For each restoration thread, the electronic device needs to divide a group of RAM space corresponding to the restoration thread, including a first RAM memory area 301, a second RAM memory area 302, a third RAM memory area 303, and a fourth RAM memory area 304, as shown in FIG. 21A or FIG. 21B.

For each restoration thread, the electronic device further needs to create a restoration operation linked list corresponding to the restoration thread. As described above, a sequence number of a zone that corresponds to each restoration thread may be determined based on a residual result of dividing the sequence number of the zone by the quantity k of restoration threads. Further, after determining address offsets of the zones in the Patch file, the electronic device may create the restoration operation linked list corresponding to each restoration thread. In the restoration operation linked list, data (data) parts of nodes are filled with a sequence number of a zone and an address offset of the zone corresponding to the sequence number in the Patch file.

For example, the first restoration thread is used as an example, and sequence numbers of zones that correspond to the first restoration thread are zone1, zone3, zone5, and the like. In a restoration operation linked list corresponding to the first restoration thread, a data (data) part of a first node is filled with zone1 and an address offset 1 of zone1 in the Patch file, and a next (next) part is filled with a pointer of a second node; a data (data) part of the second node is filled with zone3 and an address offset 3 of zone3 in the Patch file, and a next (next) part is filled with a pointer of a third node; a data (data) part of the third node is filled with zone5 and an address offset 5 of zone5 in the Patch file, and a next (next) part is filled with a pointer of a fourth node; and so on.

S508: Each restoration thread of the electronic device reads corresponding data compressed blocks from the Patch file based on data in nodes in a corresponding restoration operation linked list, and performs a restoration operation on these data compressed blocks by using a corresponding group of RAM space.

For a node in the restoration operation linked list, the restoration thread sequentially performs restoration processing on data compressed blocks (including a Diff data compressed block and/or an Extra data compressed block) described by a zone corresponding to the node. For a process in which the restoration thread performs restoration processing on each Diff data compressed block or Extra data compressed block by using the corresponding group of RAM space, refer to the foregoing descriptions. Details are not described herein again.

For example, the first restoration thread sequentially processes, by using a first group of RAM space, data compressed blocks described by zone1, zone3, zone5, and the like; and the second restoration thread sequentially processes, by using a second group of RAM space, data compressed blocks described by zone2, zone4, zone6, and the like.

For example, if three Diff data compressed blocks and four Extra data compressed blocks are described by zone1, after sequentially processing the three Diff data compressed blocks and the four Extra data compressed blocks by using the first group of RAM space, the first restoration thread continues to process data compressed blocks described by zone3; and so on.

It should be noted that when the first restoration thread performs restoration processing on the data compressed blocks described by zone1, a head address for writing restored new data into a new file is a location corresponding to a second pointer offset in zone1.

For another example, if five Diff data compressed blocks and two Extra data compressed blocks are described by zone2, after sequentially processing the five Diff data compressed blocks and the two Extra data compressed blocks by using the second group of RAM space, the second restoration thread continues to process data compressed blocks described by zone4; and so on.

It should be noted that when the second restoration thread performs restoration processing on the data compressed blocks described by zone2, a head address for writing restored new data into the new file is a location corresponding to a second pointer offset in zone2.

That is, when each restoration thread performs restoration processing on data compressed blocks described by a zone, a head address for writing restored new data into the new file is a location corresponding to a second pointer offset in the zone.

S509: After the restoration threads complete the restoration operation for corresponding data compressed blocks based on the restoration operation linked lists, the electronic device checks an obtained target file.

Because quantities of data compressed blocks described by the zones are different, duration for the restoration threads to perform the data restoration operation is also different. After the restoration threads complete the restoration operation for the corresponding data compressed blocks based on the restoration operation linked lists, all data compressed blocks in the Patch file are restored.

In this case, the electronic device may determine, based on a value of a check field in the Patch file, whether the target file obtained through restoration is correct. For example, assuming that a hash value of the target file obtained through data restoration based on the Patch file is the same as the value of the check field, the terminal may determine that the target file obtained through restoration is correct; otherwise, the terminal may determine that the target file obtained through restoration is incorrect.

As described above, there may be roughly the following several phases when any restoration thread performs restoration processing on a Diff data block: a phase of reading the Diff data compressed block from the Patch file (first phase for short), a phase of decompressing the Diff data compressed block (second phase for short), a phase of reading data corresponding to the Diff data compressed block from an old file (third phase for short), a phase of synthesizing new data based on old data and the Diff data block (fourth phase for short), and a phase of writing data into the new file (fifth phase for short).

Any restoration thread completes the restoration operation for the Diff data compressed blocks by using a group of RAM space (that is, a first RAM memory area, a second RAM memory area, a third RAM memory area, and a fourth RAM memory area) corresponding to the restoration thread.

Figure 24A:
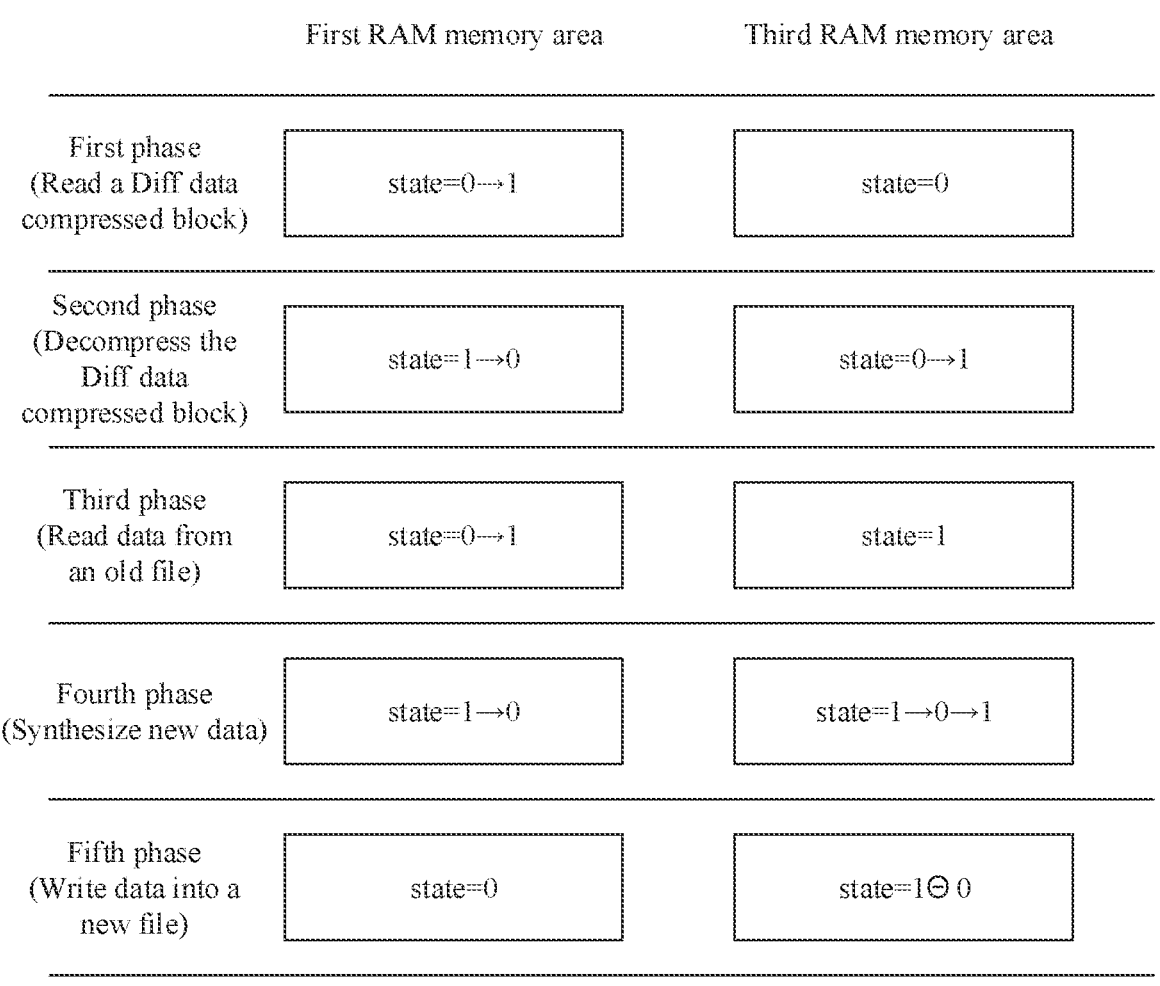
FIG. 24A is a schematic diagram of a change of an occupation state of a RAM memory area when data restoration is performed based on a Diff data compressed block according to an embodiment.

The following analyzes, with reference to FIG. 16 and FIG. 24A, available states of the first RAM memory area and the third RAM memory area in the foregoing several phases. Initial values of the available states of the first RAM memory area and the third RAM memory area indicate "available". Assuming that when state=0, it indicates that a RAM memory area is available, and when state=1, it indicates that a RAM memory area is unavailable.

In the first phase, the restoration thread writes, into the first RAM memory area, the Diff data compressed block read from the Patch file, and changes a state of the first RAM memory area from 0 to 1.

In the second phase, the restoration thread performs a decompression operation on the Diff data compressed block in the first RAM memory area, writes a Diff data block obtained through decompression into the third RAM memory area, changes a state of the third RAM memory area from 0 to 1, and changes the state of the first RAM memory area from 1 to 0.

In the third phase, the restoration thread reads, from a static partition (that is, the old file), the old data (or referred to as source data) corresponding to the Diff data compressed block in the third RAM memory area, writes the old data into the first RAM memory area (to overwrite the Diff data compressed block), and changes the state of the first RAM memory area from 0 to 1.

In the fourth phase, the restoration thread reads the old data from the first RAM memory area, synthesizes new target data based on the old data and Diff data in the third RAM memory area, and writes the synthesized target data into the third RAM memory area. In this phase, the restoration thread changes the state of the third RAM memory area from 1 to 0, and applies for holding an object lock corresponding to the third RAM memory area, to implement data protection for the third RAM memory area. After completing a data synthesis operation, the restoration thread releases the object lock corresponding to the third RAM memory area, changes the state of the first RAM memory area from 1 to 0, and changes the state of the third RAM memory area from 0 to 1.

In the fifth phase, the restoration thread writes the synthesized new data in the third RAM memory area into the new file, that is, writes the synthesized new data into a target static partition, and changes the state of the third RAM memory area from 1 to 0 after execution is completed.

It can be learned from analysis of the foregoing procedure that, in the fifth phase, the restoration thread writes the synthesized new data in the third RAM memory area into the new file. After the fifth phase ends, the restoration thread continues to process a next Diff data compressed block or Extra data compressed block, and a processing procedure relates to the foregoing first phase. However, in the fifth phase, the available state of the first RAM memory area is available (state=0), and the first RAM memory area is not used by the restoration thread until the fifth phase ends. In this case, in the fifth phase, the first RAM memory area has a wait delay, which affects processing efficiency of the restoration thread to some extent.

Similarly, as described above, there may be roughly the following several phases when any restoration thread performs restoration processing on an Extra data block: a phase of reading the Extra data compressed block from the Patch file (first phase for short), a phase of decompressing the Extra data compressed block (second phase for short), and a phase of writing data into the new file (fifth phase for short).

Any restoration thread completes the restoration operation for the Extra data compressed blocks by using a group of RAM space (that is, a first RAM memory area, a second RAM memory area, a third RAM memory area, and a fourth RAM memory area) corresponding to the restoration thread.

The following analyzes, with reference to FIG. 17 and FIG. 24B, available states of the first RAM memory area and the third RAM memory area in the foregoing several phases. Initial values of the available states of the first RAM memory area and the third RAM memory area indicate "available". Assuming that when state=0, it indicates that a RAM memory area is available, and when state=1, it indicates that a RAM memory area is unavailable.

In the first phase, the restoration thread writes, into the first RAM memory area, the Extra data compressed block read from the Patch file, and changes a state of the first RAM memory area from 0 to 1.

In the second phase, the restoration thread performs the decompression operation on the Extra data compressed block in the first RAM memory area, writes an Extra data block obtained through decompression into the third RAM memory area, changes a state of the third RAM memory area from 0 to 1, and changes the state of the first RAM memory area from 1 to 0.

In the fifth phase, the restoration thread writes synthesized new data in the third RAM memory area into the new file, that is, writes the synthesized new data into the target static partition, and changes the state of the third RAM memory area from 1 to 0 after execution is completed.

It can be learned from analysis of the foregoing procedure that, in the fifth phase, the restoration thread writes the synthesized new data in the third RAM memory area into the new file. After the fifth phase ends, the restoration thread continues to process a next Extra data compressed block, and a processing procedure also relates to the foregoing first phase. However, in the fifth phase, the available state of the first RAM memory area is available (state=0), and the first RAM memory area is not used by the restoration thread until the fifth phase ends. In this case, in the fifth phase, the first RAM memory area has a wait delay, which affects processing efficiency of the restoration thread to some extent.

Therefore, when the restoration thread continuously processes two data compressed blocks (regardless of the Diff data compressed blocks or the Extra data compressed blocks), restoration processing procedures of the two data compressed blocks are related to both the first phase and the fifth phase. In addition, the first phase of the restoration procedure of the next data compressed block starts only after the fifth phase of the restoration processing procedure of the current data compressed block ends. In this case, the first RAM memory area has a wait delay, which affects processing efficiency of the restoration thread to some extent.

To resolve the foregoing problem, each restoration thread may perform, based on two sub-threads, restoration processing on data compressed blocks described by a zone.

FIG. 25 shows a differential file restoration method according to an embodiment of this application. As shown in FIG. 25, a procedure in which a restoration thread performs a restoration processing operation on data compressed blocks described by a zone may specifically include the following steps.

S601: The restoration thread parses data of the zone.

S602: The restoration thread determines a quantity Diffnum of Diff data compressed blocks described by the zone and a quantity Extranum of Extra data compressed blocks described by the zone, and sets Diff-zone-offset and Extra-zone-offset to 0.

Diff-zone-offset and Extra-zone-offset are global variables. Diff-zone-offset is used to represent a sequence number of a currently processed Diff data compressed block in Diff data compressed blocks described by a current zone; and Extra-zone-offset is used to represent a sequence number of a currently processed Extra data compressed block in Extra data compressed blocks described by a current zone.

In this embodiment, initial values of Diff-zone-offset and Extra-zone-offset are set to 0, and sequence numbers of the Diff data compressed blocks and the Extra data compressed blocks described by the zone start from 1. For example, when Diff-zone-offset is 1, it indicates that the currently processed Diff data compressed block is a Diff data compressed block whose sequence number is 1; and when Extra-zone-offset is 2, it indicates that the currently processed Extra data compressed block is an Extra data compressed block whose sequence number is 2.

Usually, both the quantity Diffnum of Diff data compressed blocks described by the zone and the quantity Extranum of Extra data compressed blocks described by the zone are greater than 0. In a special case, Diffnum or Extranum is 0.

S603: The restoration thread creates and enables a first sub-thread and a second sub-thread, and performs restoration processing on the data compressed blocks described by the zone in parallel by using the first sub-thread and the second sub-thread.

The first sub-thread is used to perform restoration processing on the Diff data compressed block or the Extra data compressed block, the second sub-thread is also used to perform restoration processing on the Diff data compressed block or the Extra data compressed block, and the first sub-thread and the second sub-thread are parallel.

It should be noted that an enable sequence of the first sub-thread and the second sub-thread may be specified, or may be random. This is not limited in this embodiment.

As shown in the foregoing descriptions, when the first sub-thread or the second sub-thread performs restoration processing on the Diff data compressed block, a processing procedure may be divided into a first phase, a second phase, a third phase, a fourth phase, and a fifth phase. When the first sub-thread or the second sub-thread performs restoration processing on the Extra data compressed block, a processing procedure may be divided into a first phase, a second phase, and a fifth phase.

When a restoration processing operation of the sub-thread is performed in different phases, the sub-thread has different processing states. For example, when the restoration processing operation of the sub-thread is performed in the first phase, the sub-thread is in a processing state of reading differential data; when the restoration processing operation of the sub-thread is performed in the second phase, the sub-thread is in a processing state of decompressing the differential data; when the restoration processing operation of the sub-thread is performed in the third phase, the sub-thread is in a processing state of reading source data; when the restoration processing operation of the sub-thread is performed in the fourth phase, the sub-thread is in a processing state of synthesizing target data; and when the restoration processing operation of the sub-thread is performed in the fifth phase, the sub-thread is in a processing state of writing the target data, that is, writing the target data (or new data) into the target file (or the new file).

Figure 26A:
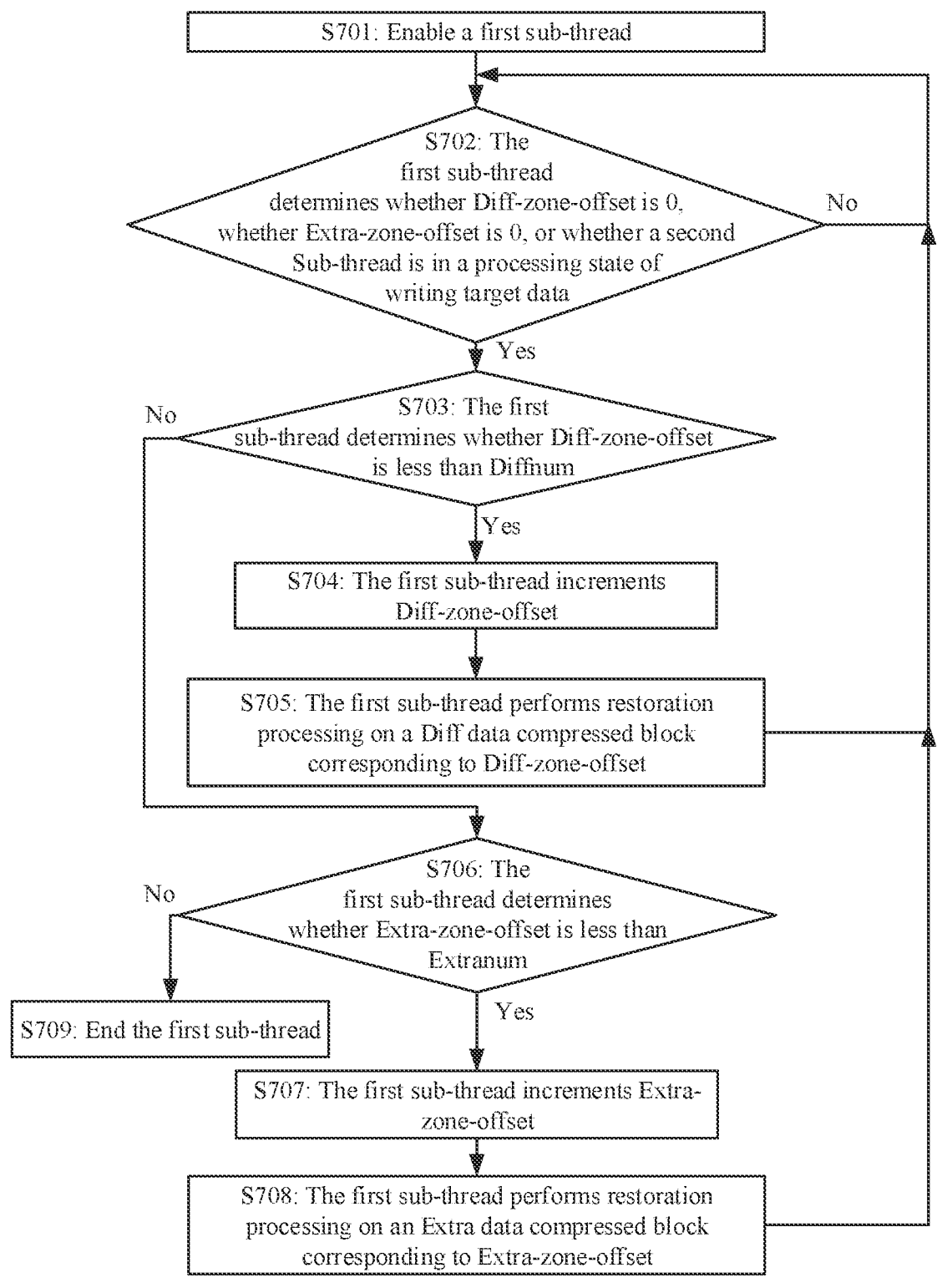
FIG. 26A is a schematic diagram of a processing procedure of a first sub-thread in a restoration thread according to an embodiment.

FIG. 26A shows a processing procedure of the first sub-thread. As shown in FIG. 26A, steps of performing restoration processing on the data compressed blocks by the first sub-thread include:

S701: Enable the first sub-thread.

S702: The first sub-thread determines whether Diff-zone-offset is 0, whether Extra-zone-offset is 0, or whether the second sub-thread is in the processing state of writing the target data; and if Diff-zone-offset is 0, Extra-zone-offset is 0, or the second sub-thread is in the processing state of writing the target data, the first sub-thread performs S703; or if Diff-zone-offset is not 0, Extra-zone-offset is not 0, or the second sub-thread is not in the processing state of writing the target data, the first sub-thread performs S702.

When Diff-zone-offset is 0, it indicates that restoration processing is not performed on the Diff data compressed blocks described by the zone; and when Extra-zone-offset is 0, it indicates that restoration processing is not performed on the Extra data compressed blocks described by the zone.

When the second sub-thread is in the processing state of writing the target data, it indicates that the processing procedure of the second sub-thread for the data compressed block is in the fifth phase. In this case, to avoid the wait delay of the first RAM memory area, the first sub-thread may perform restoration processing on a next data compressed block in this case, to implement parallel processing with the second sub-thread.

If a determining result for the foregoing determining condition is negative, the first sub-thread waits to continue to perform the determining procedure shown in S702.

S703: The first sub-thread determines whether Diff-zone-offset is less than Diffnum; and if Diff-zone-offset is less than Diffnum, the first sub-thread performs S704; or if Diff-zone-offset is not less than Diffnum, the first sub-thread performs S706.

Because Diff-zone-offset is used to represent the sequence number of the currently processed Diff data compressed block in the Diff data compressed blocks described by the current zone, when Diff-zone-offset is less than Diffnum, it indicates that there is an unprocessed Diff data compressed block in the Diff data compressed blocks described by the zone.

S704: The first sub-thread increments Diff-zone-offset.

When Diff-zone-offset is less than Diffnum, Diff-zone-offset is increased by 1 to determine a Diff data compressed block to be processed by the first sub-thread.

S705: The first sub-thread performs restoration processing on a Diff data compressed block corresponding to Diff-zone-offset, and performs S702.

In this case, the first sub-thread performs restoration processing on the Diff data compressed block corresponding to Diff-zone-offset based on the group of RAM space corresponding to the restoration thread. For detailed steps, refer to the foregoing descriptions. Details are not described herein again.

After completing restoration processing for the Diff data compressed block corresponding to Diff-zone-offset, the first sub-thread returns to perform S702, to determine whether a condition for performing restoration processing on a next data compressed block by the first sub-thread is met.

S706: The first sub-thread determines whether Extra-zone-offset is less than Extranum; and if Extra-zone-offset is less than Extranum, the first sub-thread performs S707; or if Extra-zone-offset is not less than Extranum, the first sub-thread performs S709.

Because Extra-zone-offset is used to represent the sequence number of the currently processed Extra data compressed block in the Extra data compressed blocks described by the current zone, when Extra-zone-offset is less than Diffnum, it indicates that there is an unprocessed Extra data compressed block in the Extra data compressed blocks described by the zone.

S707: The first sub-thread increments Extra-zone-offset.

When Extra-zone-offset is less than Extranum, Extra-zone-offset is increased by 1 to determine an Extra data compressed block to be processed by the first sub-thread.

S708: The first sub-thread performs restoration processing on an Extra data compressed block corresponding to Extra-zone-offset, and performs S702.

In this case, the first sub-thread performs restoration processing on the Extra data compressed block corresponding to Extra-zone-offset based on the group of RAM space corresponding to the restoration thread. For detailed steps, refer to the foregoing descriptions. Details are not described herein again.

After completing restoration processing for the Extra data compressed block corresponding to Extra-zone-offset, the first sub-thread returns to perform S702, to determine whether a condition for performing restoration processing on a next data compressed block by the first sub-thread is met.

S709: End the first sub-thread.

When Diff-zone-offset is not less than Diffnum, it indicates that there is no unprocessed Diff data compressed block in the Diff data compressed blocks described by the current zone. When Extra-zone-offset is not less than Extranum, it indicates that there is no unprocessed Extra data compressed block in the Extra data compressed blocks described by the current zone. In this case, the first sub-thread may be ended.

Figure 26B:
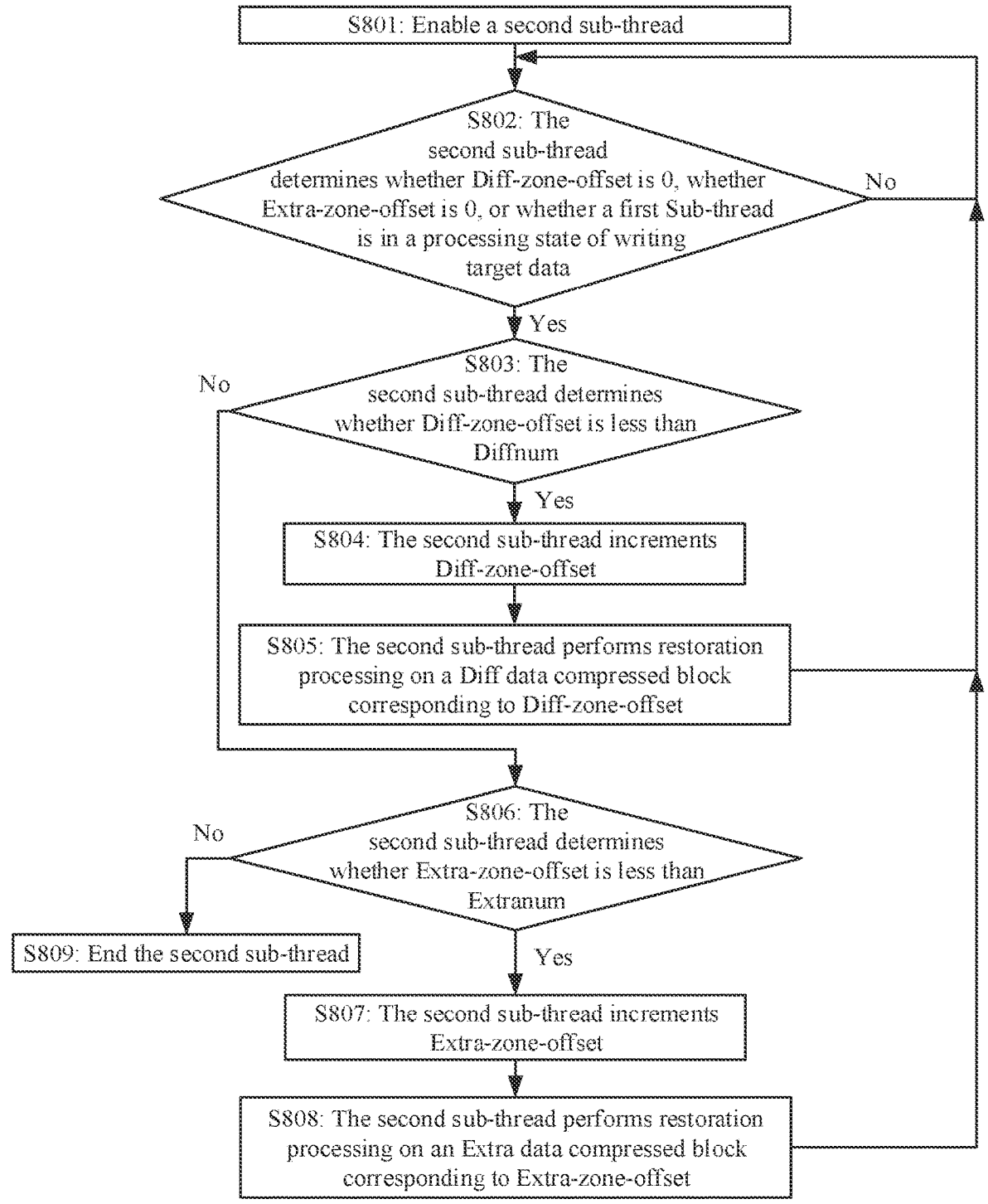
FIG. 26B is a schematic diagram of a processing procedure of a second sub-thread in a restoration thread according to an embodiment.

FIG. 26B shows a processing procedure of the second sub-thread. Similar to the first sub-thread, as shown in FIG. 26B, steps of performing restoration processing on the data compressed blocks by the second sub-thread include:

S801: Enable the second sub-thread.

S802: The second sub-thread determines whether Diff-zone-offset is 0, whether Extra-zone-offset is 0, or whether the first sub-thread is in the processing state of writing the target data; and if Diff-zone-offset is 0, Extra-zone-offset is 0, or the first sub-thread is in the processing state of writing the target data, the second sub-thread performs S803; or if Diff-zone-offset is not 0, Extra-zone-offset is not 0, or the first sub-thread is not in the processing state of writing the target data, the second sub-thread performs S802.

When Diff-zone-offset is 0, it indicates that restoration processing is not performed on the Diff data compressed blocks described by the zone; and when Extra-zone-offset is 0, it indicates that restoration processing is not performed on the Extra data compressed blocks described by the zone.

When the first sub-thread is in the processing state of writing the target data, it indicates that the processing procedure of the first sub-thread for the data compressed block is in the fifth phase. In this case, to avoid the wait delay of the first RAM memory area, the second sub-thread may perform restoration processing on a next data compressed block in this case, to implement parallel processing with the first sub-thread.

If a determining result for the foregoing determining condition is negative, the second sub-thread waits to continue to perform the determining procedure shown in S802.

S803: The second sub-thread determines whether Diff-zone-offset is less than Diffnum; and if Diff-zone-offset is less than Diffnum, the second sub-thread performs S804; or if Diff-zone-offset is not less than Diffnum, the second sub-thread performs S806.

Because Diff-zone-offset is used to represent the sequence number of the currently processed Diff data compressed block in the Diff data compressed blocks described by the current zone, when Diff-zone-offset is less than Diffnum, it indicates that there is an unprocessed Diff data compressed block in the Diff data compressed blocks described by the zone.

S804: The second sub-thread increments Diff-zone-offset.

When Diff-zone-offset is less than Diffnum, Diff-zone-offset is increased by 1 to determine a Diff data compressed block to be processed by the second sub-thread.

S805: The second sub-thread performs restoration processing on a Diff data compressed block corresponding to Diff-zone-offset, and performs S802.

In this case, the second sub-thread performs restoration processing on the Diff data compressed block corresponding to Diff-zone-offset based on the group of RAM space corresponding to the restoration thread. For detailed steps, refer to the foregoing descriptions. Details are not described herein again.

After completing restoration processing for the Diff data compressed block corresponding to Diff-zone-offset, the second sub-thread returns to perform S802, to determine whether a condition for performing restoration processing on a next data compressed block by the second sub-thread is met.

S806: The second sub-thread determines whether Extra-zone-offset is less than Extranum; and if Extra-zone-offset is less than Extranum, the second sub-thread performs S807; or if Extra-zone-offset is not less than Extranum, the second sub-thread performs S809.

Because Extra-zone-offset is used to represent the sequence number of the currently processed Extra data compressed block in the Extra data compressed blocks described by the current zone, when Extra-zone-offset is less than Diffnum, it indicates that there is an unprocessed Extra data compressed block in the Extra data compressed blocks described by the zone.

S807: The second sub-thread increments Extra-zone-offset.

When Extra-zone-offset is less than Extranum, Extra-zone-offset is increased by 1 to determine an Extra data compressed block to be processed by the first sub-thread.

S808: The second sub-thread performs restoration processing on an Extra data compressed block corresponding to Extra-zone-offset, and performs S802.

In this case, the second sub-thread performs restoration processing on the Extra data compressed block corresponding to Extra-zone-offset based on the group of RAM space corresponding to the restoration thread. For detailed steps, refer to the foregoing descriptions. Details are not described herein again.

After completing restoration processing for the Extra data compressed block corresponding to Extra-zone-offset, the second sub-thread returns to perform S802, to determine whether a condition for performing restoration processing on a next data compressed block by the second sub-thread is met.

S809: End the second sub-thread end.

When Diff-zone-offset is not less than Diffnum, it indicates that there is no unprocessed Diff data compressed block in the Diff data compressed blocks described by the current zone. When Extra-zone-offset is not less than Extranum, it indicates that there is no unprocessed Extra data compressed block in the Extra data compressed blocks described by the current zone. In this case, the second sub-thread may be ended.

S604: The restoration thread determines whether all the data compressed blocks described by the zone are processed, and whether both the first sub-thread and the second sub-thread are ended; and if all the data compressed blocks described by the zone are processed, and both the first sub-thread and the second sub-thread are ended, the restoration thread performs S605; or if not all the data compressed blocks described by the zone are processed, and the first sub-thread and the second sub-thread are not ended, the restoration thread performs S604.

The restoration thread determines whether all the data compressed blocks described by the zone are processed, and whether both the first sub-thread and the second sub-thread are ended; and if not all the data compressed blocks described by the zone are processed, and the first sub-thread and the second sub-thread are not ended, the restoration thread waits to continue to perform determining; or if all the data compressed blocks described by the zone are processed, and both the first sub-thread and the second sub-thread are ended, the restoration processing operation of the restoration thread for the data compressed blocks described by the zone is ended.

S605: End the restoration processing operation of the restoration thread for the data compressed blocks described by the zone.

After the restoration processing operation for data compressed blocks described by a zone is ended, the restoration thread may continue to perform, based on the restoration operation execution linked list corresponding to the restoration thread, restoration processing on data compressed blocks described by a next zone. For a processing procedure, still refer to S601-S605. Details are not described herein again. The restoration thread is not ended until the data compressed blocks described by the zones in the restoration operation execution linked list are processed.

In this way, when a restoration thread performs restoration processing on data compressed blocks described by a zone by using two sub-threads, restoration efficiency of the data compressed blocks can also be improved.

Figure 27A:
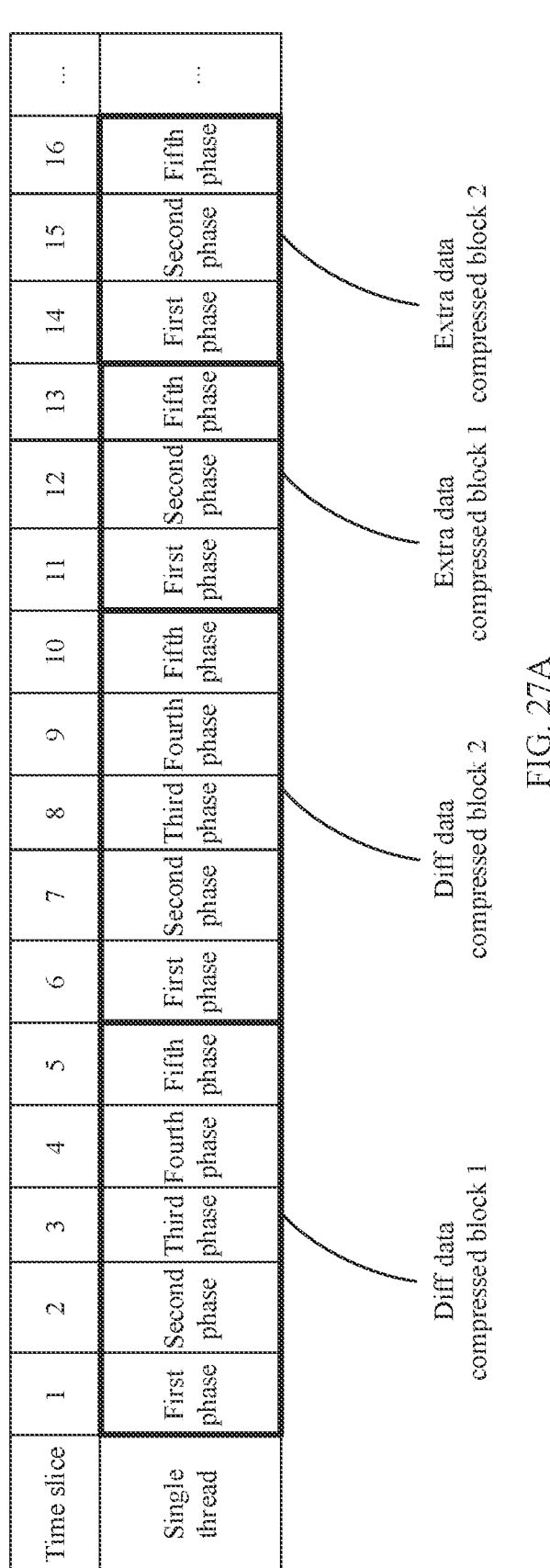
FIG. 27A is a schematic diagram of duration of performing continuous data compressed block restoration based on a single thread according to an embodiment.

As shown in FIG. 27A, when restoration processing is performed on data compressed blocks described by a zone by using a single restoration thread, the first phase of a restoration procedure of a next data compressed block starts only after the fifth phase of a restoration processing procedure of a current data compressed block ends. In this case, the first RAM memory area has a wait delay, which affects processing efficiency of the restoration thread to some extent.

Figure 27B:
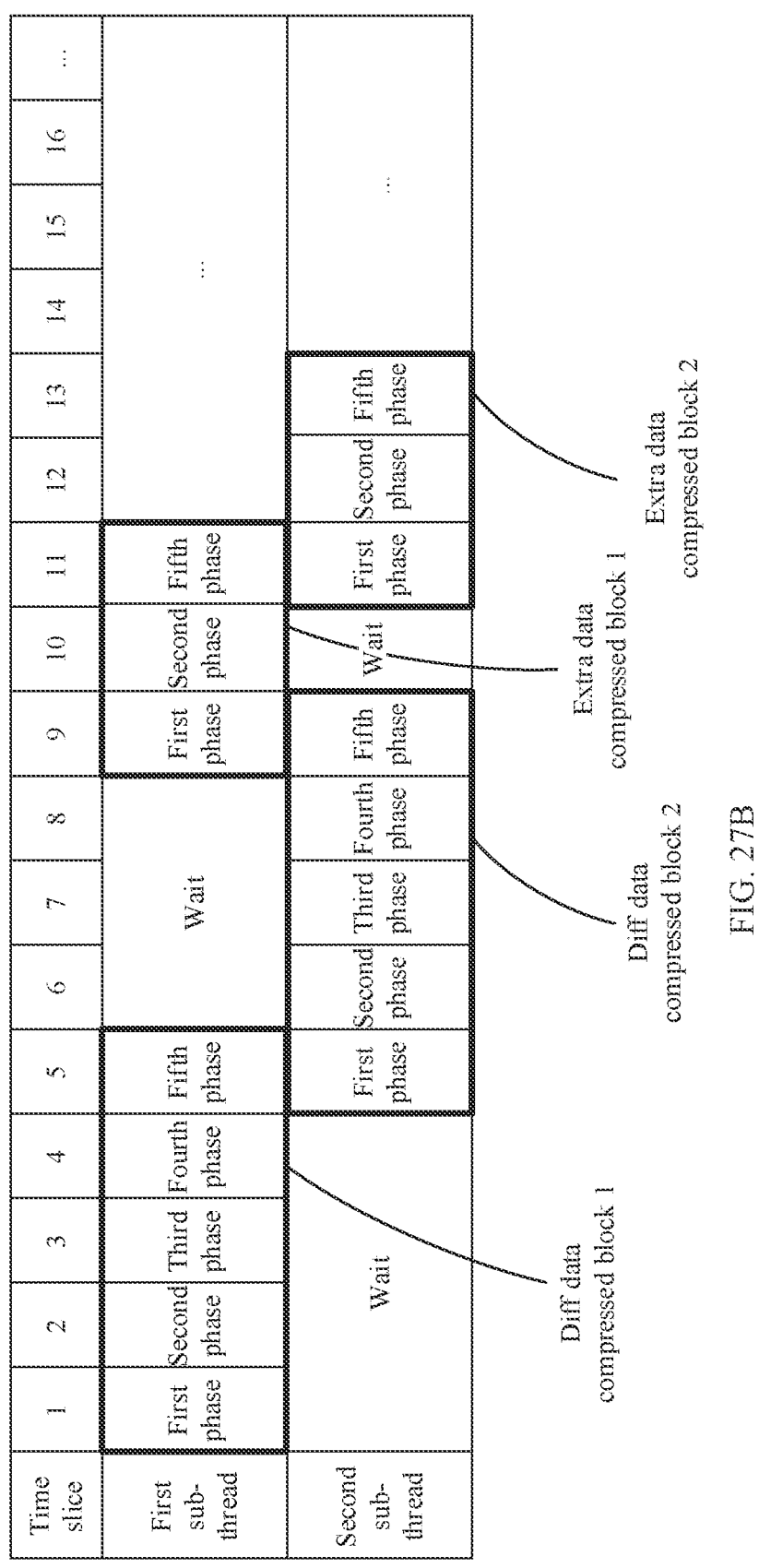
FIG. 27B is a schematic diagram of duration of performing continuous data compressed block restoration based on a plurality of threads according to an embodiment.

However, as shown in FIG. 27B, when restoration processing is performed on data compressed blocks described by a zone by using two sub-threads, a second sub-thread may start the first phase of restoration processing for a Diff data compressed block 2 in the fifth phase of restoration processing of a first sub-thread for a Diff data compressed block 1. Similarly, the first sub-thread may start the second phase of restoration processing for an Extra data compressed block 1 in the fifth phase of restoration processing of the second sub-thread for the Diff data compressed block 2; and the second sub-thread may start the first phase of restoration processing for an Extra data compressed block 2 in the fifth phase of restoration processing of the first sub-thread for the Extra data compressed block 1. In this way, there is no need to wait until the fifth phase of the restoration processing procedure for the current data compressed block ends before starting the first phase of the restoration procedure for the next data compressed block. In this way, the first RAM memory area no longer has a wait delay, restoration duration of a plurality of data compressed blocks is shortened (it can be clearly learned from comparison between FIG. 27A and FIG. 27B), and processing efficiency of the restoration thread is improved.

Figure 28:
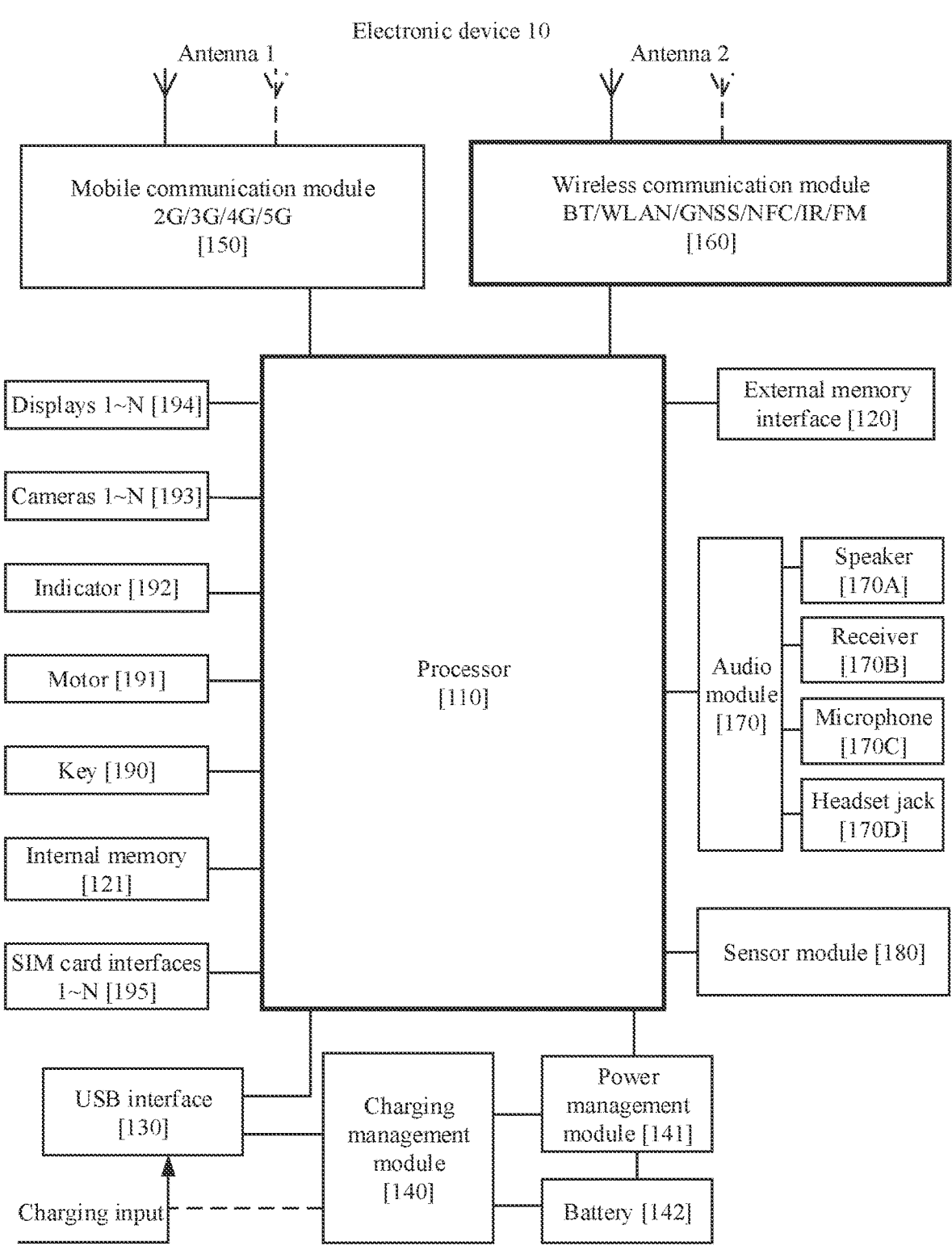
FIG. 28 is a schematic diagram of an example of a hardware structure of an electronic device.

FIG. 28 is a schematic diagram of a structure of an electronic device 10. Optionally, the electronic device 10 may be referred to as a terminal or a terminal device, for example, may be a smartphone. The terminal may be a wearable electronic device, for example, may be a smartwatch. This is not limited in this application. It should be noted that the schematic diagram of the structure of the electronic device 10 may be applicable to the smartwatch 100 or the mobile phone 200 in FIG. 1. It should be understood that the electronic device 10 shown in FIG. 28 is merely an example of the electronic device, and the electronic device 10 may have more or fewer components than those shown in the figure, two or more components may be combined, or there may be a different component configuration. The components shown in FIG. 28 may be implemented by hardware that includes one or more signal processing and/or application-specific integrated circuits, software, or a combination of hardware and software.

The electronic device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, and a subscriber identification module (subscriber identification module, SIM) card interface 195, and the like. The sensor module 180 may include a pressure sensor, a gyroscope sensor, an acceleration sensor, a temperature sensor, a PPG (Photoplethysmography, photoplethysmography) sensor, a motion sensor, a barometric pressure sensor, a magnetic sensor, a distance sensor, an optical proximity sensor, a fingerprint sensor, a touch sensor, an ambient light sensor, a bone conduction sensor, and the like.

The processor 110 may include one or more processing units. For example, the processor 110 may include an application processor (application processor, AP), a modem processor, a graphics processing unit (graphics processing unit, GPU), an image signal processor (image signal processor. ISP), a controller, a memory, a video codec, a digital signal processor (digital signal processor, DSP), a baseband processor, a neural-network processing unit (neural-network processing unit, NPU), and/or the like. Different processing units may be independent components or may be integrated into one or more processors. A memory may be further disposed in the processor 110, and is configured to store instructions and data.

The charging management module 140 is configured to receive charging input from a charger. While charging the battery 142, the charging management module 140 may further supply power to the electronic device by using the power management module 141.

A wireless communication function of the electronic device 10 may be implemented by using the antenna 1, the antenna 2, the mobile communication module 150, the wireless communication module 160, the modem processor, the baseband processor, and the like. The mobile communication module 150 may provide a solution for wireless communication including 2G/3G/4G/5G and the like to be applied to the electronic device 10. The wireless communication module 160 may provide a solution for wireless communication that is applied to the electronic device 10 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR), and the like.

In some embodiments, the antenna 1 of the electronic device 10 is coupled to the mobile communication module 150, and the antenna 2 is coupled to the wireless communication module 160, so that the electronic device 10 can communicate with a network and another device by using a wireless communication technology.

The electronic device 10 implements a display function by using the GPU, the display 194, the application processor, and the like. The processor 110 may include one or more GPUs, and the one or more GPUs execute program instructions to generate or change display information.

The display 194 is configured to display an image, a video, and the like. The display 194 includes a display panel. In some embodiments, the electronic device 10 may include one or N displays 194, where N is a positive integer greater than 1.

The external memory interface 120 may be configured to connect to an external storage card, for example, a Micro SD card, to extend a storage capability of the electronic device 10. The internal memory 121 may be configured to store computer-executable program code, and the executable program code includes instructions. The processor 110 runs the instructions stored in the internal memory 121, to execute various function applications and data processing of the electronic device 10, to enable the electronic device 10 to implement the differential file restoration method in the embodiments of this application.

In this embodiment of this application, the internal memory 121 may be configured to store a program for implementing the differential file generation method, a program for implementing the differential file restoration method, a program of the BSDiff algorithm, and the like in the embodiments of this application.

The electronic device 10 may use the audio module 170, the speaker 170A, the receiver 170B, the microphone 170C, the headset jack 170D, the application processor, and the like to implement an audio function, for example, music playback and audio recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110 or some functional modules of the audio module 170 may be disposed in the processor 110.

The gyroscope sensor may be configured to detect a motion posture of the electronic device 10. In some embodiments, angular velocities of the electronic device 10 around three axes (that is, an x axis, a y axis, and a z axis) may be determined by using the gyroscope sensor. In some embodiments, the gyroscope sensor may be further configured to identify a posture of the electronic device, to recognize a behavior state of a user wearing or holding the electronic device 10.

The acceleration sensor may be configured to detect magnitudes of acceleration of the electronic device 10 in various directions (usually, on three axes). In some embodiments, when the electronic device 10 is still, the acceleration sensor may detect a magnitude and a direction of gravity. In some embodiments, the acceleration sensor may be further configured to identify a posture of the electronic device, to recognize a behavior state of a user wearing or holding the electronic device 10.

The temperature sensor may be configured to detect a temperature of the electronic device 10. In some embodiments, the temperature sensor may detect a body temperature of a user wearing the electronic device 10.

The PPG (Photoplethysmography, photoplethysmography) sensor may be configured to detect physiological parameter information of a wearer of the electronic device 10. A principle of the PPG sensor is to optically detect a fluctuating change of a blood volume in the tissue microvascular bed under the action of systole and diastole. For example, during systole, a blood volume and an amount of light absorption of tissue increase, and it indicates that light intensity detected by a photodetector is small; and during diastole, a blood volume and an amount of light absorption of the tissue decrease, and it indicates that light intensity detected by the photodetector is large. Because a change in light intensity of the PPG sensor is related to a slight change in blood perfusion of tissue, the PPG sensor may be configured to provide information about a cardiovascular system of a wearer of the electronic device 10, for example, physiological parameter information such as a blood pressure, blood oxygen, a pulse rate (heart rate), and a respiration rate.

The pressure sensor is configured to sense a pressure signal, and may convert the pressure signal into an electrical signal. In some embodiments, the pressure sensor may be disposed on the display 194. The electronic device 10 may calculate a touch location based on a detected signal of the pressure sensor.

The touch sensor is also referred to as a "touch panel". The touch sensor may be disposed on the display 194. The touch sensor and the display 194 constitute a touchscreen, which is also referred to as a "touch control screen". The touch sensor is configured to detect a touch operation performed on or near the touch sensor. The touch sensor may transmit a detected touch operation to the application processor to determine a type of a touch event.

The key 190 includes a power-on key (or referred to as a power key), a volume key, or the like. The key 190 may be a mechanical key, or may be a touch key. The electronic device 10 may receive a key input and generate a key signal input related to user settings and function control of the electronic device 10.

The motor 191 may generate a vibration prompt. The motor 191 may be configured to provide a vibration prompt for an incoming call, and may be further configured to provide vibration feedback for a touch.

The indicator 192 may be an indicator light, may be configured to indicate a charging state and a battery change, and may also be configured to indicate a message.

A software system of the electronic device 10 may use a layered architecture, an event-driven architecture, a microkernal architecture, a microservice architecture, or a cloud architecture. In this embodiment of this application, an operating system with a layered architecture is used as an example to describe the software structure of the electronic device 10.

Figure 29:
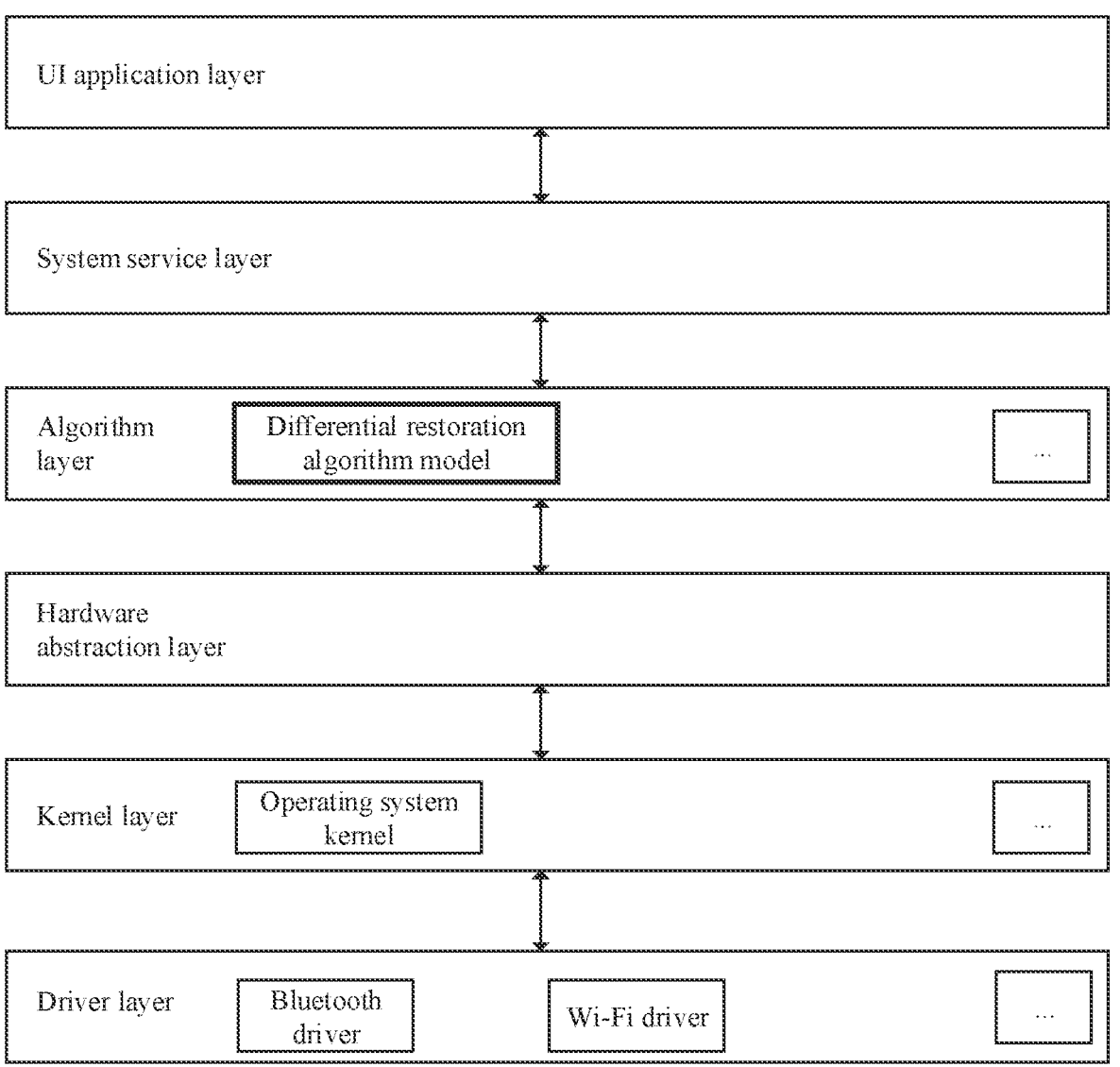
FIG. 29 is a schematic diagram of an example of a software structure of an electronic device.

FIG. 29 is a block diagram of a software structure of an electronic device 10 according to an embodiment of this application.

In a layered architecture of the electronic device 10, software is divided into several layers, and each layer has a clear role and task. The layers communicate with each other through software interfaces. For example, in some embodiments, the electronic device 10 is a smartwatch. As shown in FIG. 29, an operating system may be divided into six layers from top to bottom: A UI (User Interface, user interface) application layer, a system service layer, an algorithm layer, a hardware abstraction layer, a kernel layer, and a driver layer.

The UI application layer may include a series of application packages, for example, Dial, Exercise Log, Phone, and Exercise.

The system service layer may include a series of system services. The system service layer may include a heart rate service. The heart rate service may provide physiological parameter information of a smartwatch wearer, for example, a blood pressure, blood oxygen, a pulse rate, a respiration rate, and a temperature, and may further detect physiological parameter change information of the smartwatch wearer. The system service layer may further include a step-counting service, a calorie service, and a heart health service.

The algorithm layer may include a series of algorithm models. As shown in FIG. 29, the algorithm layer may include a differential restoration algorithm model. The differential restoration algorithm model may be used for the differential file restoration method provided in the embodiments.

The hardware abstraction layer (hardware abstraction layer, HAL) is an interface layer located between an operating system kernel and a hardware circuit. The HAL layer includes but is not limited to an audio HAL. The audio HAL is used to process an audio stream, for example, perform processing such as noise reduction and directional enhancement on the audio stream.

The kernel layer and the driver layer are layers between hardware and software. As shown in FIG. 29, the kernel layer includes at least an operating system kernel, and the driver layer includes at least a Bluetooth driver, a Wi-Fi driver, and the like.

It may be understood that the layers in the software structure shown in FIG. 29 and components included in the layers do not constitute a specific limitation on the electronic device 10. In some other embodiments of this application, the electronic device 10 may include more or fewer layers than those shown in the figure, and each layer may include more or fewer components. This is not limited in this application.

It may be understood that, to implement the differential file restoration method in the embodiments of this application, the electronic device 10 includes corresponding hardware and/or software modules for performing various functions. Algorithm steps in the examples described with reference to the embodiments disclosed in this specification can be implemented by hardware or a combination of hardware and computer software in this application. Whether a specific function is performed by hardware or hardware driven by computer software depends on a particular application and a design constraint of the technical solutions. A person skilled in the art may use different methods to implement the described functions with reference to embodiments for each particular application, but it should not be considered that the implementation goes beyond the scope of this application.

Figure 30:
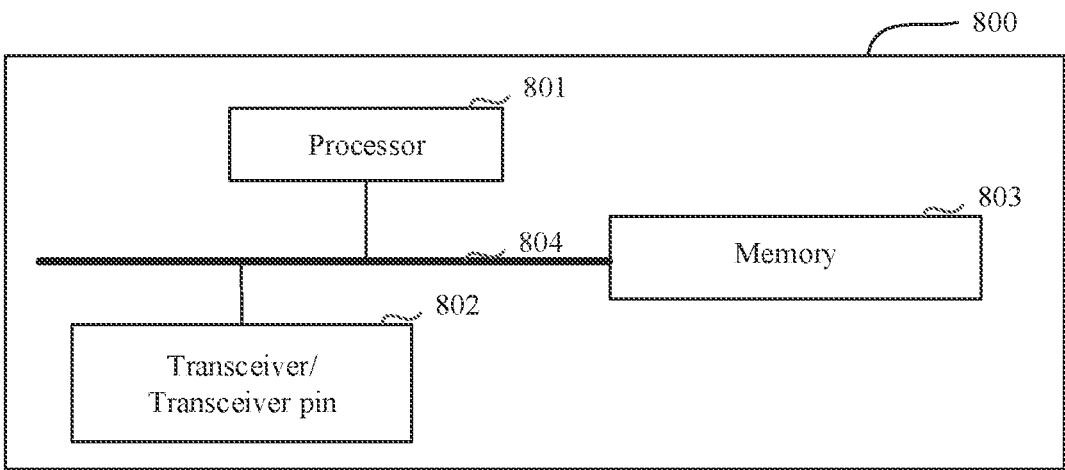
FIG. 30 is a schematic diagram of an example of a structure of an apparatus.

In an example, FIG. 30 is a schematic block diagram of an apparatus 800 according to an embodiment of this application. The apparatus 800 may include a processor 801 and a transceiver/transceiver pin 802. Optionally, the apparatus further includes a memory 803.

Components in the apparatus 800 are coupled together through a bus 804. In addition to a data bus, the bus 804 further includes a power bus, a control bus, and a state signal bus. However, for clarity of description, various buses are referred to as the bus 804 in the figure.

Optionally, the memory 803 may be configured to store instructions of the server in the foregoing differential file generation method embodiment. The processor 801 may be configured to execute the instructions in the memory 803, control a receive pin to receive a signal, and control a transmit pin to send a signal.

Optionally, the memory 803 may be configured to store instructions of the intelligent terminal in the foregoing differential file restoration method embodiment. The processor 801 may be configured to execute the instructions in the memory 803, control the receive pin to receive a signal, and control the transmit pin to send a signal.

The apparatus 800 may be the server in the foregoing differential file generation method embodiment, for example, an OTA server, or may be the intelligent terminal in the foregoing differential file restoration method embodiment, for example, a smartphone or a smartwatch.

An embodiment further provides a computer storage medium. The computer storage medium stores computer instructions. When the computer instructions are run on an electronic device, the electronic device is enabled to perform the foregoing relevant method steps to implement the differential file generation method in the foregoing embodiments, or the electronic device is enabled to perform the foregoing relevant method steps to implement the differential file restoration method in the foregoing embodiments.

An embodiment further provides a computer program product. When the computer program product runs on a computer, the computer is enabled to perform the foregoing relevant steps to implement the differential file generation method in the foregoing embodiments or the differential file restoration method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the differential file generation method or the differential file restoration method in the foregoing method embodiments.

The electronic device (for example, a server or a terminal), the computer storage medium, the computer program product, or the chip provided in the embodiments is configured to perform the corresponding method provided above. Therefore, for beneficial effects that can be achieved by the electronic device, the computer storage medium, the computer program product, or the chip, refer to the beneficial effects in the corresponding method provided above. Details are not described herein again.

It may be understood by a person skilled in the art from the foregoing descriptions of the implementations that, for convenience and brevity of description, division of the foregoing functional modules is merely used as an example for description. In an actual application, the foregoing functions may be allocated to different functional modules as required, that is, an internal structure of the apparatus is divided into different functional modules, to complete all or some of the functions described above.

In the several embodiments provided in this application, it should be understood that the disclosed apparatus and methods may be implemented in other manners. For example, the described apparatus embodiment is merely an example. For example, the division into the modules or units is merely a logical function division, and there may be another division manner in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The foregoing embodiments are merely intended to describe the technical solutions in this application, but not intended to limit the technical solutions in this application. Although this application is described in detail with reference to the foregoing embodiments, a person of ordinary skill in the art should understand that modifications may still be made to the technical solutions described in the foregoing embodiments or equivalent replacements may still be made to some technical features thereof. However, these modifications or replacements do not make the essence of the corresponding technical solutions depart from the scope of the technical solutions in the embodiments of this application.

The invention claimed is:

1. A differential file restoration method, applied to an electronic device, and comprising:

obtaining a differential file, wherein the differential file comprises at least one group of data compressed blocks, the group of data compressed blocks comprises at least one of differential data (Diff data) compressed blocks or newly extra data (Extra data) compressed blocks, and the data compressed blocks are divided based on a preset block size before being compressed;

determining a parallel quantity k of restoration threads based on the block size and a size of Random Access Memory (RAM) space used by the electronic device for differential file restoration, and dividing a group of RAM space for each restoration thread, wherein the group of RAM space comprises a first RAM memory area, a second RAM memory area, a third RAM memory area, and a fourth RAM memory area;

a size of each of the first RAM memory area and the third RAM memory area is the block size;

the second RAM memory area and the fourth RAM memory area are respectively safety buffer areas of the first RAM memory area and the third RAM memory area; and a fifth RAM memory area is shared by the restoration threads, and the fifth RAM memory area is used to run a data compression algorithm; and performing, by using the k restoration threads, restoration processing on the differential file in parallel, wherein each restoration thread performs restoration processing on the at least one group of data compressed blocks by using the group of RAM space corresponding to the restoration thread, and writes data obtained after restoration processing into a target file.

2. The method according to claim 1, wherein the determining a parallel quantity k of restoration threads based on the block size and a size of RAM space used by the electronic device for differential file restoration comprises:

$k=[(M-N1)/(zonesize+N2)]$, wherein M is the size of RAM space used by the electronic device for differential file restoration, N1 is a size of the fifth RAM memory area, zonesize is the block size, N2 is a size of the safety buffer area, and [] is a rounding operation.

3. The method according to claim 1, wherein Diff data corresponding to the Diff data compressed block is obtained based on a first operation; and performing restoration processing on the group of data compressed blocks by each restoration thread comprises:

sequentially performing, by the restoration thread, data restoration processing on the Diff data compressed blocks or the Extra data compressed blocks in the group of data compressed blocks in a parsing sequence;

each time a Diff data compressed block is obtained through parsing, performing a second operation on Diff data corresponding to the Diff data compressed block and existing data to obtain first target data, and writing the first target data into the target file, wherein the existing data is data that is read from an existing file corresponding to the differential file and that matches the Diff data compressed block, and the second operation is an inverse operation of the first operation; and each time an Extra data compressed block is obtained through parsing, performing data decompression on the Extra data compressed block to obtain second target data, and writing the second target data into the target file.

4. The method according to claim 3, wherein the performing a second operation on Diff data corresponding to the Diff data compressed block and existing data to obtain first target data, and writing the first target data into the target file comprises:

temporarily storing the Diff data compressed block in the first RAM memory area;

performing data decompression processing on the Diff data compressed block, and temporarily storing an obtained Diff data block in the third RAM memory area;

reading existing data corresponding to the Diff data block from the existing file, and temporarily storing the existing data in the first RAM memory area;

performing the second operation on data in the first RAM memory area and data in the third RAM memory area, and temporarily storing the obtained first target data in the third RAM memory area; and writing the first target data temporarily stored in the third RAM memory area into the target file.

5. The method according to claim 4, wherein that each restoration thread performs restoration processing on the at least one group of data compressed blocks by using the group of RAM space corresponding to the restoration thread comprises:

creating, by each restoration thread, a first sub-thread and a second sub-thread; and sequentially performing, by using the first sub-thread and the second sub-thread and by using the group of RAM space corresponding to the restoration thread, restoration processing on the Diff data compressed blocks or the Extra data compressed blocks comprised in the group of data compressed blocks, wherein when the second sub-thread performs execution to a target phase, the first sub-thread continues to perform restoration processing on a data compressed block in the group of data compressed blocks;

when the first sub-thread performs execution to the target phase, the second sub-thread continues to perform restoration processing on a data compressed block in the group of data compressed blocks; and the target phase is that the data temporarily stored in the third RAM memory area is written into the target file.

6. The method according to claim 3, wherein the performing data decompression on the Extra data compressed block to obtain second target data, and writing the second target data into the target file comprises:

temporarily storing the Extra data compressed block in the first RAM memory area;

performing data decompression processing on the Extra data compressed block, and temporarily storing the obtained second target data in the third RAM memory area; and writing the second target data temporarily stored in the third RAM memory area into the target file.

7. The method according to claim 6, wherein a data structure of the differential file comprises a header, a control block, and a group of data compressed blocks described by using the control block;

the header is filled with a magic number of the differential file and the block size; and the control block is filled with a first pointer offset and a second pointer offset, the first pointer offset is used to determine, in the existing file, a data read head address corresponding to the group of data compressed blocks, and the second pointer offset is used to determine, in the target file, a data write head address corresponding to the group of data compressed blocks.

8. The method according to claim 6, wherein data compressed block groups to be processed by each restoration thread are separately determined based on residual results of dividing sequence numbers of the data compressed block groups by the parallel quantity.

9. The method according to claim 1, wherein that each restoration thread performs restoration processing on the at least one group of data compressed blocks by using the group of RAM space corresponding to the restoration thread comprises:

separately creating a linked list for each restoration thread based on a quantity of data compressed block groups comprised in the differential file and sequence numbers of the data compressed block groups, so that the restoration thread completes restoration processing on the at least one group of data compressed blocks based on a corresponding linked list, wherein in the linked list, a data part of a node is filled with a sequence number of a data compressed block group and a head address for writing restored data corresponding to the group of data compressed blocks into the target file.

10. An electronic device, comprising:

one or more processors;

a memory; and one or more computer programs, wherein the one or more computer programs are stored in the memory, and when the computer programs are executed by the one or more processors, cause the electronic device to perform operations comprising:

obtaining a differential file, wherein the differential file comprises at least one group of data compressed blocks, the group of data compressed blocks comprises at least one of differential data (Diff data) compressed blocks or newly extra data (Extra data) compressed blocks, and the data compressed blocks are divided based on a preset block size before being compressed;

determining a parallel quantity k of restoration threads based on the block size and a size of Random Access Memory (RAM) space used by the electronic device for differential file restoration, and dividing a group of RAM space for each restoration thread, wherein the group of RAM space comprises a first RAM memory area, a second RAM memory area, a third RAM memory area, and a fourth RAM memory area;

a size of each of the first RAM memory area and the third RAM memory area is the block size;

the second RAM memory area and the fourth RAM memory area are respectively safety buffer areas of the first RAM memory area and the third RAM memory area; and a fifth RAM memory area is shared by the restoration threads, and the fifth RAM memory area is used to run a data compression algorithm; and performing, by using the k restoration threads, restoration processing on the differential file in parallel, wherein each restoration thread performs restoration processing on the at least one group of data compressed blocks by using the group of RAM space corresponding to the restoration thread, and writes data obtained after restoration processing into a target file.

11. The electronic device according to claim 10, wherein that each restoration thread performs restoration processing on the at least one group of data compressed blocks by using the group of RAM space corresponding to the restoration thread comprises:

separately creating a linked list for each restoration thread based on a quantity of data compressed block groups comprised in the differential file and sequence numbers of the data compressed block groups, so that the restoration thread completes restoration processing on the at least one group of data compressed blocks based on a corresponding linked list, wherein in the linked list, a data part of a node is filled with a sequence number of a data compressed block group and a head address for writing restored data corresponding to the group of data compressed blocks into the target file.

12. A non-transitory computer-readable storage medium, comprising a computer program, wherein when the computer program runs on an electronic device, causing the electronic device to perform operations comprising:

obtaining a differential file, wherein the differential file comprises at least one group of data compressed blocks, the group of data compressed blocks comprises at least one of differential data (Diff data) compressed blocks or newly extra data (Extra data) compressed blocks, and the data compressed blocks are divided based on a preset block size before being compressed;

determining a parallel quantity k of restoration threads based on the block size and a size of Random Access Memory (RAM) space used by the electronic device for differential file restoration, and dividing a group of RAM space for each restoration thread, wherein the group of RAM space comprises a first RAM memory area, a second RAM memory area, a third RAM memory area, and a fourth RAM memory area;

a size of each of the first RAM memory area and the third RAM memory area is the block size;

the second RAM memory area and the fourth RAM memory area are respectively safety buffer areas of the first RAM memory area and the third RAM memory area; and a fifth RAM memory area is shared by the restoration threads, and the fifth RAM memory area is used to run a data compression algorithm; and performing, by using the k restoration threads, restoration processing on the differential file in parallel, wherein each restoration thread performs restoration processing on the at least one group of data compressed blocks by using the group of RAM space corresponding to the restoration thread, and writes data obtained after restoration processing into a target file.

13. The electronic device according to claim 12, wherein the determining a parallel quantity k of restoration threads based on the block size and a size of RAM space used by the electronic device for differential file restoration comprises:

$k=[(M-N1)/(zonesize+N2)]$, wherein M is the size of RAM space used by the electronic device for differential file restoration, N1 is a size of the fifth RAM memory area, zonesize is the block size, N2 is a size of the safety buffer area, and [] is a rounding operation.

14. The electronic device according to claim 12, wherein Diff data corresponding to the Diff data compressed block is obtained based on a first operation; and performing restoration processing on the group of data compressed blocks by each restoration thread comprises:

sequentially performing, by the restoration thread, data restoration processing on the Diff data compressed blocks or the Extra data compressed blocks in the group of data compressed blocks in a parsing sequence;

each time a Diff data compressed block is obtained through parsing, performing a second operation on Diff data corresponding to the Diff data compressed block and existing data to obtain first target data, and writing the first target data into the target file, wherein the existing data is data that is read from an existing file corresponding to the differential file and that matches the Diff data compressed block, and the second operation is an inverse operation of the first operation; and each time an Extra data compressed block is obtained through parsing, performing data decompression on the Extra data compressed block to obtain second target data, and writing the second target data into the target file.

15. The electronic device according to claim 14, wherein the performing a second operation on Diff data corresponding to the Diff data compressed block and existing data to obtain first target data, and writing the first target data into the target file comprises:

temporarily storing the Diff data compressed block in the first RAM memory area;

performing data decompression processing on the Diff data compressed block, and temporarily storing an obtained Diff data block in the third RAM memory area;

reading existing data corresponding to the Diff data block from the existing file, and temporarily storing the existing data in the first RAM memory area;

performing the second operation on data in the first RAM memory area and data in the third RAM memory area, and temporarily storing the obtained first target data in the third RAM memory area; and writing the first target data temporarily stored in the third RAM memory area into the target file.

16. The electronic device according to claim 14, wherein the performing data decompression on the Extra data compressed block to obtain second target data, and writing the second target data into the target file comprises:

temporarily storing the Extra data compressed block in the first RAM memory area;

performing data decompression processing on the Extra data compressed block, and temporarily storing the obtained second target data in the third RAM memory area; and writing the second target data temporarily stored in the third RAM memory area into the target file.

17. The electronic device according to claim 16, wherein a data structure of the differential file comprises a header, a control block, and a group of data compressed blocks described by using the control block;

the header is filled with a magic number of the differential file and the block size; and the control block is filled with a first pointer offset and a second pointer offset, the first pointer offset is used to determine, in the existing file, a data read head address corresponding to the group of data compressed blocks, and the second pointer offset is used to determine, in the target file, a data write head address corresponding to the group of data compressed blocks.

18. The electronic device according to claim 16, wherein data compressed block groups to be processed by each restoration thread are separately determined based on residual results of dividing sequence numbers of the data compressed block groups by the parallel quantity.

* * * * *